United States Patent
Nanaumi et al.

(10) Patent No.: US 8,376,037 B2
(45) Date of Patent: Feb. 19, 2013

(54) VEHICULAR AIR CONDITIONING APPARATUS AND TEMPERATURE CONTROL METHOD PERFORMED THEREBY

(75) Inventors: Kyosuke Nanaumi, Tochigi-ken (JP); Takahiro Seto, Utsunomiya (JP); Tsunetoshi Kitamura, Utsunomiya (JP); Junichi Kanemaru, Columbus, OH (US); Shinji Kakizaki, Dublin, OH (US)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 683 days.

(21) Appl. No.: 12/500,775

(22) Filed: Jul. 10, 2009

(65) Prior Publication Data

US 2011/0005717 A1 Jan. 13, 2011

(51) Int. Cl.
*B60H 1/00* (2006.01)
*B60H 3/00* (2006.01)

(52) U.S. Cl. .................... 165/204; 165/203; 165/42

(58) Field of Classification Search ............... 165/204, 165/203, 207, 41, 42, 47, 140; 180/68.1, 180/68.4
See application file for complete search history.

(56) References Cited

U.S. PATENT DOCUMENTS

| | | | | |
|---|---|---|---|---|
| 5,309,731 A * | 5/1994 | Nonoyama et al. | ............... | 62/244 |
| 6,138,749 A * | 10/2000 | Kawai et al. | .................. | 165/204 |
| 6,415,857 B1 * | 7/2002 | Nakamura et al. | ............ | 165/204 |
| 6,482,081 B2 * | 11/2002 | Vincent et al. | ................. | 454/121 |
| 6,607,029 B2 * | 8/2003 | Danieau | ......................... | 165/203 |
| 6,640,890 B1 * | 11/2003 | Dage et al. | ....................... | 165/203 |
| 6,796,368 B1 * | 9/2004 | Saida et al. | ....................... | 165/43 |
| 7,150,335 B2 * | 12/2006 | Sasano et al. | ................. | 180/68.4 |
| 7,527,091 B2 * | 5/2009 | Ito et al. | .......................... | 165/202 |
| 2007/0023162 A1 * | 2/2007 | Kim et al. | ........................ | 165/42 |
| 2007/0131407 A1 * | 6/2007 | Natsume | ......................... | 165/202 |
| 2007/0204985 A1 * | 9/2007 | Fukagawa et al. | ............. | 165/203 |

FOREIGN PATENT DOCUMENTS

| JP | 2001-180249 | * | 7/2001 |
|---|---|---|---|
| JP | 2004-075027 | | 3/2004 |

\* cited by examiner

*Primary Examiner* — Allen Flanigan
*Assistant Examiner* — Jason Thompson
(74) *Attorney, Agent, or Firm* — Rankin, Hill & Clark LLP

(57) ABSTRACT

Air is supplied to the interior of a casing from first and second blower units, such that cool air that has been cooled by an evaporator and warm air that has been heated by a heater core are mixed together and blown out toward a front seat side and a rear seat side of the vehicle, respectively. At this time, a temperature control damper, which adjusts the temperature of air that is blown into the vehicle compartment, causes a flow of warm air having undergone heat exchange in the heater core to be deflected toward a direction where the evaporator is installed. Mixing of the warm air and the cool air can thus be carried out suitably by causing the flow of cool air, which has undergone heat exchange in the evaporator, and the flow of warm air to be oriented in mutually opposite directions.

13 Claims, 36 Drawing Sheets

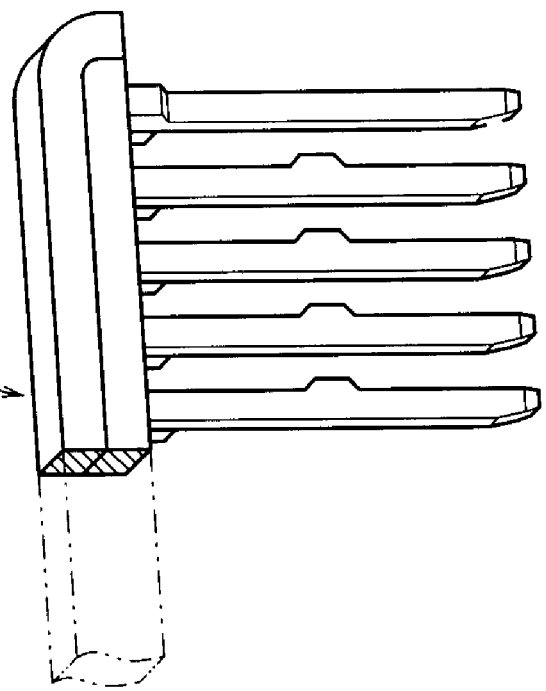
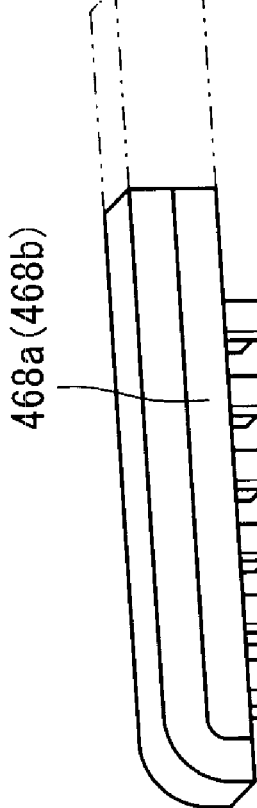
FIG. 18

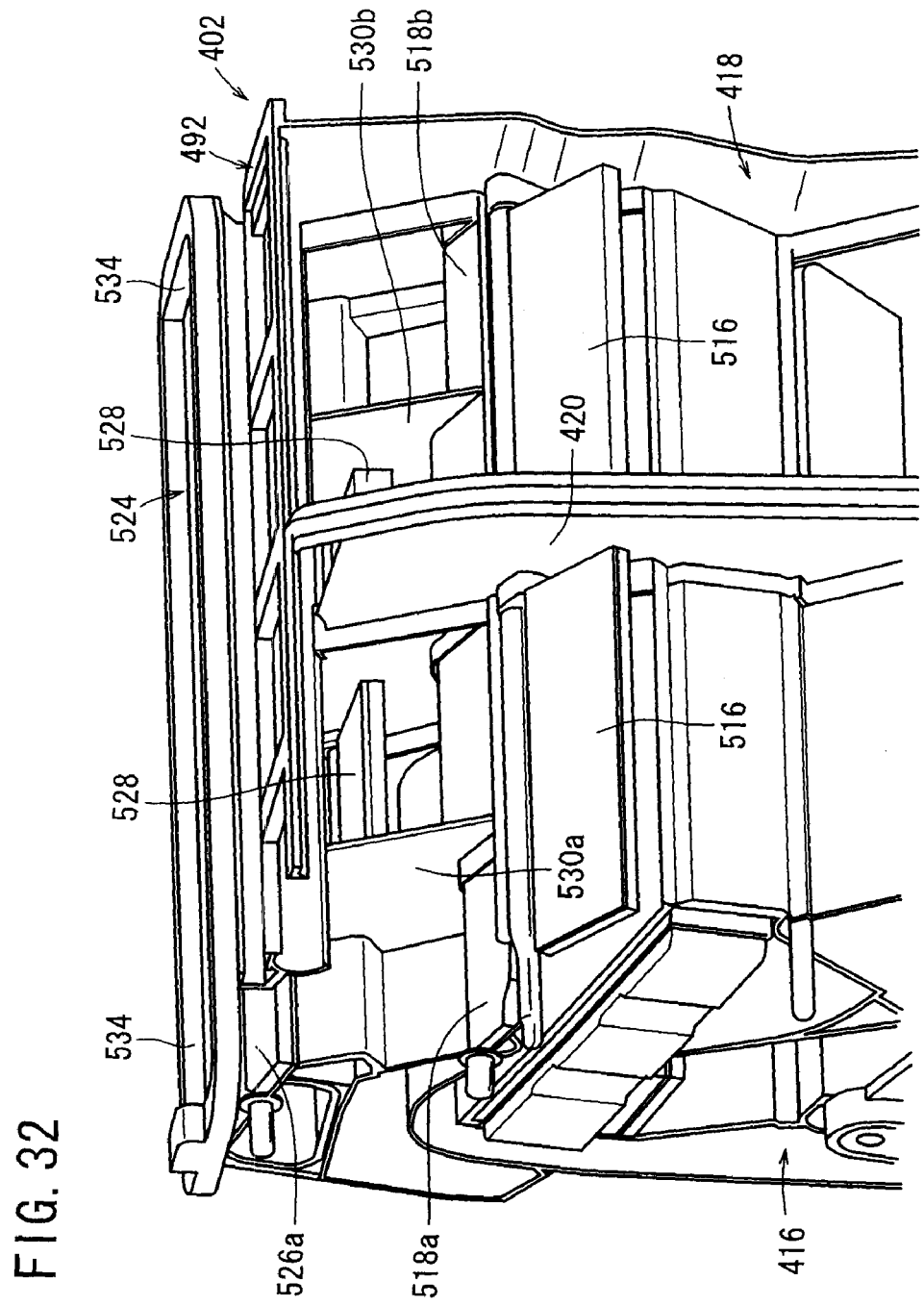

VEHICULAR AIR CONDITIONING APPARATUS AND TEMPERATURE CONTROL METHOD PERFORMED THEREBY

BACKGROUND OF THE INVENTION

1. Field of the Invention

The present invention relates to a vehicular air conditioning apparatus mounted in a vehicle for blowing air into a vehicle compartment that has been adjusted in temperature by a cooling means and a heating means, for thereby performing temperature adjustment of the vehicle compartment, as well as to a temperature control method performed by such a vehicular air conditioning apparatus.

2. Description of the Related Art

In a vehicular air conditioning apparatus that is mounted in a vehicle, internal and external air is drawn into a casing by a blower, and after cooled air, which has been cooled by an evaporator that forms a cooling means, and heated air, which has been heated by a heater core that forms a heating means, are mixed together in the casing at a predetermined mixing ratio, the mixed air is blown out from a defroster blow-out port, a face blow-out port, or a foot blow-out port, whereby adjustment of temperature and humidity in the vehicle compartment is carried out.

With this type of vehicular air conditioning apparatus, for example, as disclosed in Japanese Laid-Open Patent Publication No. 2004-075027, a cool air passage through which air flows that has been cooled by an evaporator, and a warm air passage through which air flows that has been heated by a heater core are formed in the interior of a casing, and together therewith, a movable air guide for changing a flow direction of the warm air is arranged rotatably in an air mixing section in which the cool air and the warm air are mixed. In addition, by causing rotation of the movable air guide, an air flow rate of the cool air, which is blown out from a face opening for blowing air in the vicinity of the faces of vehicle occupants, is adjusted.

However, with the aforementioned conventional vehicular air conditioning apparatus, in the case that a bi-level mode is selected for carrying out blowing of air both in the vicinity of the faces and feet of the vehicle occupants, although the movable air guide can be rotated to blow cool air at a desired temperature with respect to the vehicle compartment, during a vent mode, in the case that maximum cooling is performed for carrying out blowing of air only in the vicinity of the faces of the vehicle occupants, since the warm air passage remains in communication with the cool air passage, warm air continues to be mixed with the cool air, if only at a small amount, so that the temperature of the cool air blown into the vehicle compartment is raised, and thus there is a concern that some discomfort may be imparted to the vehicle occupants.

SUMMARY OF THE INVENTION

A general object of the present invention, taking into consideration the aforementioned problems, is to provide a vehicular air conditioning apparatus and a temperature control method performed thereby, in which, by carrying out temperature adjustment and adjustment of the air blowing rate separately and independently into the vehicle compartment, warm air or cool air, which are adjusted in temperature to a desired amount, can be obtained, and further wherein, during a time of maximum cooling, blowing of air can be performed without decreasing the air blowing rate or causing a rise in temperature, so that the comfort of occupants in the vehicle compartment can be further enhanced.

In order to achieve the aforementioned objects, the present invention is characterized by a vehicular air conditioning apparatus including a casing in which passages and blow-out ports are formed for conveying air into a vehicle compartment, cooling means disposed inside the casing for cooling the air, and heating means disposed inside the casing on a downstream side from the cooling means for heating the air, and further comprising:

a cool air passage disposed on a downstream side of the cooling means, the cool air passage extending so as to circumvent the heating means, and through which air that has been cooled by the cooling means flows;

a warm air passage disposed on a downstream side of the heating means through which air that has been heated by the heating means flows, and which communicates with the cooling passage on a downstream side thereof; and a temperature control damper disposed rotatably at a region where the warm air passage and the cool air passage communicate, wherein the temperature control damper is operated to establish communication between the warm air passage and the cool air passage, as well as to block communication between the warm air passage and the cool air passage.

According to the present invention, in the interior of the casing, the cool air passage through which cool air flows is formed on a downstream side of the cooling means, whereas the warm air passage through which warm air flows is formed on a downstream side of the heating means. Together therewith, a temperature control damper is provided at a communication region, such that the downstream side of the warm air passage communicates with the cool air passage. Additionally, during a bi-level mode in which blowing of air is carried out in the vicinity of both the faces and feet of occupants in the vehicle compartment, the temperature control damper is rotated to placed the warm air passage and the cool air passage in communication and to mix the warm air and the cool air, so as to blow air into the vehicle compartment at a desired temperature. Further, during a vent mode in which blowing of air is carried out only in the vicinity of faces of the vehicle occupants, communication between the warm air passage and the cool air passage is blocked by the temperature control damper, so that air can be blown into the vehicle compartment without mixing the warm air with the cool air.

Accordingly, by performing adjustment of the temperature and blowing rate of air that is blown into the vehicle compartment separately and independently of each other, warm air and cool air, which are adjusted to a desired temperature, can be obtained. Further, during a vent mode at a time of maximum cooling, blowing of air can be performed without decreasing the air blowing rate or causing a rise in temperature. Therefore, the comfort of occupants in the vehicle compartment can be further enhanced.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 18 is a perspective view with partial omission of the first and second partitioning members shown in FIG. 17;

FIG. 32 is a partial cutaway perspective view showing a center plate and a dividing panel disposed inside the casing;

DESCRIPTION OF THE PREFERRED EMBODIMENTS

Figure 1:
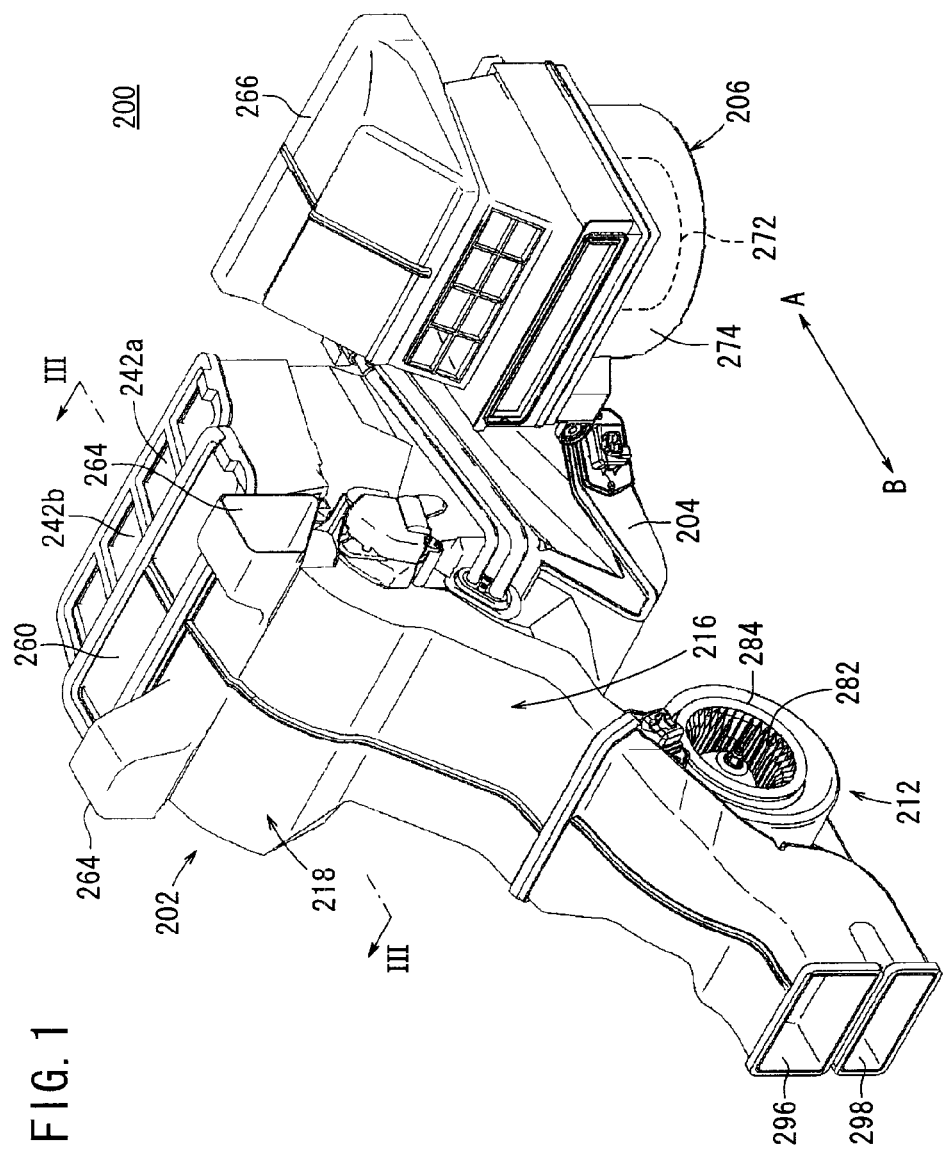
FIG. 1 is an external perspective view of a vehicular air conditioning apparatus according to a first embodiment of the present invention.

Concerning a temperature control method performed by the vehicular air conditioning apparatus according to the present invention, and in relation to the vehicular air conditioning apparatus for implementing the same, preferred embodiments shall be presented and described below with reference to the accompanying drawings. In FIG. 1, reference numeral 200 indicates a vehicular air conditioning apparatus for performing the temperature control method according to a first embodiment of the present invention. The vehicular air conditioning apparatus 200, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
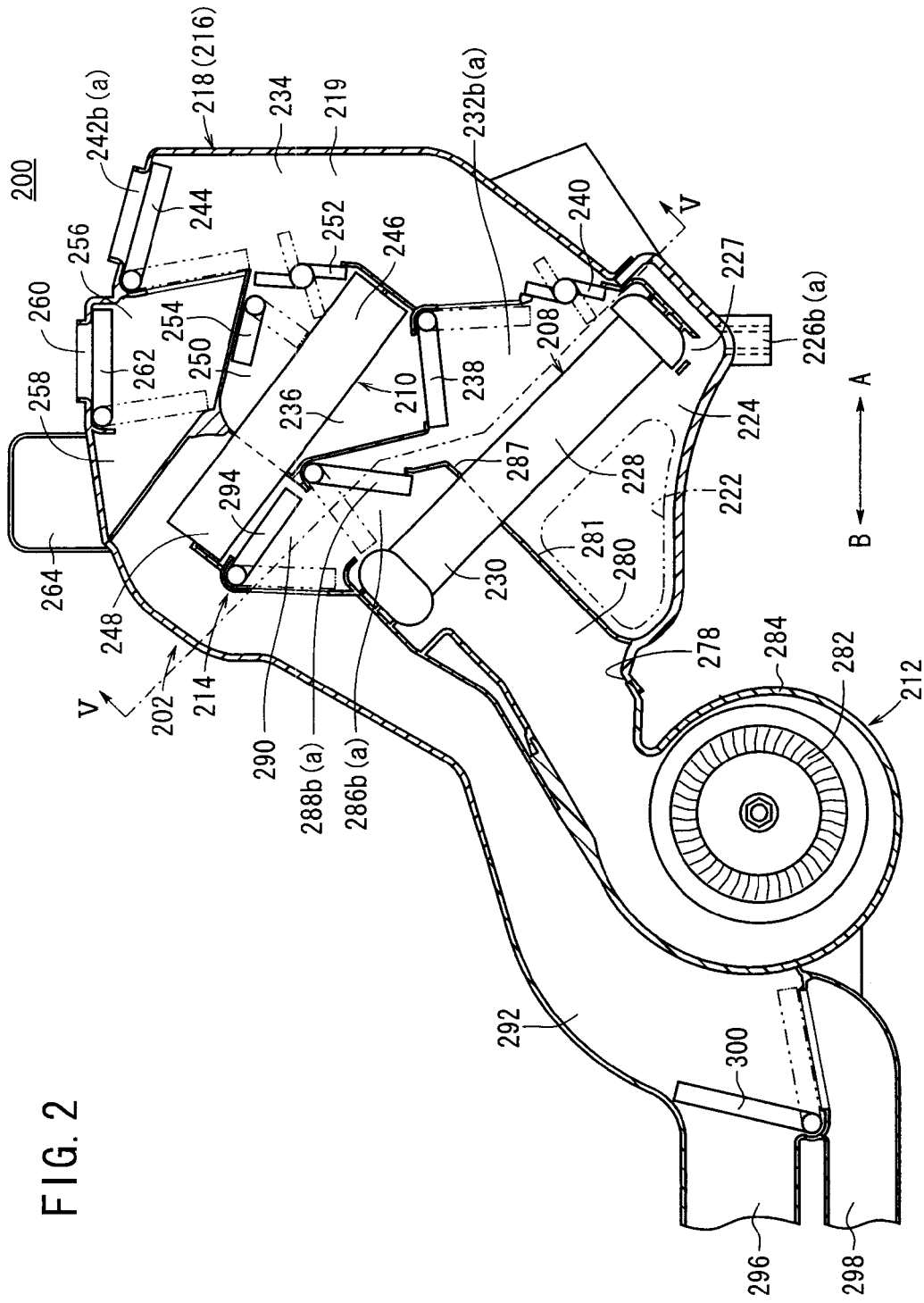
FIG. 2 is an overall cross sectional view of the vehicular air conditioning apparatus shown in FIG. 1.

Further, the vehicular air conditioning apparatus 200 is installed so that the righthand side thereof shown in FIG. 2 (in the direction of arrow A) is oriented toward the front side of the vehicle, whereas the lefthand side (in the direction of arrow B) is oriented toward the rear side of the vehicle. The arrow A direction shall be described as a forward direction, whereas the arrow B direction shall be described as a rearward direction.

In the present embodiment, inside the casing, plural rotating members made up of dampers or the like are provided, wherein the rotating members are operated by rotational drive sources such as motors or the like. Herein, for purposes of simplification, depictions and explanations concerning such rotational drive sources have been omitted.

As shown in FIGS. 1 and 2, the vehicular air conditioning apparatus 200 includes a casing 202 constituted by respective air passages, a first blower unit 206 connected via a connection duct 204 to a side portion of the casing 202 for blowing air toward the front seats of the vehicle, an evaporator (cooling means) 208 arranged in the interior of the casing 202 for cooling air, a heater core (heating means) 210 for heating the air, a second blower unit 212 connected to a lower part of the casing 202 for blowing air to the middle seats and rear seats of the vehicle, and a damper mechanism 214 for switching the flow of air that flows through each of the aforementioned passages.

The casing 202 is constructed from first and second divided casings 216, 218 having substantially symmetrical shapes, and a center plate 219 disposed between the first divided casing 216 and the second divided casing 218. A first intake port 222 connected to the connection duct 204, and to which air is supplied from the first blower unit 206, is formed at a lower side portion of the first divided casing 216. The first intake port 222 communicates with a first front passage 224 disposed on an upstream side of the evaporator 208.

As shown in FIG. 2, the evaporator 208, which is disposed on the downstream side of the first front passage 224, is disposed to straddle between the first divided casing 216 and the second divided casing 218. One end thereof in the forward direction of the vehicle (the direction of arrow A) is inclined downward at a predetermined angle with respect to the other end thereof in the rearward direction (the direction of arrow B) of the vehicle.

The evaporator 208 includes a first cooling section 228 that faces the first front passage 224 and which cools air that is supplied from the first front passage 224, and a second cooling section 230 that faces a later-described first rear passage 280 and which cools air that is supplied from the first rear passage 280. The first cooling section 228 and the second cooling section 230 are separated by a non-illustrated partitioning means, so that air flowing from the first front passage 224 into the evaporator 208 and air flowing from the first rear passage 280 into the evaporator 208 do not mix together mutually inside the evaporator 208.

On the other hand, a second front passage 232 supplied with air that has passed through the first cooling section 228 is formed on the downstream side of the evaporator 208. Upwardly of the second front passage 232, a third front passage (cool air passage) 234 and a fourth front passage 236 are formed in a branching or bifurcated fashion. Further, a first air mixing damper 238 is disposed rotatably in the second front passage 232, so as to face toward the branching portion of the third front passage 234 and the fourth front passage 236. By rotation of the first air mixing damper 238, the blowing condition and blowing rate of the cooled air that has passed through the evaporator 208 into the third front passage 234 and the fourth front passage 236 is adjusted. The third front passage 234 is arranged in a forward direction (the direction of arrow A), whereas the fourth front passage 236 is arranged in a rearward direction (the direction of arrow B), of the casing 202. The heater core 210 is disposed on a downstream side of the fourth front passage 236.

Upstream of the third front passage 234, a cooling vent damper 240 is disposed in a downward direction facing the second front passage 232. The cooling vent damper 240 is formed from a butterfly valve, which is rotatable about a central axis, for switching a communication state between the second front passage 232 and the third front passage 234. More specifically, because the cooling vent damper 240 is arranged in the vicinity of the evaporator 208, the cooling vent damper 240 is disposed such that, under a switching action thereof, chilled air cooled by the evaporator 208 is supplied directly into the third front passage 234.

Further, the third front passage 234 extends upwardly, and a first vent blow-out port 242 opens at an upper portion on the downstream side thereof, where a vent damper 244 is rotatably disposed. The vent damper 244 switches a blowing state of air that flows through the third front passage 234, when air is blown to the first vent blow-out port 242 and to a later-described sixth front passage 256, and also is capable of adjusting the blowing rate thereof.

The heater core 210, similar to the evaporator 208, is arranged so as to straddle between the first divided casing 216 and the second divided casing 218, and is disposed such that one end thereof in the forward direction of the vehicle (the direction of arrow A) is inclined downward at a predetermined angle with respect to the other end thereof in the rearward direction (the direction of arrow B) of the vehicle. The heater core 210 includes a first heating section 246 that faces the fourth front passage 236 and which heats air that is supplied from the fourth front passage 236, and a second heating section 248 that faces a third rear passage 290 (to be described later) and which heats air that is supplied from the third rear passage 290. The first heating section 246 and the second heating section 248 are separated by a non-illustrated partitioning means, so that air flowing from the fourth front passage 236 to the heater core 210 and air flowing from the third rear passage 290 to the heater core 210 do not mix together mutually inside the heater core 210.

On the downstream side of the heater core 210, a fifth front passage (warm air passage) 250 is formed. The fifth front passage 250 extends in the forward direction (in the direction of arrow A), and at a location that merges with the downstream side of the third front passage 234, temperature control dampers 252*a*, 252*b* are provided, and together therewith, a sub-defroster damper 254 is disposed in an upward direction facing the heater core 210. The temperature control dampers 252*a*, 252*b*, similar to the cooling vent damper 240, are formed from a butterfly valve rotatable about a central axis, for switching a communication state between the fifth front passage 250 and the third front passage 234 upon rotation thereof, and for deflecting the blowing direction of warm air supplied from the fifth front passage 250 into the third front passage 234.

On the other hand, the sub-defroster damper 254 is disposed so as to be capable of switching a communication state between the fifth front passage (warm air passage) 250 and the sixth front passage 256 (second passage) formed thereabove. By rotating the sub-defroster damper 254 and thereby establishing communication between the fifth front passage 250 and the sixth front passage 256, that is, by shortening the flow path from the fifth front passage 250 to the sixth front passage 256, in a state in which air resistance is reduced, warm air heated by the heater core 210 can be supplied directly to the sixth front passage 256 without flowing through the third front passage 234. Owing thereto, in the case that the heat mode for blowing air in the vicinity of the feet of passengers, or the defroster mode for blowing air in the vicinity of the front window of the vehicle, is selected, the blowing rate can be increased to quickly heat such areas. Stated otherwise, by reducing the influence of ventilation resistance by bending the passage, even without increasing the rotation of the first blower unit 206, the blowing rate of air in the heat mode for blowing air in the vicinity of the feet of passengers, or in the defroster mode for blowing air in the vicinity of the front window of the vehicle, can be increased. Furthermore, since the flow path from the fifth front passage 250 to the sixth front passage 256 is shortened, loss of heat from the warm air heated by the heater core 210 is reduced as much as possible when air is blown from the defroster blow-out port (defroster opening) 260 to the front seats, resulting in increased heating performance in the heat mode and the defroster mode. Moreover, by arranging the sub-defroster damper 254 upwardly of the heater core 210, and arranging the defroster blow-out port 260 further upwardly thereof, the flow of warm air is made substantially linear, such that the ventilation resistance when the warm air flows therethrough can be reduced even more.

The sixth front passage 256 communicates with the downstream side of the third front passage 234 through the forwardly disposed opening, and communicates with a seventh front passage 258 through the rearwardly disposed opening. Further, a defroster blow-out port 260 opens upwardly of the sixth front passage 256, and a defroster damper 262 is disposed rotatably facing the defroster blow-out port 260. The defroster damper 262 switches the blowing state of air that is supplied to the sixth front passage 256 from the third and fifth front passages 234, 250 when air is blown to the defroster blow-out port 260 and to the seventh front passage 258, and further is provided to enable the blowing rate thereof to be adjusted.

More specifically, with the vehicular air conditioning apparatus 200, the first vent blow-out port 242 and the defroster blow-out port 260 open upwardly of the casing 202, and are disposed substantially centrally in the casing 202, with the first vent blow-out port 242 being positioned on the forward side (in the direction of arrow A), and the defroster blow-out port 260 being positioned rearwardly thereof (in the direction of arrow B) with respect to the first vent blow-out port 242.

The seventh front passage 258 communicates with a first heat blow-out port (not shown) for blowing air through a heat passage 264 in the vicinity of the feet of passengers riding in the front seats (driver's seat, passenger seat) of the vehicle compartment.

Figure 4:
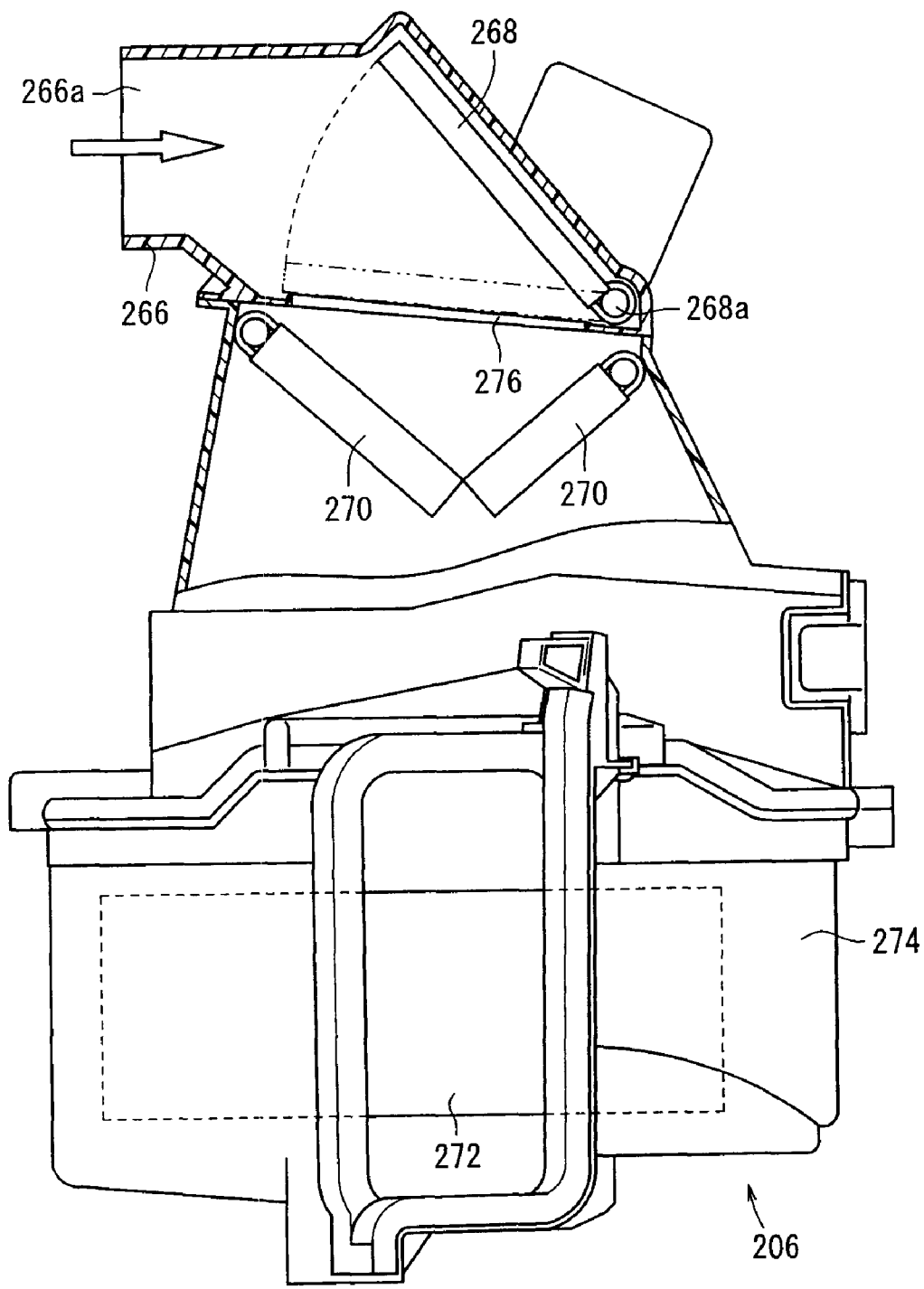
FIG. 4 is an enlarged side view of a first blower unit in the vehicular air conditioning apparatus shown in FIG. 1.

As shown in FIGS. 1 and 4, the first blower unit 206 comprises an adjustment damper 268 disposed in the inlet of a duct 266 for introducing exterior air, for adjusting the intake rate of air taken in through the duct 266, an intake damper 270 disposed on a downstream side of the adjustment damper 268 for carrying out switching between interior and exterior air, and a first blower fan 272 for supplying air taken in from the duct 266 or the like to the interior of the casing 202. A blower case 274 in which the first blower fan 272 is accommodated is connected with the connection duct 204, which in turn is connected to the first intake port 222, and communicates with the interior of the casing 202. Rotation of the first blower fan 272 is controlled by a fan motor (not shown), which is driven by supply of electrical power thereto.

The adjustment damper 268 is disposed to face toward an opening 266a of the duct 266, and is openable and closeable under an urging action of a non-illustrated rotary power source via a support shaft (axis of rotation) 268a, which is supported on the downstream side of the duct 266. Stated otherwise, the adjustment damper 268 is disposed so as to confront the direction in which the exterior air is introduced. In addition, through rotation of the adjustment damper 268 by a predetermined angle upwardly from the closed condition blocking a communication hole 276 (the state shown by the two-dot-dash line in FIG. 4), which opens on an upper surface of the blower case 274, the flow rate of intake air to the side of the blower case 274 through the adjustment damper 268 and the communication hole 276 is adjusted. Moreover, an end on the opposite side of the adjustment damper 268 from the support shaft 268a is arranged to face toward and confront the air that is drawn in from the duct 266. More specifically, since the flow of air that is drawn in from the duct 266 is substantially parallel with the adjustment damper 268, air pressure is not received in a direction perpendicular with respect to the flat surface of the adjustment damper 268, and the adjustment damper 268 can be rotated without requiring a large driving force. In this case, the direction of extension of the duct 266 and the adjustment damper 268 may be arranged substantially in parallel.

For example, the running speed of the vehicle is detected by a vehicle speed sensor (not shown), and by adjusting the rotation angle (rotation amount) of the adjustment damper 268 based on the running speed, the flow rate of air that is introduced into the casing 202 from the exterior of the vehicle through the duct 266 is controlled to attain a fixed rate independently of the vehicle running speed.

More specifically, when the vehicle runs at a high speed, since the rate of air taken in from the duct 266 increases, the opening degree of the adjustment damper 268 is made smaller, and the flow rate of air (external air) supplied to the side of the blower case 274 is restricted. On the other hand, when the vehicle runs at a low speed, since the rate of air taken in from the duct 266 decreases compared to when the vehicle runs at a high speed, the opening degree of the adjustment damper 268 is controlled to become larger, so that a greater amount of air (external air) is taken into the interior of the blower case 274.

The relationship between the vehicle velocity and the angle of rotation of the adjustment damper 268 may be determined from measurement data, or may also be determined by a numerical analytic method from a value Cd representing a drag coefficient of the air, or a Bernoulli equation or the like, which represents a law of energy conservation relating to the fluid.

As described above, air that is supplied from the first blower unit 206 is introduced to the interior of the casing 202 through the connection duct 204 and the first intake port 222, and under rotating actions of the first air mixing damper 238, the vent damper 244, the defroster damper 262, the temperature control dampers 252a, 252b and the sub-defroster damper 254, which collectively constitute the damper mechanism 214, air is supplied selectively to the defroster blow-out port 260, the first vent blow-out port 242 and the heat passage 264, which are capable of blowing air to the front and middle seats inside the vehicle through the first through seventh front passages 224, 232, 234, 236, 250, 256 and 258.

Figure 8:
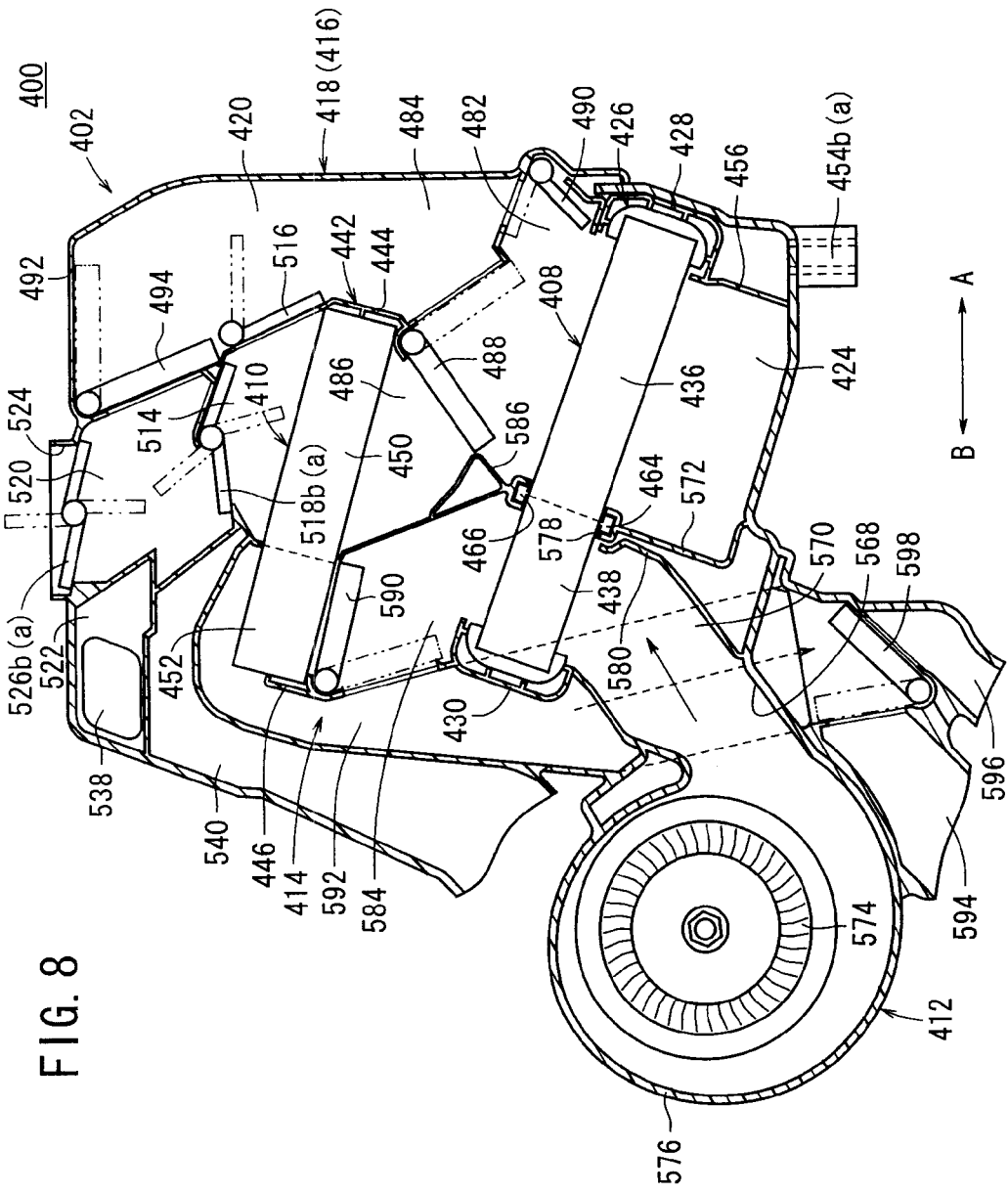
FIG. 8 is a cross sectional view taken along line VIII-VIII of FIG. 6.
Figure 9:
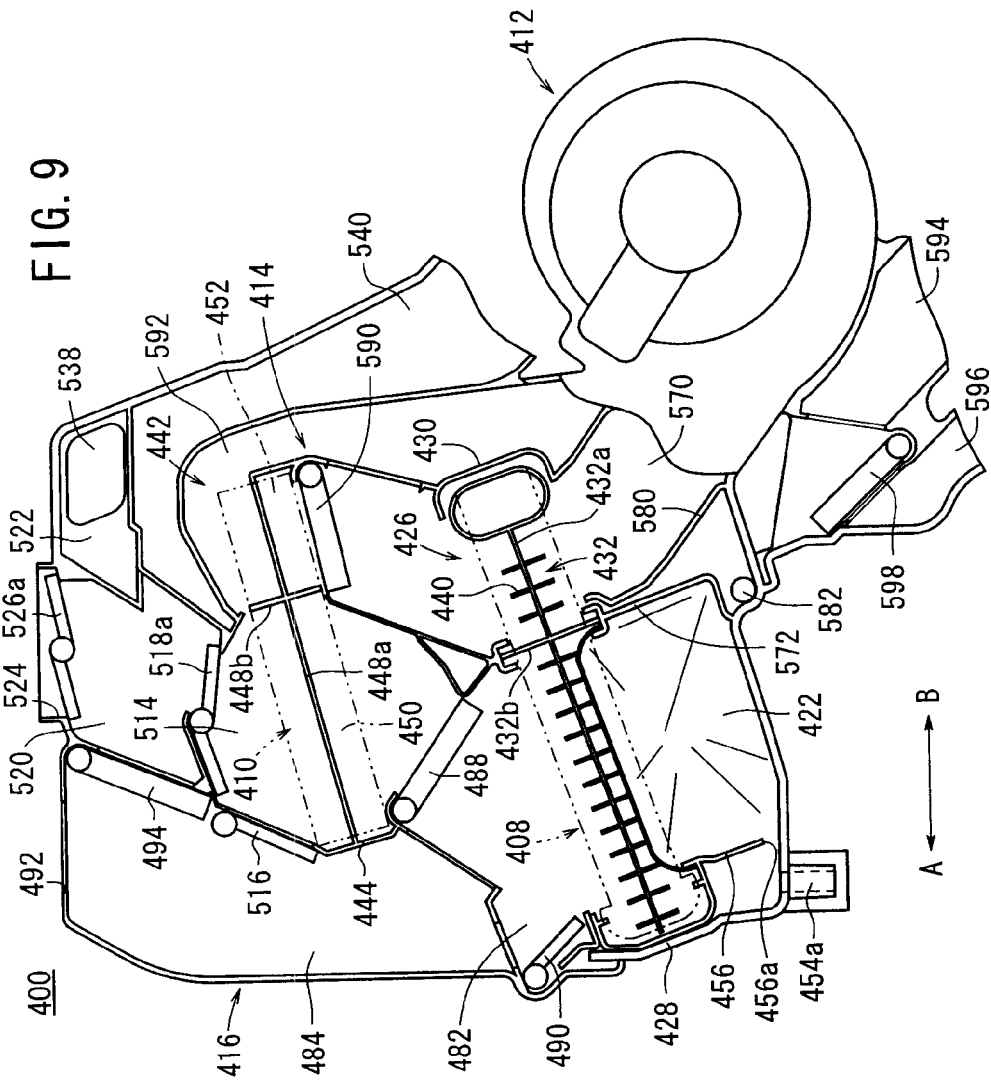
FIG. 9 is a side view of a first divided casing as seen from an interior side thereof.
Figure 10:
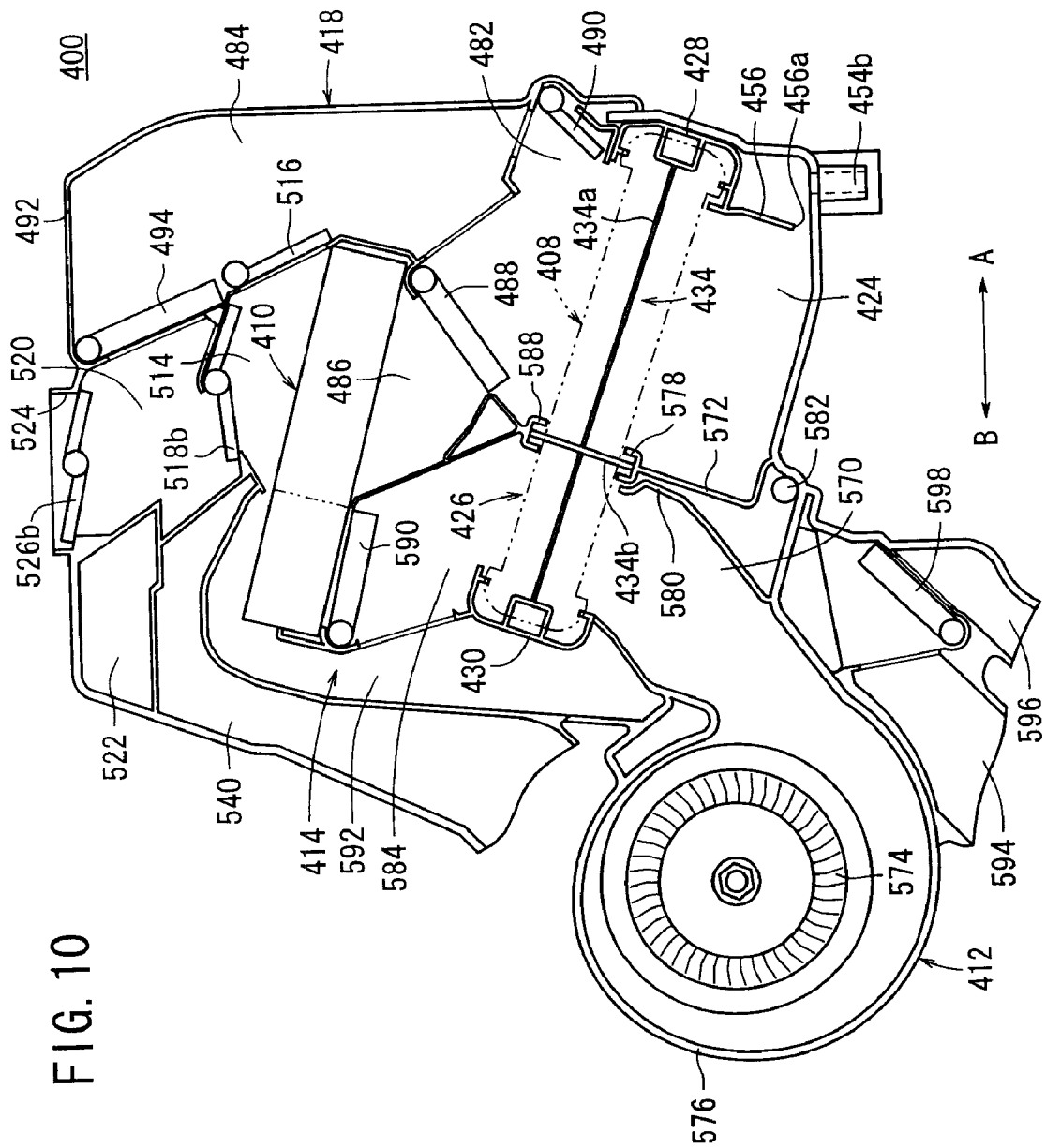
FIG. 10 is a side view of a second divided casing as seen from an interior side thereof.

On the other hand, in a lower portion of the casing 202, as shown in FIG. 8, a second intake port 278 through which air is supplied from the second blower unit 212 is formed at a rearward side (in the direction of arrow B) perpendicular to the first intake port 222. The second intake port 278 opens at a position on an upstream side of the evaporator 208, and communicates with the first rear passage 280, and further, is formed alongside the first intake port 222 via the first rear passage 280 and a first dividing wall 281.

The second blower unit 212 includes a second blower fan 282, which takes in air (internal air) from the vehicle compartment and supplies the intake air into the interior of the casing 202. A blower case 284 in which the second blower fan 282 is accommodated is connected to the second intake port 278 of the casing 202, and communicates with the first rear passage 280. In the same manner as the first blower fan 272, rotation of the second blower fan 282 is controlled by a fan motor (not shown), which is driven by supply of electrical power thereto.

On a downstream side of the first rear passage 280, a second rear passage 286 is formed through which air having passed through the second cooling section 230 of the evaporator 208 is supplied. The second rear passage 286 is separated from the second front passage 232 by a second dividing wall 287, wherein the second dividing wall 287 extends to a partition means of the evaporator 208. Owing thereto, on the downstream side of the evaporator 208 as well, air that passes through the first rear passage 280 and flows to the second cooling section 230 of the evaporator 208 does not intermix mutually with air that passes through the first front passage 224 and flows to the first cooling section 228 of the evaporator 208.

Figure 3:
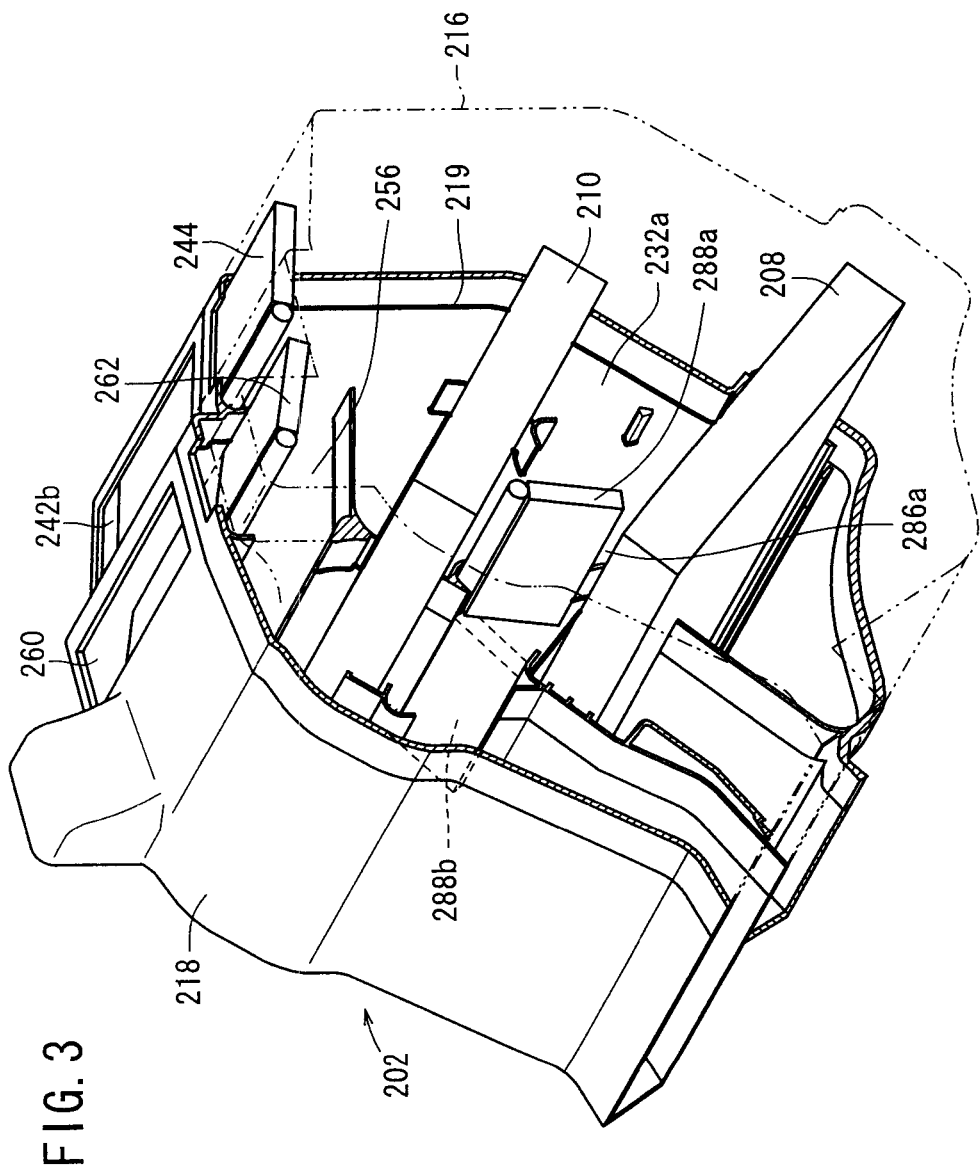
FIG. 3 is a cross sectional perspective view taken along line III-III of FIG. 1.
Figure 5:
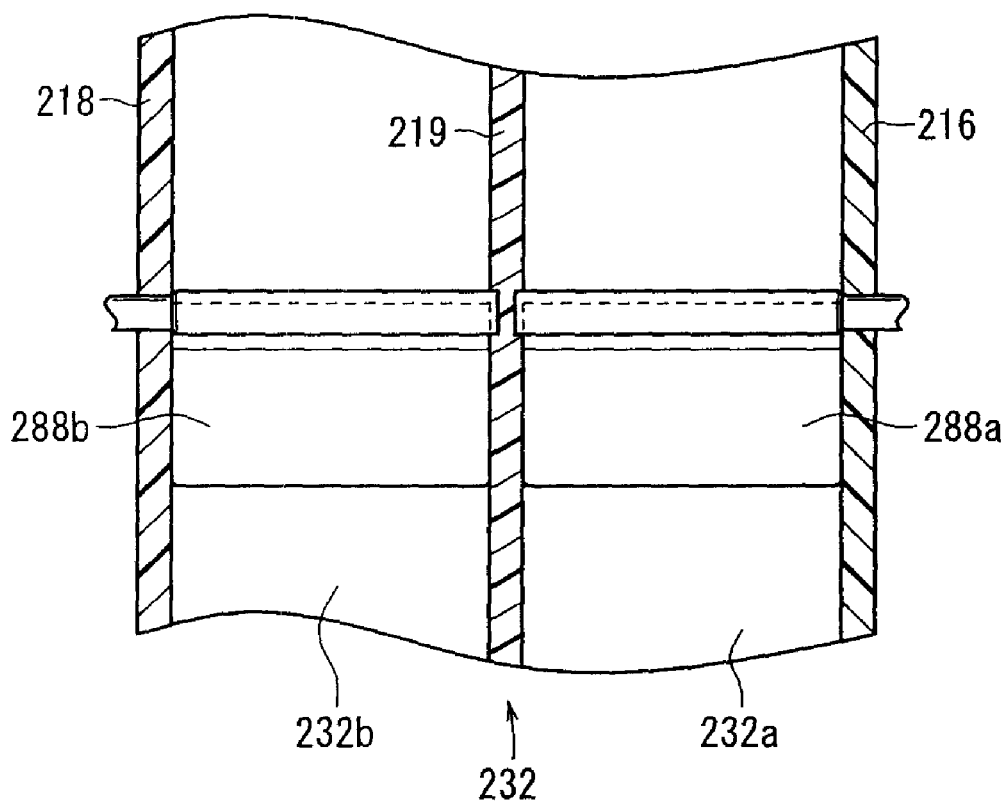
FIG. 5 is a partial cross sectional view taken along line V-V of FIG. 2.

Herein, as shown in FIG. 3, the second rear passage 286 and the second front passage 232 are separated respectively on sides of the first and second divided casings 216, 218 about a center plate 219, which is disposed in the center of the casing 202, thereby forming a second rear passage 286a and a second rear passage 286b, a second front passage 232a and a second front passage 232b, and a first vent blow-out port 242a and a first vent blow-out port 242b. Furthermore, as shown in FIG. 5, a pair of communication switching dampers 288a, 288b, which are capable of switching communication states with the second front passage 232a and the second front passage 232b, are disposed in the second rear passage 286a and the second rear passage 286b, wherein one of the communication switching dampers 288a is rotatably controlled separately and independently from the other communication switching damper 288b.

In addition, by rotation of the pair of communication switching dampers 288a, 288b, the second rear passage 286 for blowing air to the middle and rear seats in the vehicle compartment and the second front passage 232 for blowing air to the front seats in the vehicle compartment are brought into mutual communication with each other. Together therewith, by changing, respectively, the rotation amount of one of the communication switching dampers 288a and the rotation amount of the other of the communication switching dampers 288b, for example, the blowing rate of air blown to the passenger seat side of the front seats through the second front passage 232a and from the first vent blow-out port 242a, and the blowing rate of air blown to the driver's seat side of the front seats through the second front passage 232b and from the first vent blow-out port 242a, as well as the blowing temperatures thereof, can be controlled separately from each other.

On a downstream side from the second rear passage 286, a third rear passage 290 facing the heater core 210 is formed. The third rear passage 290 opens onto a side of the heater core 210, and further, opens alongside a fourth rear passage 292 adjacent thereto. In addition, a second air mixing damper 294, which mixes at a predetermined mixing ratio cool air and warm air supplied to the third rear passage 290, to thereby form mixed air, is disposed rotatably in the third rear passage 290. The second air mixing damper 294 switches the communication state between the third rear passage 290 and the upstream or downstream side of the fourth rear passage 292, which is connected to a downstream side of the heater core 210. Consequently, by rotating the second air mixing damper 294, cool air that is cooled by the evaporator 208 and supplied to the third rear passage 290 and warm air that is heated by the heater core 210 and which flows through the fourth rear passage 292 are mixed at a predetermined mixing ratio within the fourth rear passage 292, and are blown out therefrom.

In other words, an intermediate location of the fourth rear passage 292 functions as a mixing section for mixing warm air and cool air, which is then blown out to the middle seats and rear seats in the vehicle compartment.

The fourth rear passage 292, after curving around so as to circumvent the end portion of the heater core 210, extends downwardly while curving to avoid an upper part of the second blower unit 212. Additionally, a downstream side of the fourth rear passage 292 communicates with the fifth and sixth rear passages 296, 298 at a branching location of the fifth and sixth rear passages 296, 298, at which a rotatable mode switching damper 300 is disposed. By rotating the mode switching damper 300, the communication state of the fourth rear passage 292 with the fifth or sixth rear passages 296, 298 is switched.

The fifth and sixth rear passages 296, 298 extend respectively in the rearward direction (the direction of arrow B) of the vehicle. The fifth rear passage 296 communicates with a second vent blow-out port (not shown), which serves to blow air in the vicinity of faces of passengers in the middle seats of the vehicle. On the other hand, the sixth rear passage 298 communicates with second and third heat blow-out ports (not shown) that serve to blow air in the vicinity of the feet of passengers in the middle and rear seats.

More specifically, air that is supplied from the second blower unit 212 is introduced to the interior of the casing 202 through the second intake port 278. The air then is selectively supplied to a second vent blow-out port, and to the second and third heat blow out ports (not shown), which are capable of blowing air to the middle seats and rear seats in the vehicle, through the first through sixth rear passages 280, 286, 290, 292, 296, 298, under rotary actions of the second air mixing damper 294 and the mode switching damper 300 that constitute the damper mechanism 214.

Moreover, because the aforementioned second to seventh front passages 232, 234, 236, 250, 256, 258 and the second rear passage 286 are divided in half at a substantially central portion of the casing 202 by the center plate 219, the second to seventh front passages 232, 234, 236, 250, 256, 258 and the second rear passage 286 are disposed respectively in the interiors of the first and second divided casings 216, 218.

The vehicular air conditioning apparatus 200 according to the first embodiment of the present invention is basically constructed as described above. Next, explanations shall be made concerning operations and effects of the present invention.

First, when operation of the vehicular air conditioning apparatus 200 is started, the first blower fan 272 of the first blower unit 206 is rotated upon supply of electricity thereto, and air (interior or exterior air) that is taken in through the duct 266 is supplied to the first front passage 224 of the casing 202 through the connection duct 204. Simultaneously, air (interior air) that is taken in by rotation of the second blower fan 282 of the second blower unit 212 upon supply of electricity with respect to a non-illustrated rotary drive source is supplied to the first rear passage 280 from the blower case 274 while passing through the second intake port 278. In the following descriptions, the air supplied to the interior of the casing 202 by the first blower fan 272 shall be referred to as "first air," and the air supplied to the interior of the casing 202 by the second blower fan 282 shall be referred to as "second air."

The first air and the second air supplied to the interior of the casing 202 are each cooled by passing respectively through the first and second cooling sections 228, 230 of the evaporator 208, and flow respectively as chilled air to the second front passage 232 and the second rear passage 286, in which the first air mixing damper 238 and the communication switching dampers 288a, 288b are disposed. In this case, because the interior of the evaporator 208 is divided into the first cooling section 228 and the second cooling section 230 by a non-illustrated partitioning means, the first air and the second air do not mix with one another.

Herein, for example, in the case that a vent mode is selected by a vehicle occupant for blowing air in the vicinity of the faces of passengers, due to the first air mixing damper 238 blocking communication between the second front passage 232 and the fourth front passage 236, the first air (cooled air) flows from the second front passage 232 and through the third front passage 234. In this case, since it is unnecessary for warm air that is supplied to the fifth front passage 250 to be mixed with respect to the cool air in the third front passage 234, the temperature control dampers 252a, 252b are rotated so as to be substantially parallel with the third front passage 234, thereby blocking communication between the fifth front passage 250 and the third front passage 234. In addition, since the vent damper 244 is rotated and communication between the third front passage 234 and the sixth front passage 256 is blocked, the first air (cooled air) that flows into the third front passage 234 is blown out from the opened first vent blow-out port 242 in the vicinity of the faces of passengers in the front seats in the vehicle compartment.

On the other hand, since the communication switching dampers 288a, 288b block communication between the second front passage 232 and the second rear passage 286, the second air (cooled air) flows from the second rear passage 286 and to the third rear passage 290. Furthermore, because the second air mixing damper 294 blocks the flow of second air to the heater core 210, the second air (cooled air) flows from the third rear passage 290, passing through the fourth rear passage 292, and to the downstream side. Additionally, under a switching action of the mode switching damper 300, second air (cooled air) that passes through the fifth rear passage 296 is blown from a second vent blow-out port (not shown) in the vicinity of the faces of passengers in the middle seats in the vehicle compartment.

Further, for example, in the vent mode, in the case that the vehicle compartment is to be cooled rapidly, the temperature control dampers 252a, 252b are rotated to become substantially parallel with the third front passage 234 and to block communication between the fifth front passage 250 and the third front passage 234. As a result, cooled air in the third front passage 234 can be supplied to the first vent blow-out port 242 without being raised in temperature. In addition, because the temperature control dampers 252a, 252b suppress flow passage resistance when cool air flows through the third front passage 234, low electrical power consumption of the first blower fan 272 is realized, along with reducing noise. Furthermore, the cooling vent damper 240, by establishing communication between the second front passage 232 and the third front passage 234, increases the blowing rate of the first air (cooled air) that flows from the second front passage 232 to the third front passage 234, thereby enabling the vehicle compartment to be cooled rapidly by the first air, which is blown out from the first vent blow-out port 242 and the second vent blow-out port (not shown).

Next, in the case that a bi-level mode is selected for blowing air in the vicinity of faces and feet of passengers in the vehicle compartment, the first air mixing damper 238 is rotated somewhat more toward the side of the third front passage 234 than the position thereof during the aforementioned vent mode. Furthermore, the temperature control dampers 252a, 252b are rotated, whereupon air heated by the heater core 210 is supplied into the third front passage 234 from the fifth front passage 250. At this time, the vent damper 244 is positioned at an intermediate position between the first vent blow-out port 242 and the opening of the sixth front passage 256, while the defroster blow-out port 260 is blocked by the defroster damper 262.

Further, one end of the temperature control dampers 252a, 252b, which are made up of butterfly valves, projects about the support shaft toward the side of the third front passage 234 (in the direction of arrow A), whereas the lower end side thereof is rotated to project toward the side of the fifth front passage 250 (in the direction of arrow B), and is tilted at a predetermined angle such that the third front passage 234 side thereof is inclined upwardly, and the fifth front passage 250 side thereof is inclined downwardly. Owing thereto, warm air is guided to the rearward side in the third front passage 234 along the temperature control dampers 252a, 252b, and the warm air, without being mixed with cooled air, is supplied to the heat passage 264 from the opened sixth front passage 256 and through the seventh front passage 258, and then is blown out in the vicinity of the feet of passengers riding in the front seats in the vehicle compartment from a first heat blow-out port (not shown).

On the other hand, because the first vent blow-out port 242 is disposed upwardly of the third front passage 234, a portion of the first air (cooled air) that passes through the evaporator 208 and is supplied from the second front passage 232 to the third front passage 234 is blown in the vicinity of the faces of passengers directly from the first vent blow-out port 242, without being mixed with the heated air.

More specifically, in the bi-level mode, because warm air can be guided suitably by the temperature control dampers 252a, 252b effectively to the side of the sixth front passage 256 that communicates with the first heat blow-out port (not shown), lowering in temperature of the warm air by mixing with cooled air can be suppressed. In addition, rising in temperature of the cooled air by mixing with the heated air can be suppressed as well. As a result, the temperature difference between the mixed air that is blown in the vicinity of faces of the passengers from the first vent blow-out port 242 and the mixed air that is blown in the vicinity of the feet of passengers from the first heat blow-out port is made greater, and comfort can be enhanced.

Furthermore, at the same time, the second air mixing damper 294 is rotated in a direction to separate slightly away from the heater core 210, and moreover, the mode switching damper 300 is rotated to an intermediate position in the interior of the fourth rear passage 292. Additionally, concerning the second air, warm air that is heated by the heater core 210, and cooled air that is supplied from the third rear passage 290 to the fourth rear passage 292 through the opening are mixed together. The mixed air, after passing through the second vent blow-out port (not shown) from the fifth rear passage 296, is blown out in the vicinity of faces of passengers riding in the middle seats in the vehicle compartment, and together therewith, after passing through the third and fourth heat blow-out ports (not shown) from the sixth rear passage 298, is blown out in the vicinity of the feet of passengers riding in the middle and rear seats in the vehicle compartment.

Moreover, the sub-defroster damper 254 may be rotated so as to establish communication between the fifth front passage 250 and the sixth front passage 256. In accordance therewith, first air is added, which passes through the heater core 210 and is supplied to the sixth front passage 256 via the third front passage 234, and since the first air can be supplied directly into the sixth front passage 256, it is possible to increase the blowing rate of warm air that is blown from the first heat blow-out port (not shown) in the vicinity of the feet of passengers riding in the front seats of the vehicle compartment. Stated otherwise, warm air that is blown in the vicinity of the feet of passengers can be supplied at a more stable temperature.

Next, in the case that a heat mode is selected for blowing air in the vicinity of the feet of passengers in the vehicle compartment, in comparison to the bi-level mode, the first air mixing damper 238 is rotated further to the side of the third front passage 234. Further, the temperature control dampers 252a, 252b are rotated somewhat to place the third front passage 234 and the fifth front passage 250 in communication. Furthermore, the cooling vent damper 240 blocks communication between the second front passage 232 and the third front passage 234, and together therewith, the vent damper 244 and the defroster damper 262 are rotated respectively to block the first vent blow-out port 242 and the defroster blow-out port 260.

Consequently, heated first air that has passed through the heater core 210 is supplied from the fifth front passage 250 to the third front passage 234. First air (cooled air) and first air (heated air) are mixed together in the third front passage 234, whereupon the mixed air flows rearwardly through the sixth and seventh front passages 256, 258, is supplied to the heat passage 264, and is blown out from the non-illustrated first heat blow-out port in the vicinity of the feet of passengers riding in the front seats in the vehicle compartment.

Further, similar to the case of the aforementioned bi-level mode, the sub-defroster damper 254 may be rotated to establish communication between the fifth front passage 250 and the sixth front passage 256. In accordance therewith, since heated air that has passed through the heater core 210 can be supplied directly into the sixth front passage 256, it is possible to increase the blowing rate of the first air that is blown from the first heat blow-out port (not shown).

On the other hand, the second air mixing damper 294 is rotated in a direction to separate further away from the heater core 210 compared to the case of the bi-level mode, and further, the mode switching damper 300 is positioned to block the fifth rear passage 296. Consequently, the second air (mixed air) made up of cooled air and heated air which is mixed in the fourth rear passage 292, after passing through the sixth rear passage 298 from the fourth rear passage 292, is supplied to the second and third heat blow-out ports (not shown), where it is blown in the vicinity of the feet of passengers riding in the middle and rear seats in the vehicle compartment.

Next, an explanation shall be made concerning a heat/defroster mode, in which air is blown in the vicinity of the feet of passengers in the vehicle compartment and in the vicinity of the front window for eliminating fog (condensation) from the front window. In the case that the heat/defroster mode is selected, the defroster damper 262 is rotated in a direction to separate from the defroster blow-out port 260, and together therewith, the first vent blow-out port 242 is blocked by the vent damper 244 (refer to the solid line in FIG. 2). As a result, a portion of the first air (mixed air), which is mixed in the third front passage 234 and the sixth front passage 256, is blown in the vicinity of the front window of the vehicle through the defroster blow-out port 260, while the other portion of the first air (mixed air), after passing through the sixth and seventh front passages 256, 258, is blown in the vicinity of the feet of passengers in the front seats in the vehicle compartment from the heat passage 264 and the first heat blow-out port (not shown).

On the other hand, in the heat/defroster mode, in the case that second air is blown to the middle and rear seats in the vehicle compartment, handling thereof is carried out in the same manner as the above-described heat mode, and therefore detailed descriptions of this aspect of the heat/defroster mode are omitted.

Lastly, an explanation shall be made concerning a defroster mode, in which blowing of air only in the vicinity of the front window is carried out for eliminating fog (condensation) from the front window. In this case, the first air mixing damper 238 and the cooling vent damper 240 block communication between the second front passage 232 and the third front passage 234, and the vent damper 244 is rotated to block the first vent blow-out port 242. Consequently, heated first air that has passed through the heater core 210 is supplied from the fifth front passage 250, past the third front passage 234, and to the sixth front passage 256. Additionally, since the defroster damper 262 is rotated and communication is blocked between the sixth front passage 256 and the seventh front passage 258, the first air (warm air) is supplied from the sixth front passage 256 to the opened defroster blow-out port 260, and is blown in the vicinity of the front window of the vehicle. In this case, the defroster mode can be handled by blowing the first air only, which is supplied from the first blower unit 206, without driving the second blower unit 212.

Further, as mentioned above, under a switching action of the communication switching dampers 288a, 288b, by placing the second rear passage 286 and the second front passage 232 in communication, second air that is supplied from the second blower unit 212 can also be used for carrying out the defroster mode, by supplying the second air to the second front passage 232.

Still further, as mentioned above, by rotating the sub-defroster damper 254 in a direction to separate away from the sixth front passage 256, and thus directly placing the fifth front passage 250 and the sixth front passage 256 in communication, heated air that has passed through the heater core 210 may be supplied directly into the sixth front passage 256 without flowing through the third front passage 234. Consequently, the amount of warm air that is introduced to the sixth front passage 256 can be increased, and the blowing rate of air that is blown out from the defroster blow-out port 260 can be increased advantageously.

In the foregoing manner, according to the first embodiment, in a vehicular air conditioning apparatus and a temperature control method performed by the vehicular air conditioning apparatus having a temperature control damper 252 for adjusting the temperature of air that is blown into the vehicle compartment, the temperature control damper 252 deflects the flow of air delivered from the heater core 210 toward a direction in which the evaporator 208 is installed. The vehicular air conditioning apparatus thus has a function whereby the flow of air delivered from the evaporator 208 and the flow of air delivered from the heater core 210 are oriented mutually in opposite directions, that is, mixing of cool air and warm air can be carried out favorably.

Herein, the first vent blow out port 242 is disposed on the engine room side of the casing 202, and the defroster blow out port 260 is disposed on the vehicle compartment side of the casing 202. At a time when the evaporator 208 is operated maximally, the temperature control damper 252 is closed completely. As a result, the degree of curving of the third front passage 234 from the evaporator 208 to the first vent blow out port 242 is decreased, and further, ventilation resistance due to bulging of the temperature control damper 252 is decreased significantly. Owing thereto, flow passage resistance in the vicinity of the first vent blow out port 242 at a time of maximum cooling is decreased, thereby enabling energy conservation and reduction in noise.

Furthermore, because the third front passage 234 establishes communication between the evaporator 208 and the first vent blow out port 242, according to the first embodiment, the temperature of air blown out from the first vent blow out port 242 upwardly of the casing 202, and the temperature of air blown out from the first heat blow out port downwardly of the casing 202 can be controlled separately.

Still further, because the temperature control damper 252 is constituted by a butterfly valve, the warm air delivered from the heater core 210 is blown in a branching or bifurcated manner by the temperature control damper 252 in two vertical directions within the third front passage 234. Owing thereto, two air flows, made up of a flow of air in which warm air and cold air are comparatively non-mixed, and a flow of air in which warm air and cold air are comparatively mixed, are capable of being delivered simultaneously. Thus, in the bi-level mode, a temperature difference between the temperature of air blown out from the first vent blow-out port 242 and the temperature of air blown out from the first heat blow-out port (not shown) can be made large.

Figure 6:
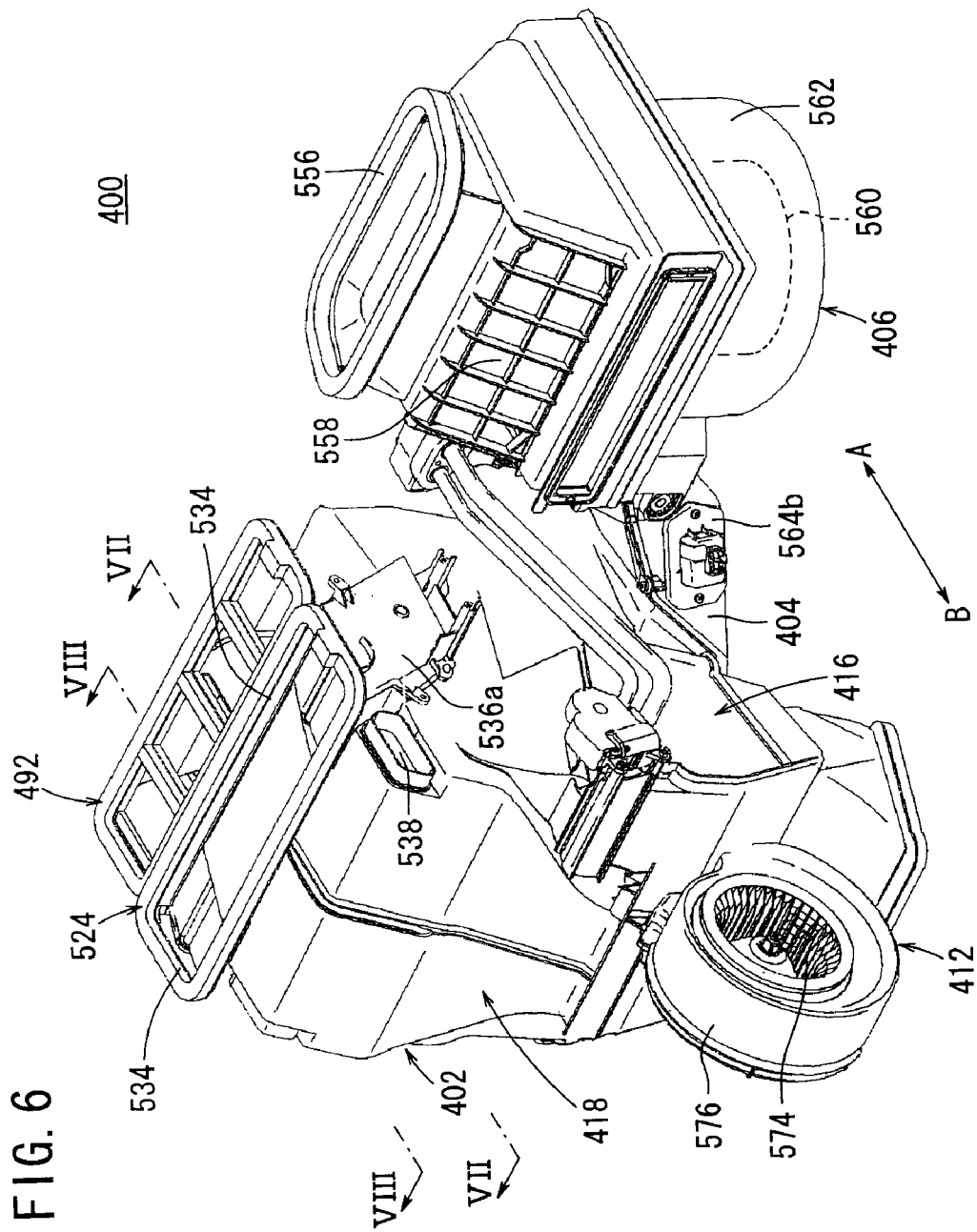
FIG. 6 is an external perspective view of a vehicular air conditioning apparatus according to a second embodiment of the present invention.
Figure 7:
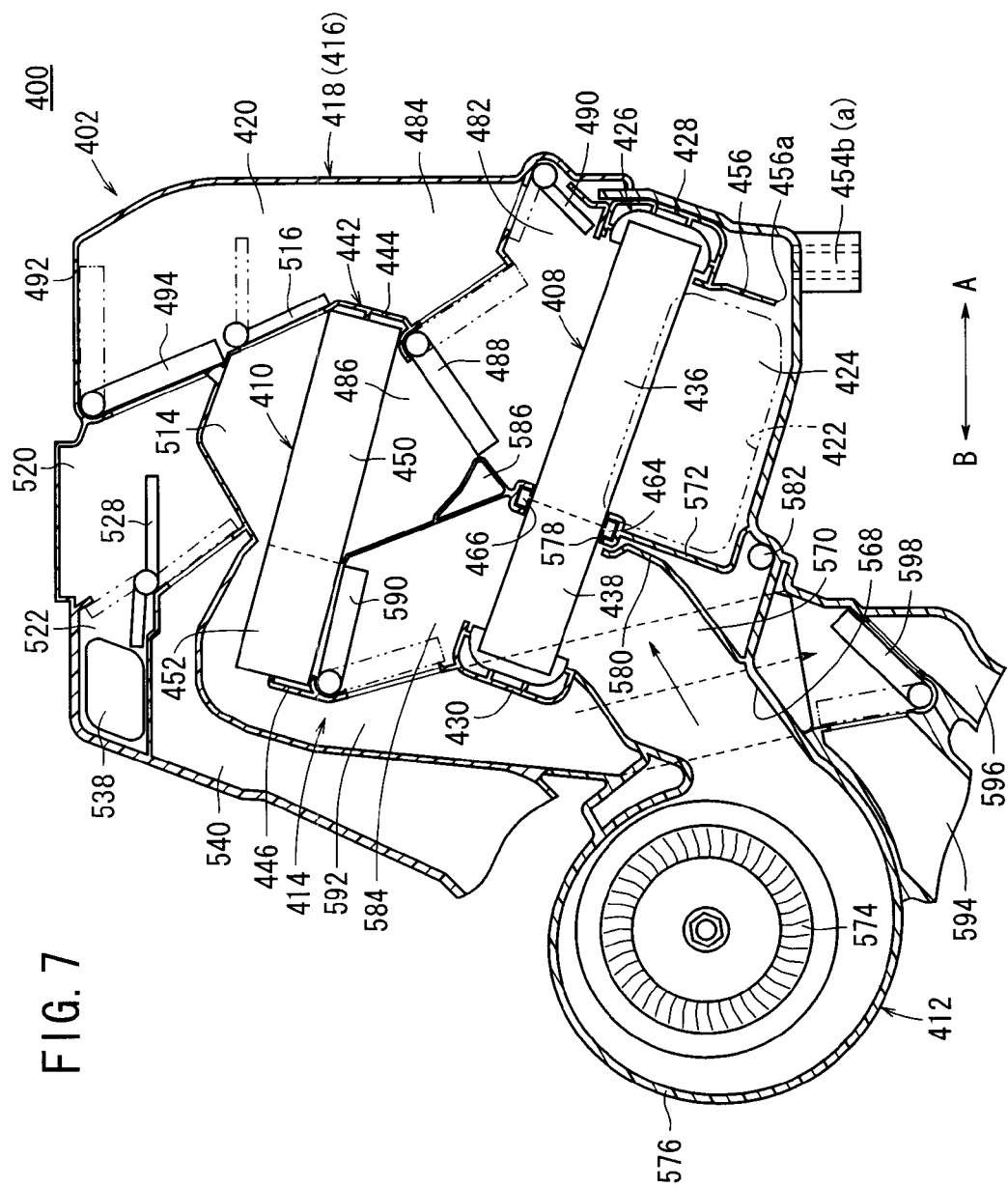
FIG. 7 is a cross sectional view taken along line VII-VII of FIG. 6.

Next, a vehicular air conditioning apparatus 400 for performing a temperature control method according to a second embodiment of the invention is shown in FIGS. 6 to 36. Further, FIG. 7 is a cross sectional view in a central portion (taken along line VII-VII in FIG. 6) along the widthwise direction of a vehicular air conditioning apparatus 400, whereas FIG. 8 is a cross sectional view of a region (taken along line VIII-VIII in FIG. 6) somewhat deviated to the side of the second divided casing 418 from the aforementioned central portion.

As shown in FIGS. 6 to 10, the vehicular air conditioning apparatus 400 includes a casing 402 constituted by respective air passages, a first blower unit (blower) 406 connected through a connection duct 404 to a side portion of the casing 402 for blowing air toward the front seats in the vehicle, an evaporator (cooling means) 408 arranged inside the casing 402 for cooling the air, a heater core (heating means) 410 for heating the air, a second blower unit (blower) 412 connected to a lower portion of the casing 402 for blowing air toward the middle seats and rear seats of the vehicle, and a damper mechanism 414 for switching the flow of air that flows through and inside each of the respective passages.

The casing 402 is constituted by first and second divided casings 416, 418 having substantially symmetrical shapes, wherein a center plate 420 (see FIG. 32) is disposed between the first divided casing 416 and the second divided casing 418. The connection duct 404 is connected on a lower side portion of the first divided casing 416, and a first intake port 422 is formed through which air is supplied from the first blower unit 406. The first intake port 422 communicates with a first front passage (first passage) 424 disposed on an upstream side of the evaporator 408. As easily understood from FIG. 6, the second blower unit 412 expands outwardly and is disposed at a joined region of the substantially symmetrical first divided casing 416 and second divided casing 418 that make up the casing 402, more specifically, at a center portion of the casing 402. Further, the second blower unit 412 is positioned inside a non-illustrated center console of the vehicle.

As shown in FIGS. 7 to 10, in the first and second divided casings 416, 418, an evaporator holder 426 is formed for maintaining the evaporator 408, which has a rectangular shape in cross section. The evaporator holder 426 is provided on a lower part of the casing 402 facing the first intake port 422. The evaporator holder 426 includes a first retaining member 428 that holds one end of the evaporator 408 that is disposed on the forward side (in the direction of arrow A) of the casing 402, and a second retaining member 430 that holds another end of the evaporator 408 that is disposed on the rearward side (in the direction of arrow B) of the casing 402. The first and second retaining members 428, 430 are formed with U-shapes in cross section, which open toward one another in mutually facing directions, and extend in the widthwise direction of the casing 402, from an inner wall surface of the first divided casing 416 to an inner wall surface of the second divided casing 418.

Further, because the first retaining member 428 confronts the second retaining member 430 and is disposed downwardly with respect to the second retaining member 430, the evaporator 408, which is retained by the first and second retaining members 428, 430, is disposed such that one end thereof in the forward direction of the vehicle (the direction of arrow A) is inclined downward at a predetermined angle with respect to the other end thereof.

Figure 11:
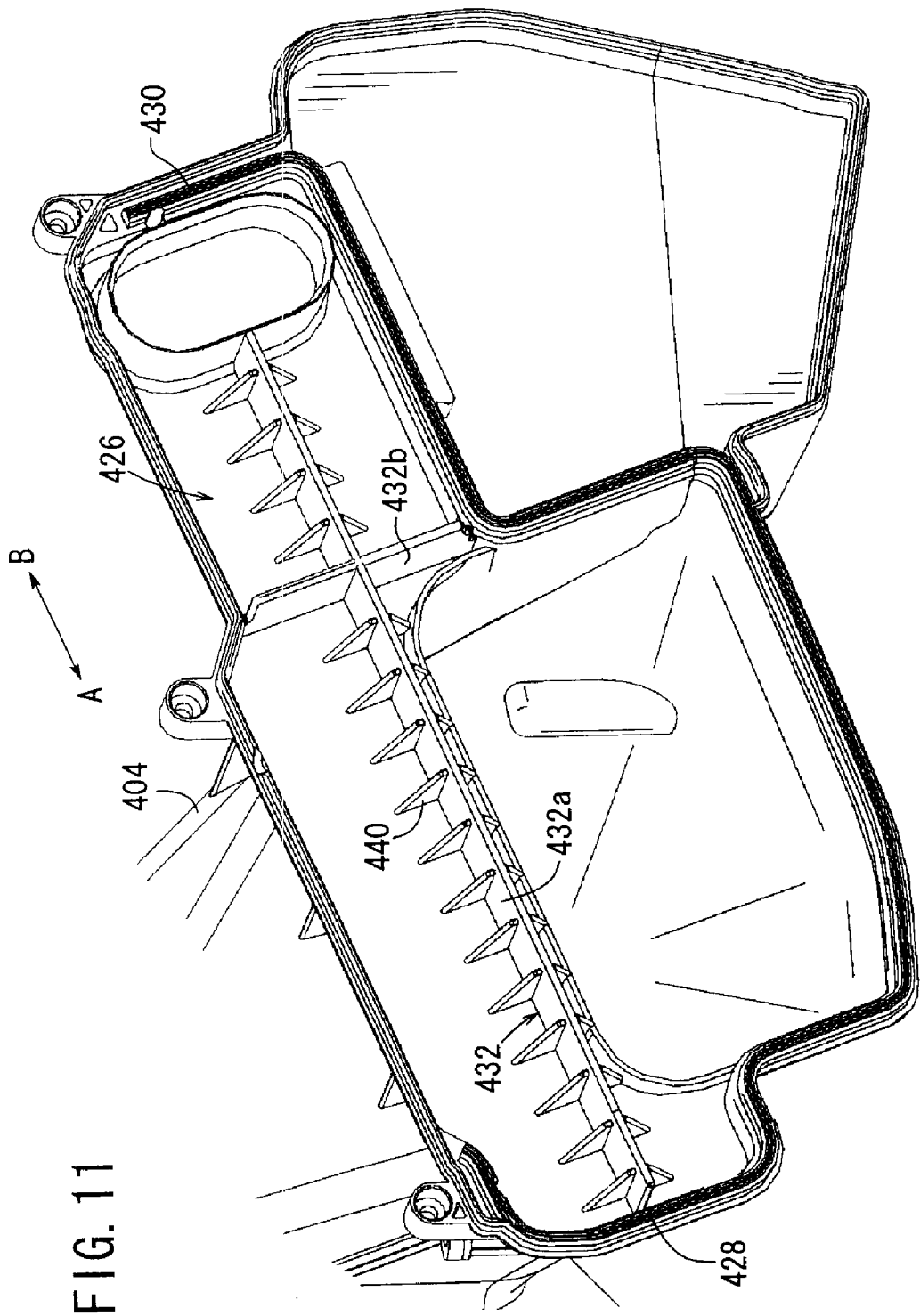
FIG. 11 is an enlarged perspective view of (an evaporator holder of) a connecting duct that fixes an evaporator connected with the first divided casing.
Figure 12:
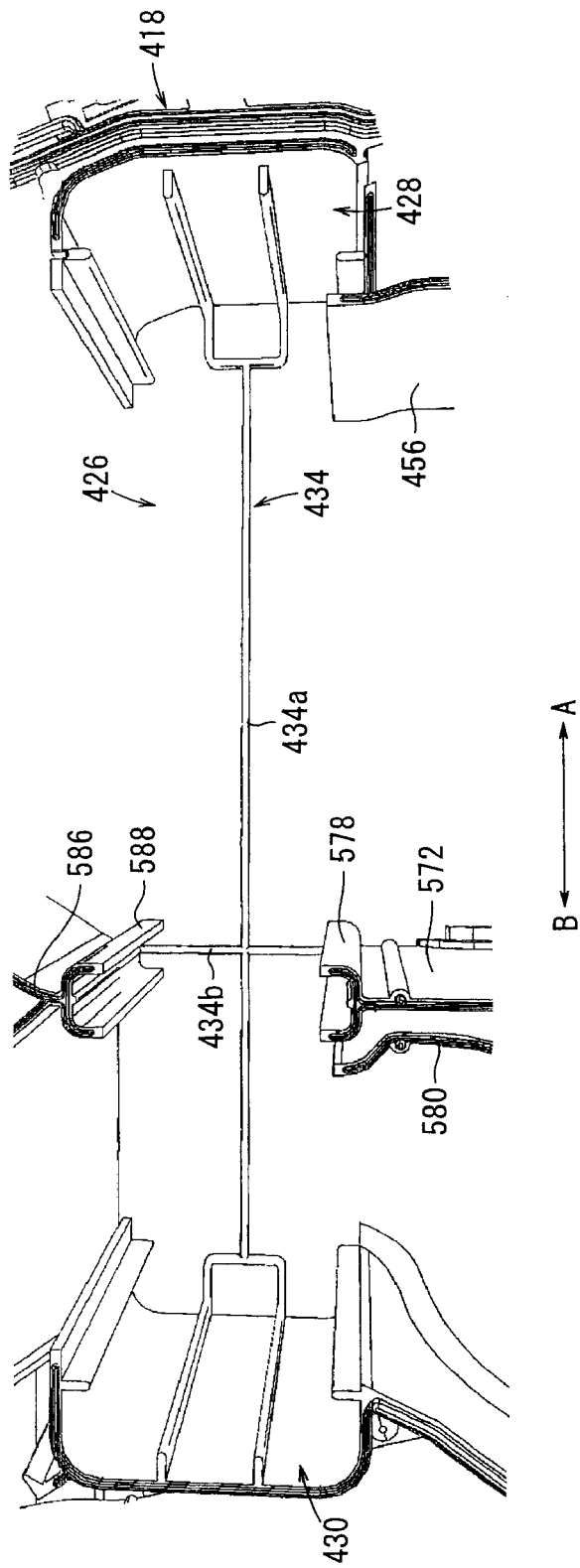
FIG. 12 is an enlarged side view of the evaporator holder, which is disposed on an inner wall surface of the second divided casing.
Figure 13:
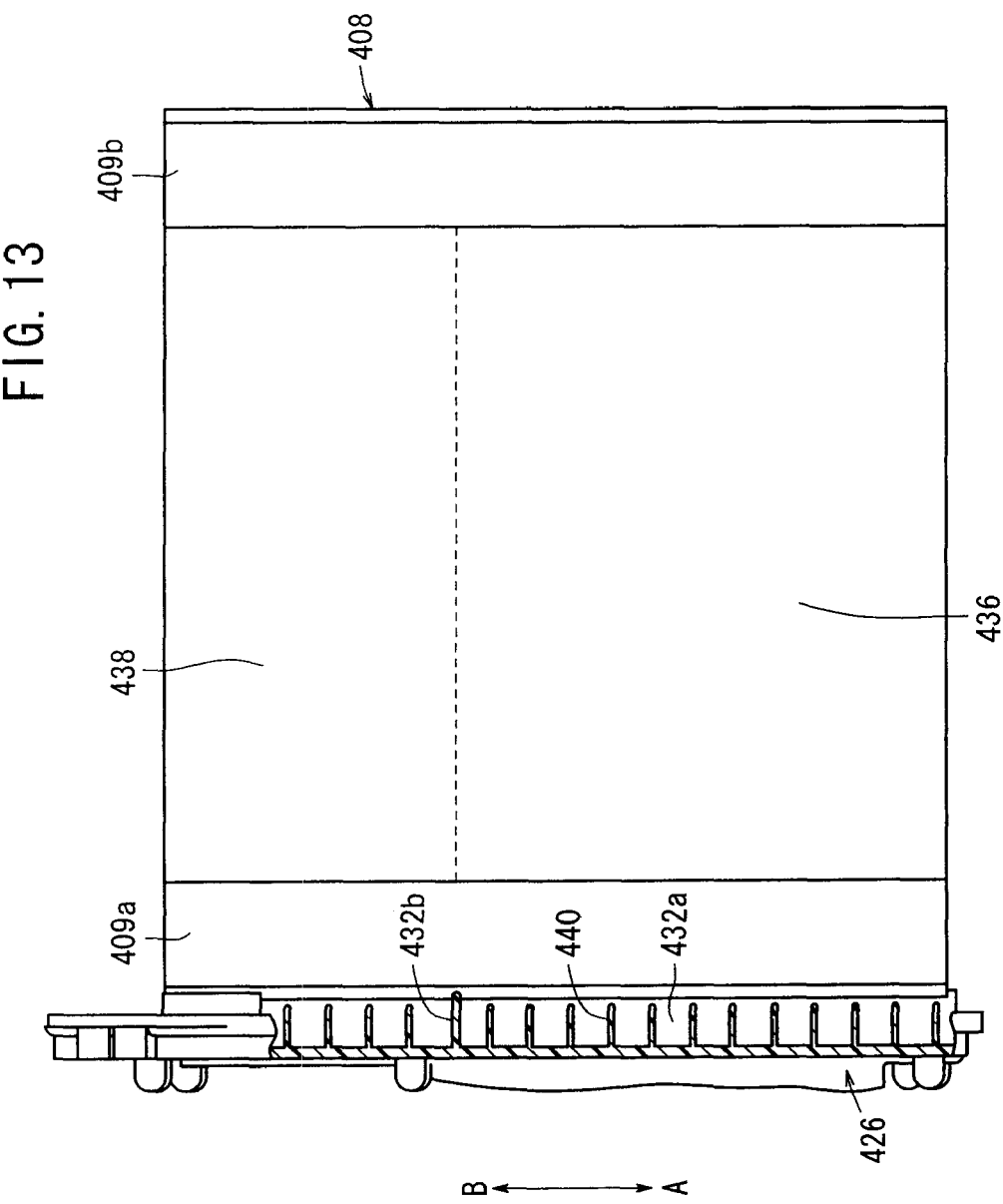
FIG. 13 is a plan view with partial omission showing an evaporator, which is retained on an inner wall surface of the first divided casing.
Figure 14:
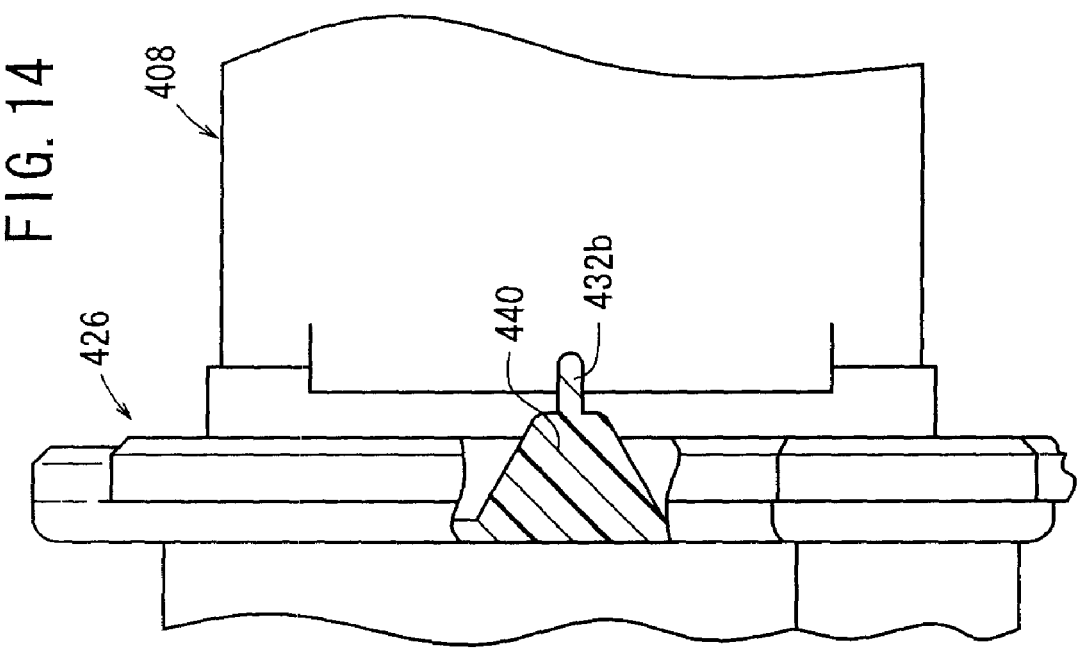
FIG. 14 is a partial enlarged side view of the evaporator of FIG. 13.

As shown in FIG. 11, a first rib (sealing means) 432, which projects a predetermined height from the inner wall surface at a position between the first retaining member 428 and the second retaining member 430, is formed on the inner wall surface of the first divided casing 416, wherein the first rib 432 abuts against one side surface of the evaporator 408. On the other hand, as shown in FIG. 12, a second rib (sealing means) 434, which projects a predetermined height from the inner wall surface of the second divided casing 418 at a position between the first retaining member 428 and the second retaining member 430, is formed on the inner wall surface thereof, confronting the first rib 432, wherein the second rib 434 abuts against the other side surface of the evaporator 408.

The first and second ribs 432, 434 are formed respectively with cross-like shapes, such that horizontal ribs 432a, 434a (second sealing portions) thereof, which extend from the first retaining member 428 to the second retaining member 430, abut roughly in the center of the evaporator 408 to divide the evaporator 408 in half in the thickness direction thereof. On the other hand, vertical ribs (first sealing portions) 432b, 434b, which are perpendicular to the horizontal ribs 432a, 434a, abut against a boundary portion in the evaporator 408 of a first cooling section 436 through which air supplied from the first blower unit 106 passes, and a second cooling section 438 through which air supplied from the second blower unit 412 passes (refer to FIG. 13). The vertical ribs 432b, 434b are disposed substantially parallel to the blowing direction of air that is supplied to the evaporator 408 from the first front passage 424 and the first rear passage 570. Stated otherwise, the horizontal ribs 432a, 432b face toward the first front passage 424 and the first rear passage 570 and are formed substantially parallel with the lower surface (supply surface) of the evaporator 408 on the upstream side thereof to which the air is supplied. Further, compared to the second rib 434, the first rib 432 is set to have a greater height from the inner wall surface of the first divided casing 416, and the horizontal rib 432a and vertical rib 432b are formed perpendicularly with respect to the inner wall surface.

More specifically, by abutment of the horizontal ribs 432a, 434a of the first and second ribs 432, 434 against side surfaces of the evaporator 408, air is prevented from flowing to the downstream side between inner wall surfaces of the first and second divided casings 416, 418 and the evaporator 408. On the other hand, by abutment of the vertical ribs 432b, 434b of the first and second ribs 432, 434 against the boundary portion of the first cooling section 436 and the second cooling section 438, air supplied from the first blower unit 406 is prevented from flowing through the side of the second cooling section 438 at times when the second blower unit 412 is halted, and conversely, air supplied from the second blower unit 412 is prevented from flowing through the side of the first cooling section 436 at times when the first blower unit 406 is halted.

Furthermore, on the inner wall surface of the first divided casing 416, a plurality of reinforcement ribs 440 are formed substantially parallel with the vertical ribs 432b. The reinforcement ribs 440 are disposed with respect to upper and lower surface sides of the horizontal rib 432a, and are formed with substantially triangular shapes in cross section, which taper in a direction away from the inner wall surface (see FIGS. 11 and 14).

Further, as shown in FIGS. 7 and 8, on the first and second divided casings 416, 418, a heater holder 442 is formed for maintaining a heater, which has a rectangular shape in cross section. The heater holder 442 is provided upwardly of the evaporator holder 426. The heater holder 442 includes a first retaining member 444 that holds one end of the heater core 410 that is disposed on the forward side (in the direction of arrow A) of the casing 402, and a second retaining member 446 that holds another end of the heater core 410 that is disposed on the rearward side (in the direction of arrow B) of the casing 402. The first retaining member 444 is formed to cover one end portion of the heater core 410, whereas the second retaining member 446 is formed to cover a lower half part only of the other end of the heater core 410. The first and second retaining members 444, 446 extend along the widthwise direction of the casing 402, from an inner wall surface of the first divided casing 416 to an inner wall surface of the second divided casing 418.

Further, because the first retaining member 444 confronts the second retaining member 446 and is disposed downwardly with respect to the second retaining member 446, the heater core 410, which is retained by the first and second retaining members 444, 446, is disposed such that one end thereof in the forward direction of the vehicle (the direction of arrow A) is inclined downward at a predetermined angle with respect to the other end thereof.

Figure 15:
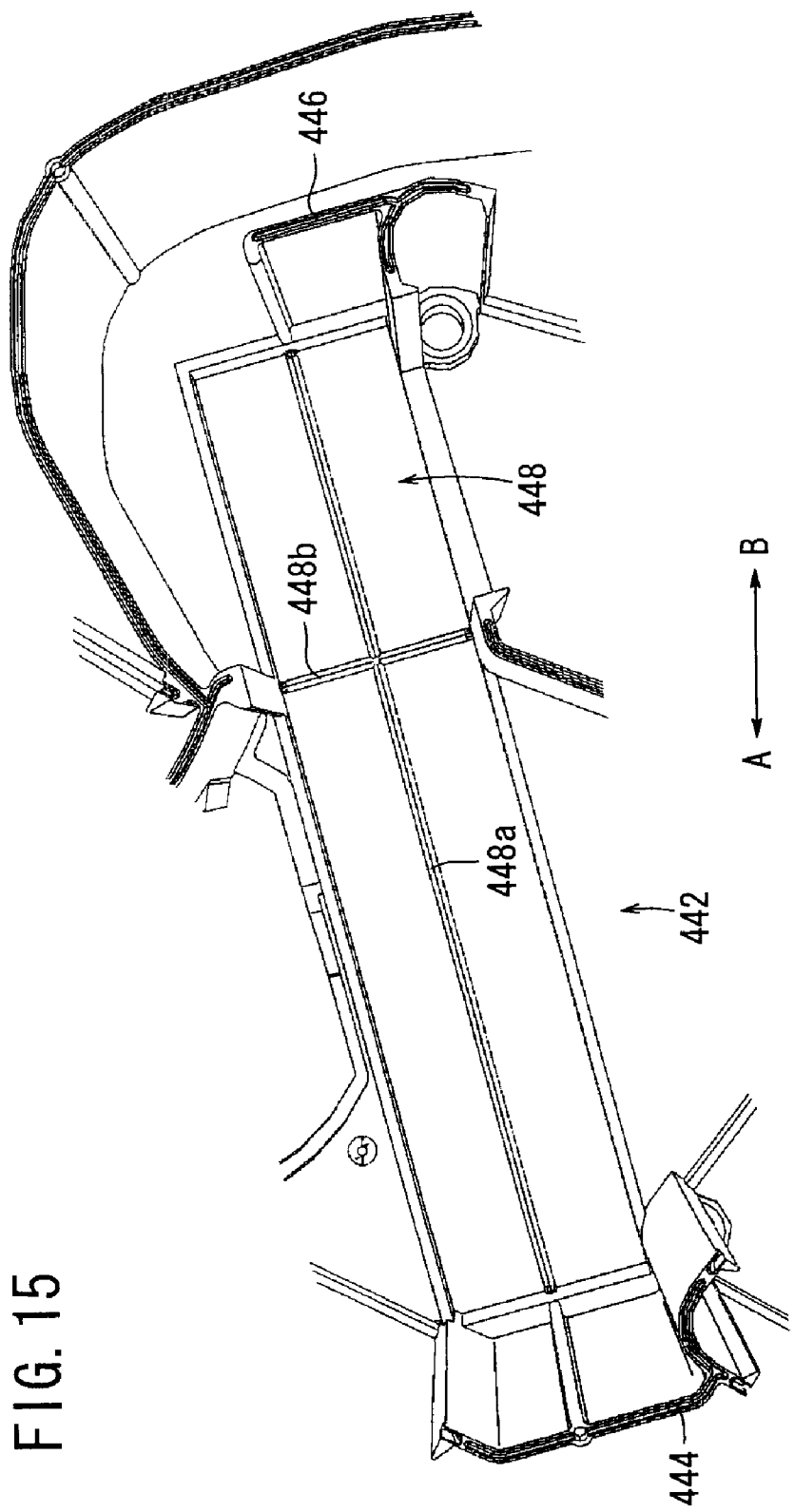
FIG. 15 is an enlarged perspective view of a heater holder disposed on an inside wall surface of the first divided casing.

Furthermore, as shown in FIG. 15, a rib 448, which projects a predetermined height from the inner wall surface at a position between the first retaining member 444 and the second retaining member 446, is formed on the inner wall surface of the first divided casing 416, such that the rib 448 abuts against one side surface of the heater core 410. The rib 448 is formed with a substantially cross-like shape, such that a horizontal rib 448*a* thereof, which extends from the first retaining member 444 to the second retaining member 446, abuts roughly in the center of the heater core 410 to divide the heater core 410 in half in the thickness direction thereof. On the other hand, a vertical rib 448*b*, which is perpendicular to the horizontal rib 448*a*, abuts against a boundary portion in the heater core 410 of a first heating section 450 through which air supplied from the first blower unit 406 passes, and a second heating section 452 through which air supplied from the second blower unit 412 passes (refer to FIG. 9). Further, in the second divided casing 418, a region thereof opens in a direction facing toward the heater core 410.

More specifically, by abutment of the horizontal rib 448*a* of the rib 448 against a side surface of the heater core 410, air is prevented from flowing to the downstream side between the inner wall surface of the first divided casing 416 and the heater core 410. At the same time, by abutment of the vertical rib 448*b* against the boundary portion of the first heating section 450 and the second heating section 452, air supplied from the first blower unit 406 is prevented from flowing through the side of the second heating section 452 at times when the second blower unit 412 is halted, and conversely, air supplied from the second blower unit 412 is prevented from flowing through the side of the first heating section 450 at times when the first blower unit 406 is halted.

Further, as shown in FIGS. 7 to 10, on the bottom portion of the casing 402, the first guide panel 456 is formed, which faces toward the first front passage 424 on a forward side (in the direction of arrow A) adjacent to the first drain ports 454*a*, 454*b*. The first guide panel 456 is arranged in an upstanding manner along the extending direction of the first front passage 424. An upper end part thereof extends to the vicinity of the lower surface of the evaporator 408, and is bent in a direction (the direction of arrow B) separating from the evaporator holder 426 that retains the evaporator 408.

Owing thereto, in the evaporator 408, for example, although water condensation is generated when air passing through the interior of the evaporator 408 is cooled, because one end side thereof is disposed to be inclined downwardly at a predetermined angle, moisture that is generated inside the evaporator 408 can be moved to one end side, i.e., the front side of the vehicle (in the direction of arrow A), along the lower surface of the evaporator 408.

Figure 16:
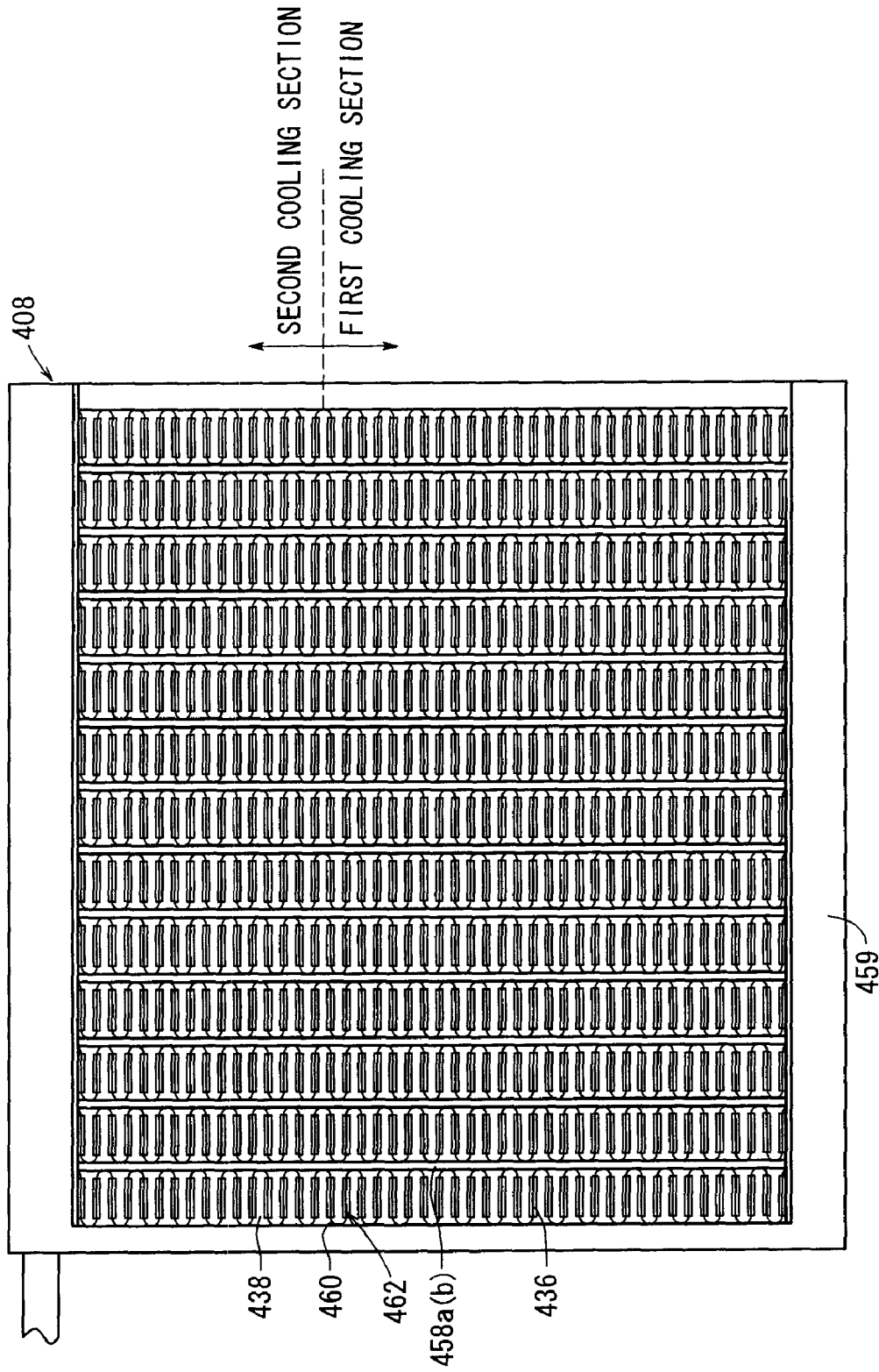
FIG. 16 is a plan view of an evaporator.

As shown in FIG. 16, in the evaporator 408, for example, tubes 458*a*, 458*b* are formed from thin plates of aluminum or the like, and fins 460, which are folded in a serpentine-like undulating shape, are disposed respectively between the stacked tubes 458*a*, 458*b*. On the fins 460, a plurality of louvers 462 are formed, which are cut out so as to be inclined at predetermined angles with respect to the planar surface of the fins 460. By causing a coolant medium to flow through the interior of the tubes 458*a*, 458*b*, air that passes through the louvers 462 and flows between the fins 460 is cooled by the coolant medium and is supplied to the downstream side as chilled air. At the evaporator 408, the paired tubes 458*a*, 458*b* are arrayed in parallel and arranged in two layers in the thickness direction of the evaporator 408.

Further, the evaporator 408 includes the first cooling section 436, which cools air supplied from the first blower unit 406, and the second cooling section 438, which cools air supplied from the second blower unit 412. Additionally, the first cooling section 436 is arranged in the forward direction (the direction of arrow A) of the casing 402, whereas the second cooling section 438 is arranged in the rearward direction (the direction of arrow B) of the casing 402.

Figure 17:
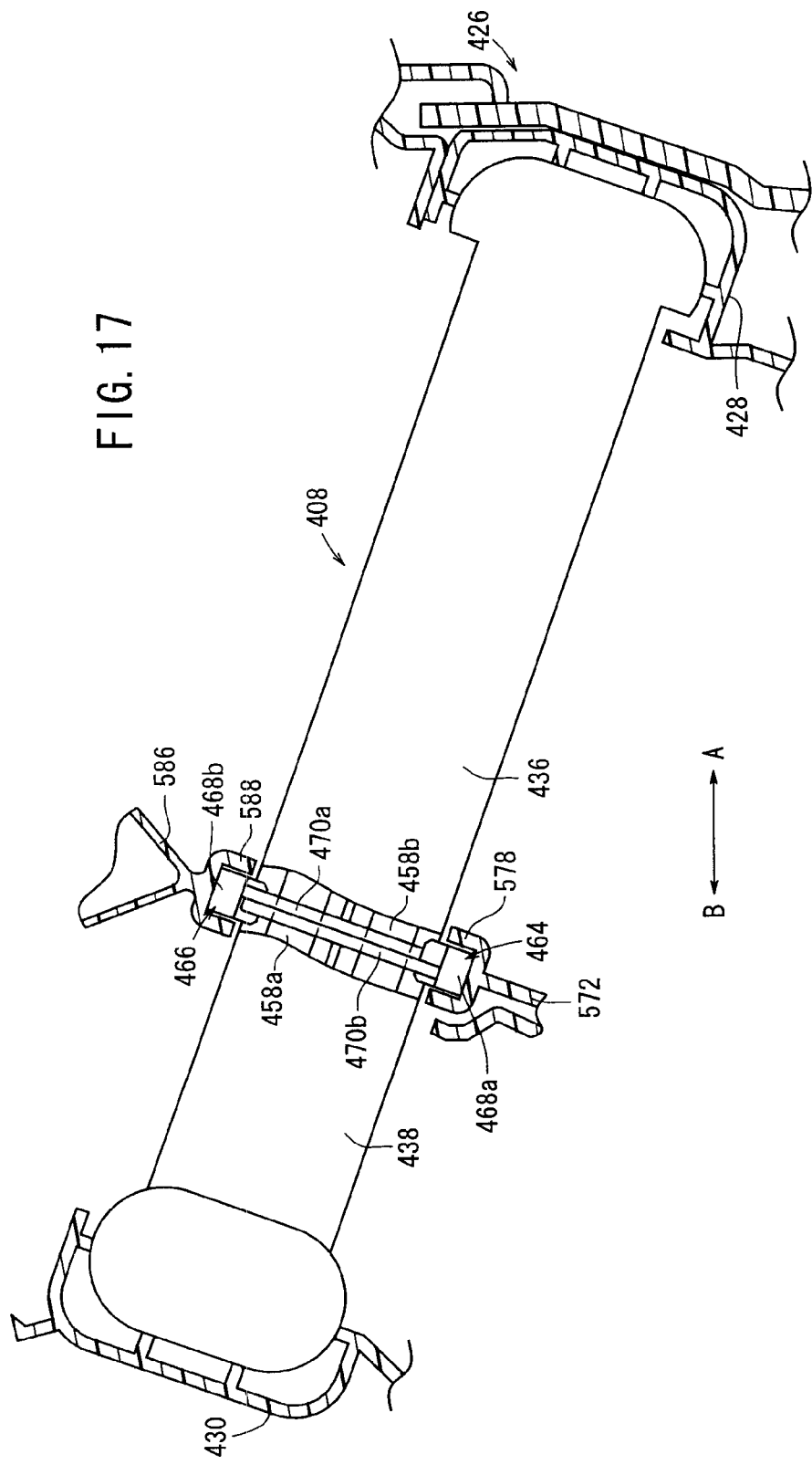
FIG. 17 is an enlarged side view showing a condition in which the evaporator of FIG. 16 is retained in an evaporator holder, and further wherein first and second partitioning members are installed thereon.
Figure 19:
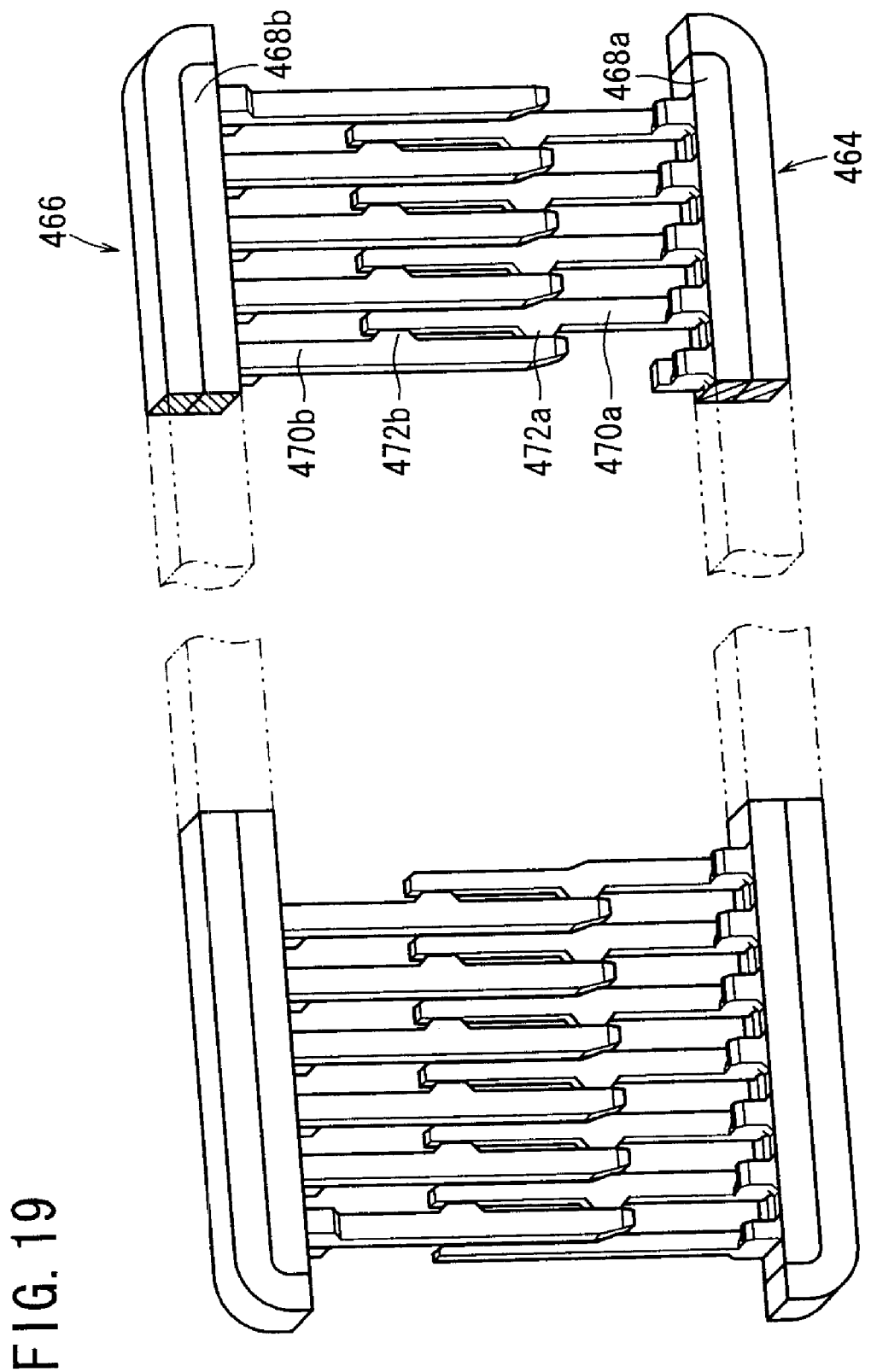
FIG. 19 is a perspective view with partial omission showing a condition during assembly of the first partitioning member and the second partitioning member.
Figure 20:
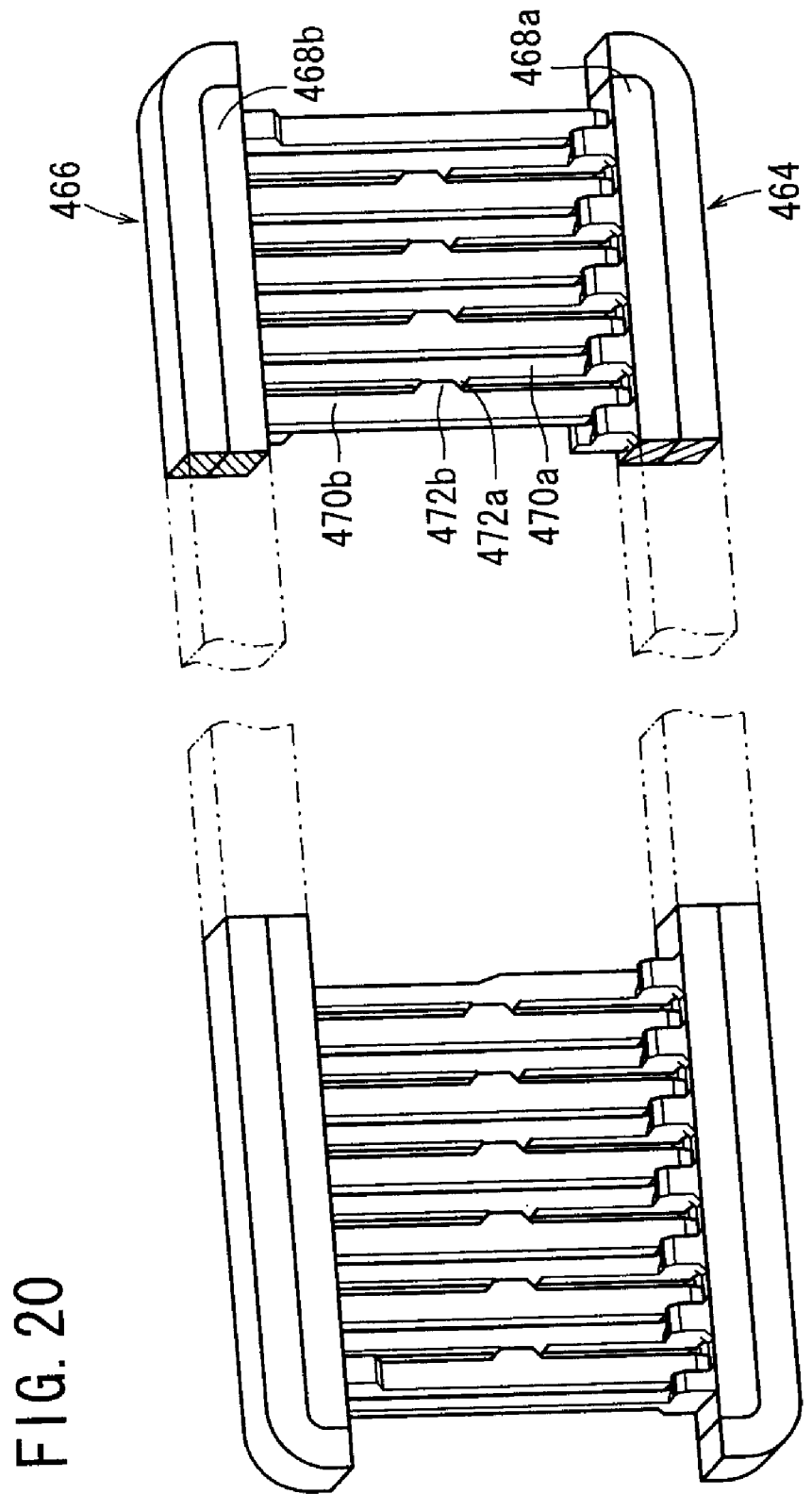
FIG. 20 is a perspective view with partial omission showing an evaporator installed state, in which the first partitioning member and the second partitioning member shown in FIG. 19 are completely assembled.

At the boundary region between the first cooling section 436 and the second cooling section 438, as shown in FIG. 17, a pair of first and second partitioning members 464, 466 are installed for blocking communication of air between the first cooling section 436 and the second cooling section 438. As shown in FIGS. 18 to 20, the first and second partitioning members 464, 466 are formed from a resin material, for example, and are equipped with straightly formed base portions 468*a*, 468*b*, and a plurality of sealing portions 470*a*, 470*b*, which project at a predetermined length from the lower surface of the base portions 468*a*, 468*b*. Also, projections 472*a*, 472*b* are formed thereon, which project in a direction perpendicular to the lengthwise direction, centrally along the lengthwise direction of the sealing portions 470*a*, 470*b*. The sealing portions 470*a*, 470*b* are formed with the same length, and are disposed so as to be separated mutually at equal intervals along the base portions 468*a*, 468*b*. Further, the projections 472*a*, 472*b* project in the same directions with respect to the sealing portions 470*a*, 470*b*.

Additionally, as shown in FIG. 17, the first partitioning member 464 is mounted on a lower surface side of the evaporator 408 on the upstream side thereof, such that the sealing portions 470*a* thereof are inserted respectively between the stacked tubes 458*a*, 458*b* in the evaporator 408, and the base portion 468*a* abuts against the lower surface. On the other hand, the second partitioning member 466 is mounted on an upper surface side of the evaporator 408 on the downstream side thereof, such that the sealing portions 470*b* thereof are inserted on an opposite side from the first partitioning member 464 between the tubes 458*a*, 458*b*, and the base portion 468*b* abuts against the upper surface.

Figure 21:
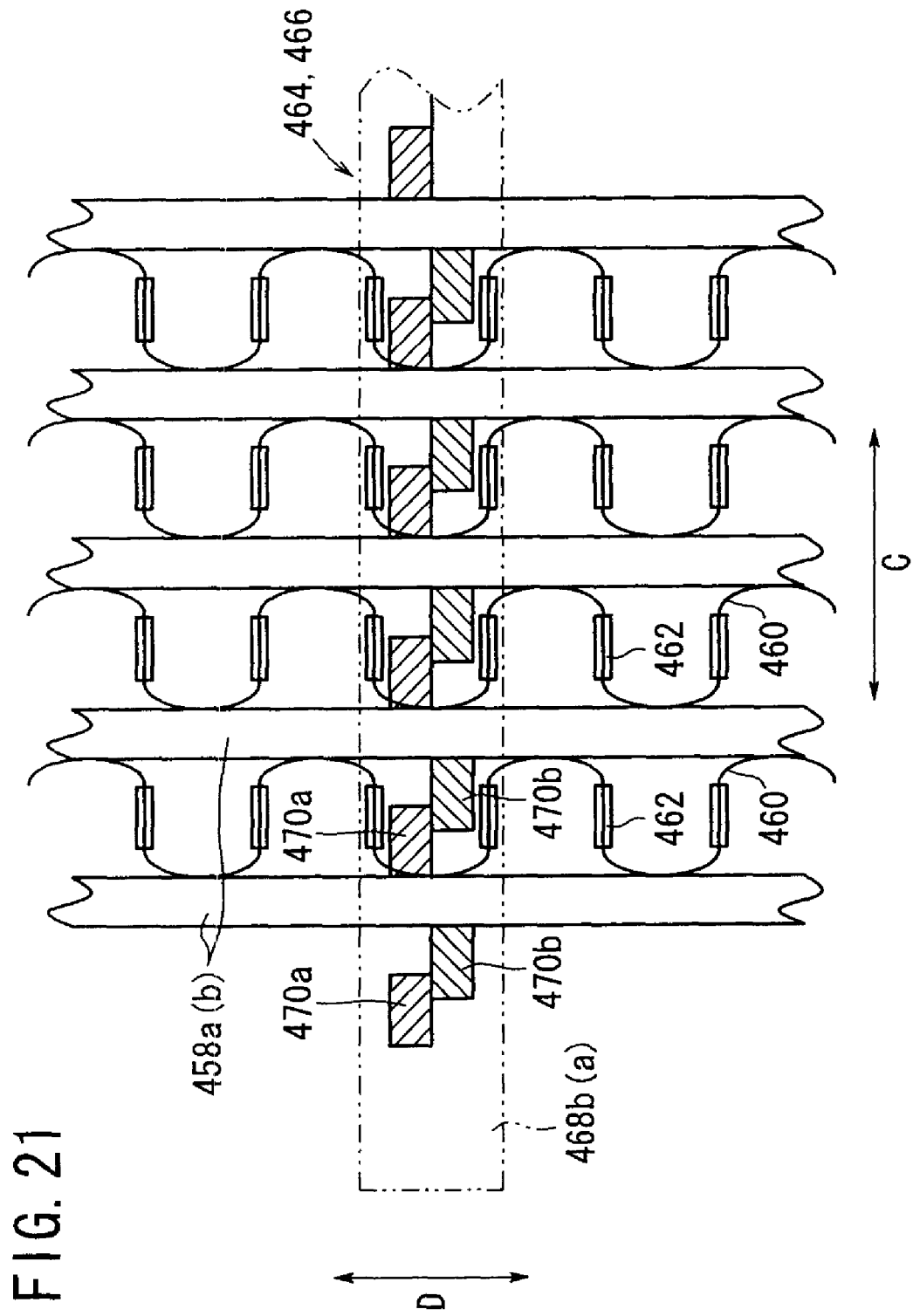
FIG. 21 is a cross sectional view with partial omission showing a condition in which a first partitioning member and a second partitioning member are installed on an evaporator.

At this time, as shown in FIG. 21, the sealing portions 470*a* of the first partitioning member 464 and the sealing portions 470*b* of the second partitioning member 466 are offset from each other along the direction of extension (the direction of arrow C) of the base portions 468*a*, 468*b*, and further, overlap in the direction of extension of the tubes 458*a*, 458*b*. Owing to the two sealing portions 470*a*, 470*b*, which are mutually overlapped in this manner, intervals between adjacent tubes 458*a*, 458*b* in the same layer are sealed respectively. Next, projections 472*a* of the first partitioning member 464 and the projections 472*b* of the second partitioning member 466 are inserted between the adjacent tubes 458*a* and the tubes 458*b*, while the first partitioning member 464 and the second partitioning member 466 are slid respectively along the direction of extension (the direction of arrow C) of the base portions 468*a*, 468*b*. Consequently, the projections 472*a* of the first partitioning member 464 and the projections 472*b* of the second partitioning member 466 overlap in the direction of extension of the tubes 458*a*, 458*b*, and gaps occurring between the tubes 458*a* disposed on the upper surface side and the tubes 458*b* disposed on the lower surface side are sealed (see FIG. 22).

Consequently, since the flow of air between the tubes 458*a*, 458*b*, which are disposed in two layers, is blocked by the first and second partitioning members 464, 466 installed between the first cooling section 436 and the second cooling section 438, flow of air between the first cooling section 436 and the second cooling section 438 is prevented (see FIG. 21).

Figure 22:
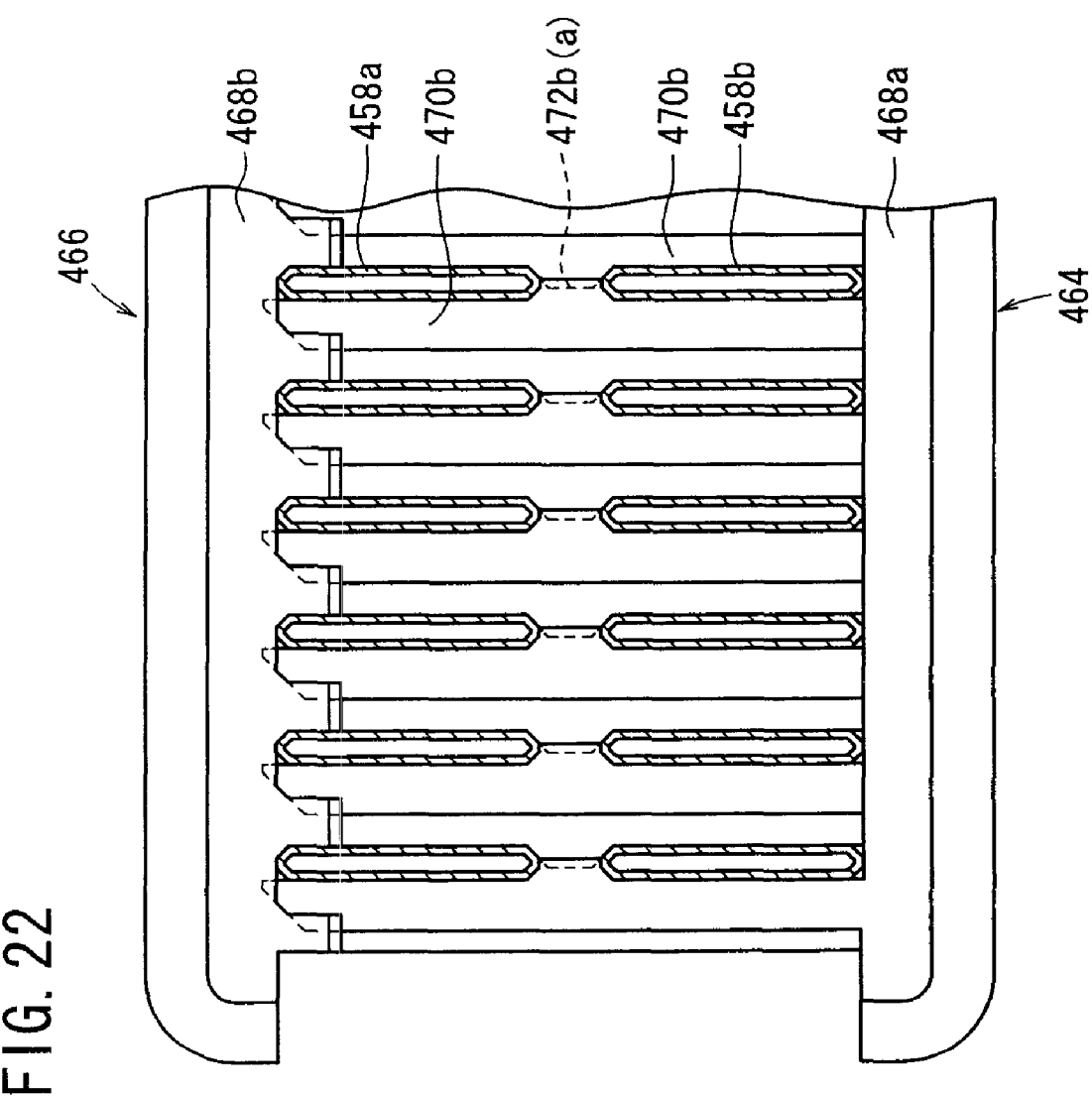
FIG. 22 is a front view, partially in cross section, showing a condition in which a first partitioning member and a second partitioning member are installed on an evaporator.

Moreover, in a condition of being installed on the evaporator 408, the base portions 468*a*, 468*b* of the first and second partitioning members 464, 468 are retained respectively in base holders 578, 588, which are formed in the casing 402 (see FIGS. 21 and 22).

Further, the means for blocking communication of air between the first cooling section 436 and the second cooling section 438 in the evaporator 408 is not limited to the aforementioned first and second partitioning members 464, 466. For example, as shown in FIG. 23, in place of the aforementioned first and second partitioning members 464, 466, a plate-shaped partition plate 474 may also be disposed at the boundary region between the first cooling section 436 and the second cooling section 438.

Figure 23:
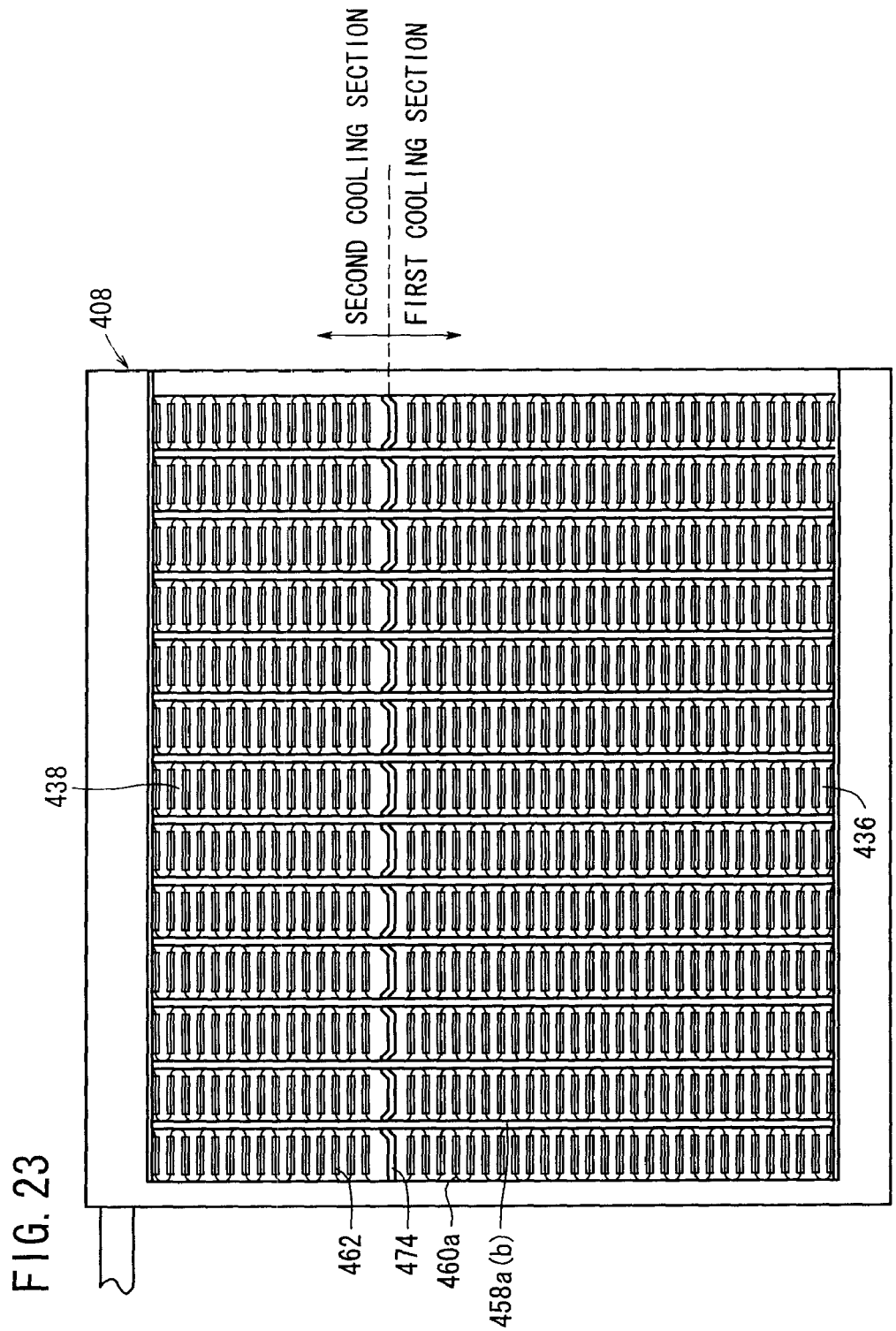
FIG. 23 is a plan view of an evaporator according to a modified example, in which a partition plate is installed thereon in place of the first and second partitioning members of FIG. 22.
Figure 24:
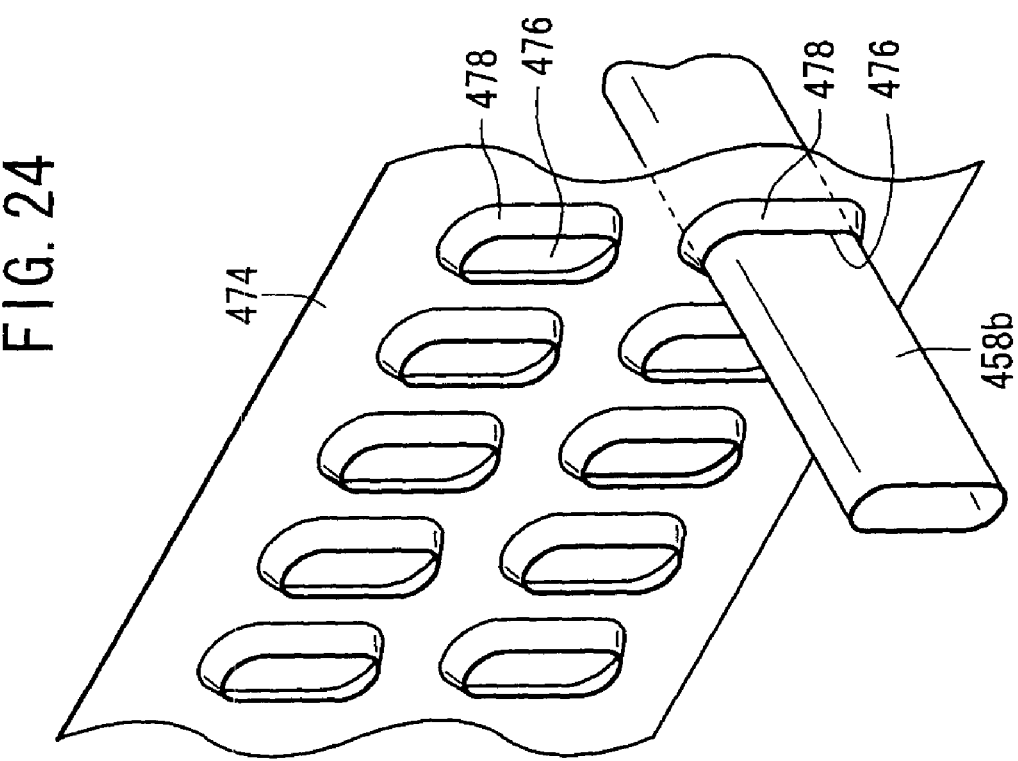
FIG. 24 is an enlarged perspective view showing a condition in which tubes are retained in the partition plate of FIG. 23.

The partition plate 474, as shown in FIGS. 23 and 24, includes a plurality of insertion holes 476 therein through which the tubes 458*a*, 458*b* are inserted. Pressing members 478, which are inclined at predetermined angles from the partition plate 474 about centers of the insertion holes 476, are formed in openings of the insertion holes 476. The pressing members 478 are substantially chevron shaped in cross section about the center of the insertion holes 476, and are tiltable with a certain resiliency in a radial direction of the insertion holes about a fulcrum point defined by an adjoining region with the partition plate 474.

Figure 25A:
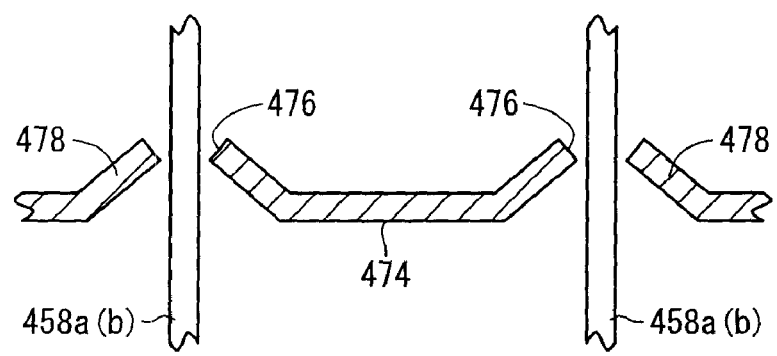
FIG. 25A is a cross sectional view showing, during a manufacturing process for the evaporator, a temporarily assembled state in which tubes are inserted through insertion holes of a partition plate.
Figure 25B:
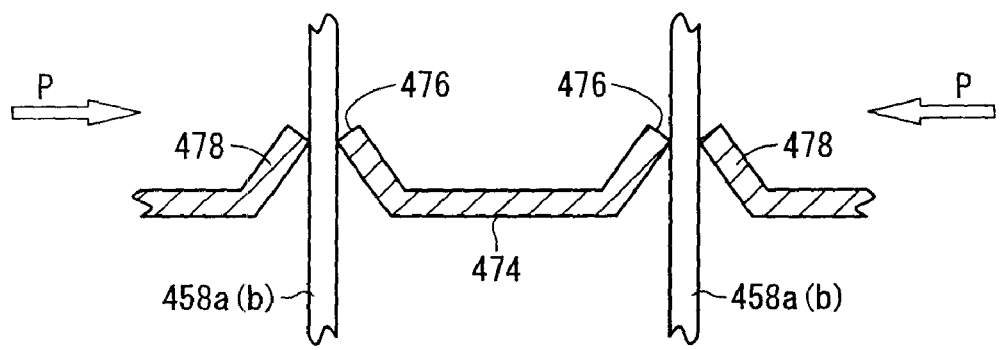
FIG. 25B is a cross sectional view showing, during a manufacturing process for the evaporator, a state in which, from the condition shown in FIG. 25A, the insertion holes are pressed against sides of the tubes to retain the tubes.

In addition, for example, a cut line or seam is disposed in the fins 460*a* forming a boundary between the first cooling section 436 and the second cooling section 438. After the partition plate 474 is inserted between the fins 460*a*, the tubes 458*a*, 458*b* are inserted respectively through the insertion holes 476 of the partition plate 474 (see FIG. 25A). Then, in such a provisionally assembled state, as shown in FIG. 25B, a pressing force P is applied respectively from the right and left in a direction to approach mutually toward the plural tubes 458*a*, 458*b*, and while heat is applied thereto, welding (e.g., using solder) is carried out, whereby the tubes 458*a*, 458*b*, the fins 460*a*, and the partition plate 474 are mutually bonded together to manufacture the evaporator 408 (see FIG. 23).

At this time, the pressing members 478 of the partition plate 474 contact the side surfaces of the tubes 458*a*, 458*b* due to the pressing force P, and further, because the tubes 458*a*, 458*b* are retained by the resilient force thereof, a state in which the partition plate 474 and the tubes 458*a*, 458*b* are mutually positioned can be realized. By performing welding in such a positioned state, for example, generation of thermal shrinkage after welding and the occurrence of gaps between the partition plate 474 and the tubes 458*a*, 458*b* is prevented.

On the other hand, as shown in FIG. 7, on a downstream side of the evaporator 408, a second front passage 482 is formed, through which air having passed through the first cooling section 436 is supplied. Upwardly of the second front passage 482, a third front passage (cool air passage) 484 and a fourth front passage 486 are formed in a branching or bifurcated manner. Further, in the second front passage 482, a first air mixing damper 488 is rotatably disposed so as to face toward the branching portion of the third front passage 484 and the fourth front passage 486.

By rotation of the first air mixing damper 488, the blowing condition and blowing rate of the cooled air that has passed through the evaporator 408 into the third front passage 484 and the fourth front passage 486 is adjusted. The third front passage 484 is arranged in the forward direction (the direction of arrow A), whereas the fourth front passage 486 is arranged in the rearward direction (the direction of arrow B), of the casing 402. The heater core 410 is disposed on a downstream side of the fourth front passage 486.

Upstream of the third front passage 484, a cooling vent damper 490 is disposed in a downward direction facing the second front passage 482, for switching a communication state between the second front passage 482 and the third front passage 484. More specifically, because the cooling vent damper 490 is arranged in the vicinity of the evaporator 408, the cooling vent damper 490 is disposed such that, under a switching action thereof, chilled air cooled by the evaporator 408 is supplied directly into the third front passage 484.

Further, the third front passage 484 extends upwardly, and a first vent blow-out port 492 opens at an upper portion on the downstream side thereof, where a vent damper 494 is rotatably disposed. The vent damper 494 switches a blowing state of air that flows through the third front passage 484, when the air is blown to the first vent blow-out port 492 and a later described sixth front passage 520, and also is capable of adjusting the blowing rate thereof.

The heater core 410 is arranged to straddle between the first divided casing 416 and the second divided casing 418, and is disposed such that one end thereof in the forward direction of the vehicle (the direction of arrow A) is inclined downward at a predetermined angle with respect to the other end thereof in the rearward direction of the vehicle. The heater core 410 includes the first heating section 450 that heats air supplied from the first blower unit 406, and the second heating section 452 that heats air supplied from the second blower unit 412, wherein the first heating section 450 is arranged on the forward side of the casing 402.

Figure 26:
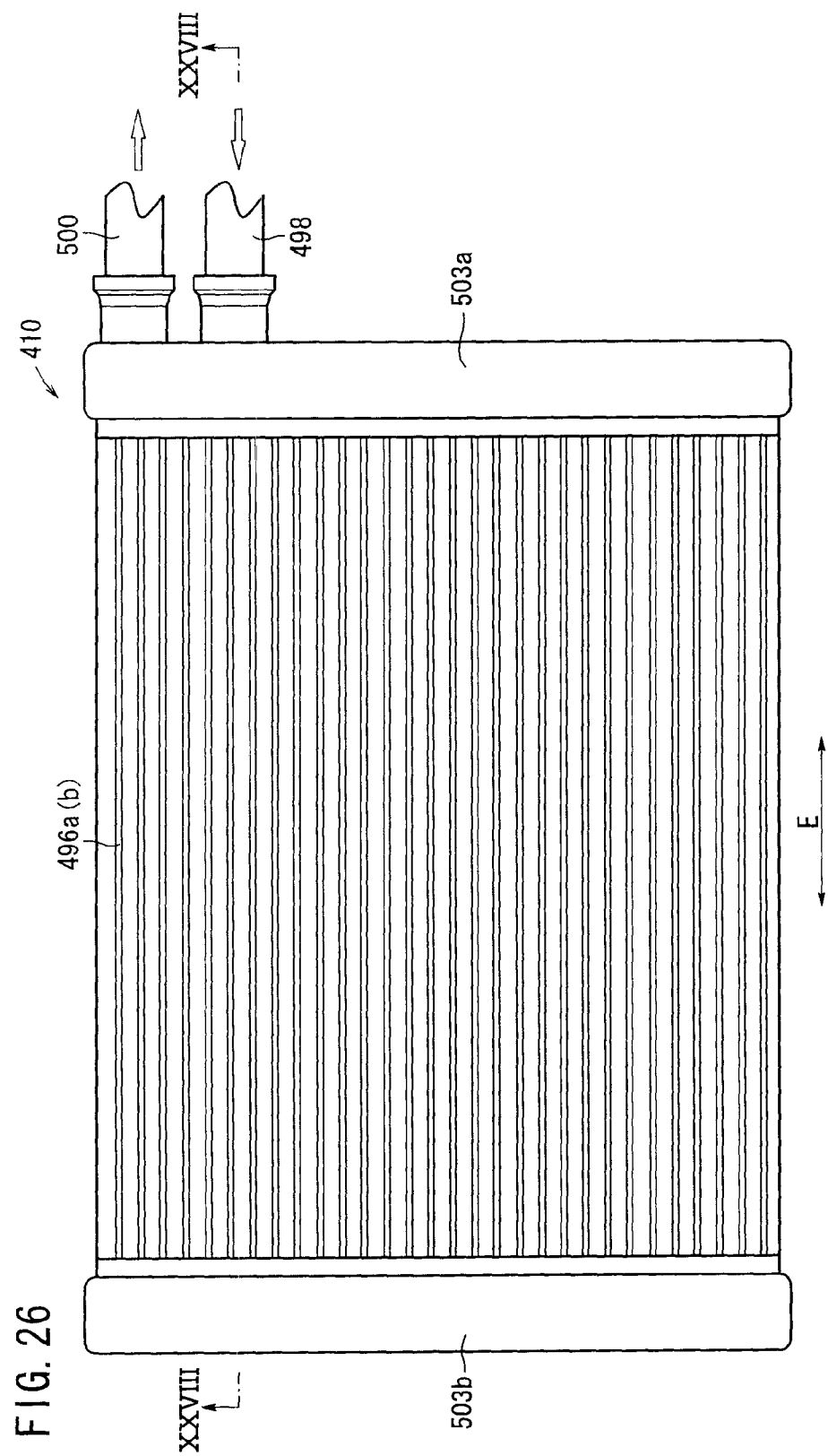
FIG. 26 is a plan view of a heater core.

As shown in FIG. 26, in the heater core 410, tubes 496*a*, 496*b* are formed from a pair of thin plates of aluminum or the like, and fins (not shown), which are folded in a serpentine-like undulating shape, are disposed respectively between the stacked tubes 496*a*, 496*b*. On the fins, a plurality of louvers are formed, which are cut out so as to be inclined at predetermined angles with respect to planar surfaces of the fins. By causing heated water to flow through the interior of the tubes 496*a*, 496*b*, air that passes through the louvers and flows between the fins is heated by the heated water and is supplied to the downstream side as heated air. At the heater core 410, the tubes 496*a*, 496*b* are arrayed in parallel and arranged in two layers in the thickness direction of the heater core 410.

Figure 27:
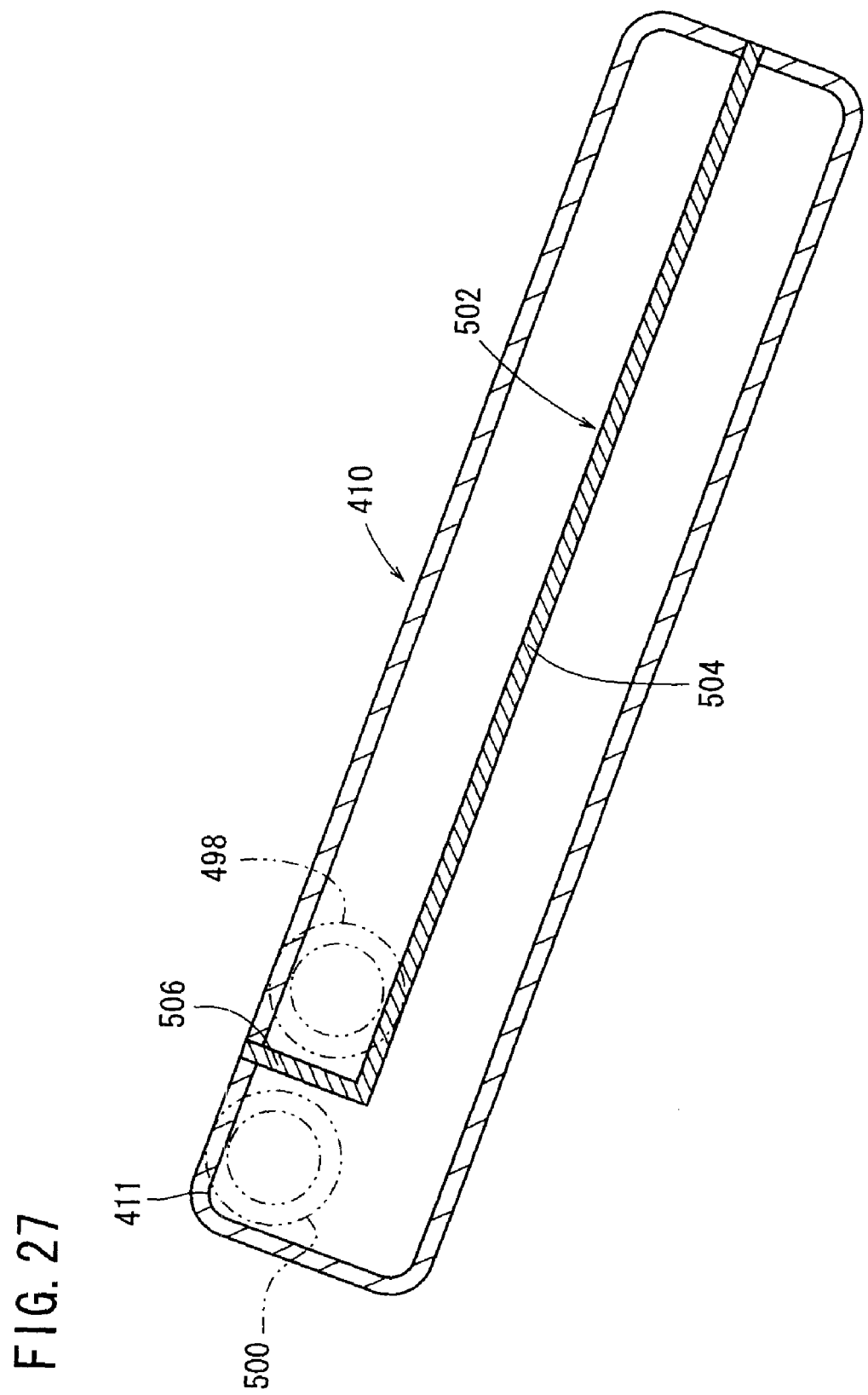
FIG. 27 is a schematic cross sectional view of the heater core shown in FIG. 26.

On both ends of the tubes 496a, 496b, respective hollow tank portions 503a, 503b are connected, which retain the heated water that flows inside the tubes. In addition, as shown in FIGS. 26 and 27, on one of the tank portions 503a on a side surface of the heater core 410, a supply conduit 498 through which heated water is supplied from the exterior, and a discharge conduit 500 through which heated water having circulated through the interior of the heater core 410 is discharged, are connected respectively. The discharge conduit 500 is arranged in the vicinity of a corner portion in a rear upward direction of the casing 402, whereas the supply conduit 498 is arranged in parallel adjacent to the discharge conduit 500.

Figure 28:
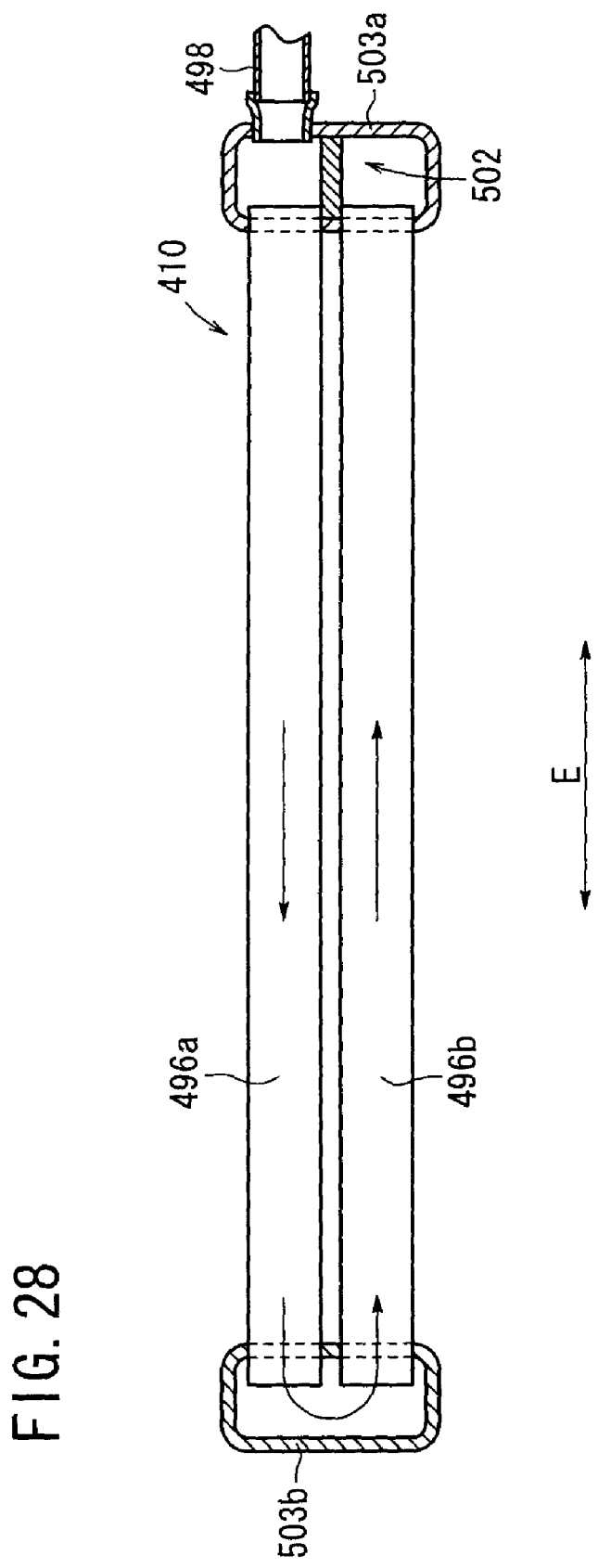
FIG. 28 is a cross sectional view taken along line XXVIII-XXVIII of FIG. 26.
Figure 29A:
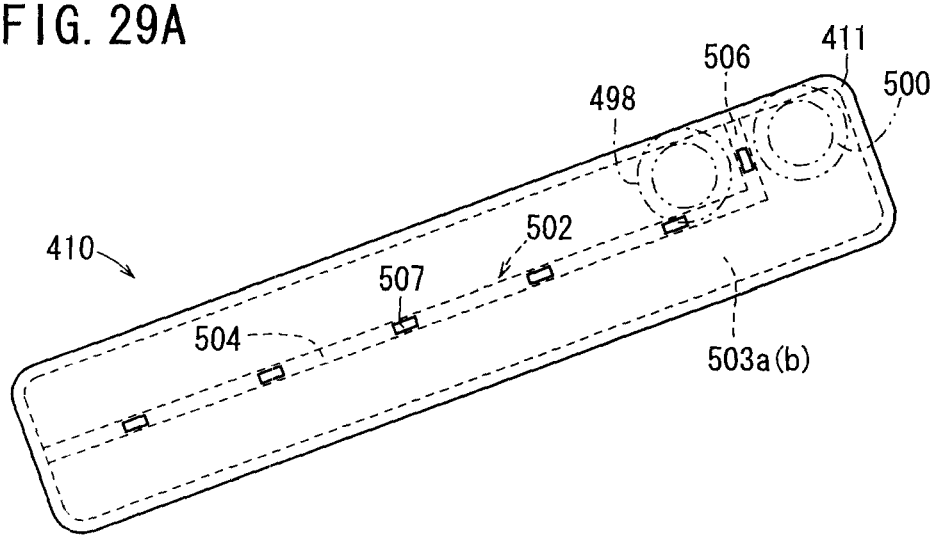
FIG. 29A is a side view of the heater core of FIG. 26.
Figure 29B:
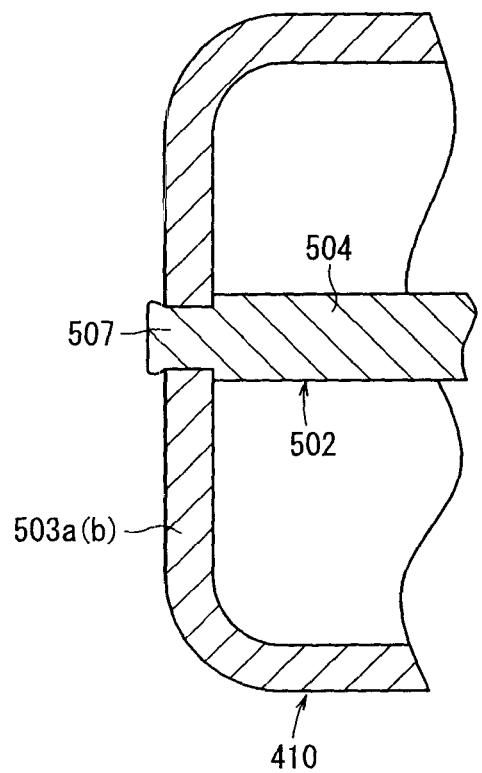
FIG. 29B is an enlarged cross sectional view showing a caulked region of a baffle plate and a housing that make up the heater core.

On the other hand, in the interior of the tank portion 503a, a baffle plate 502 is disposed, which is substantially L-shaped in cross section. The baffle plate 502 extends at a predetermined width in an extending direction (the direction of arrow E) of the supply conduit 498 and the discharge conduit 500, and the baffle plate 502 is arranged between one of the tubes 496a and the other of the tubes 496b. Additionally, as shown in FIG. 28, the pair of tubes 496a, 496b are separated inside the tank portion 503a by the baffle plate 502.

The baffle plate 502, as shown in FIG. 27, is made up from a planar portion 504 arranged centrally in the thickness direction of the heater core 410 and a bent portion 506, which is bent at a right angle at one end of the planar portion 504. The bent portion 506 is disposed between the discharge conduit 500 and the supply conduit 498.

Further, on the baffle plate 502, a plurality of caulking projections 507 (see FIG. 29A) are disposed respectively on both ends thereof along the longitudinal direction (the direction of arrow E) of the heater core 410. After such caulking projections 507 have been inserted through holes formed in a side surface of the tank portions 503a, 503b to project outwardly therefrom, the projecting regions thereof are pressed and crushed by a non-illustrated jig or the like (see FIG. 29B). Moreover, the caulking projections 507 are formed with rectangular shapes in cross section and are disposed while being mutually separated at predetermined distances on side surfaces of the planar portion 504 and the bent portion 506. Together therewith, holes facing the planar portion 504 are disposed centrally in the thickness direction on the tank portion 503a, and holes facing the bent portion 506 are disposed at positions between the supply conduit 498 and the discharge conduit 500 (see FIG. 29A).

As a result thereof, the baffle plate 502 is affixed securely with respect to the tank portion 503a disposed on the heater core 410.

In addition, heated water supplied from the supply conduit 498 is supplied, via the one tank portion 503a, to one of the tubes 496a, which is disposed on the upper side. Then, after the heated water has flowed through the tube 496a to the other end side of the heater core 410, the heated water reverses direction inside the tank portion 503b disposed at the other end of the heater core 410, passes through the other tube 496b disposed on the lower side, and flows along the lower surface side of the baffle plate 502 back to the one end side of the heater core 410, whereupon the heated water is discharged from the discharge conduit 500.

At this time, since the discharge conduit 500 is connected at an upper corner portion 411 (in the rearward direction) of the heater core 410, which is inclined at a predetermined angle, even in the case that entrapped or retained air is generated inside the heater core 410, the air can be reliably discharged to the exterior through the discharge conduit 500, which is connected at the upper corner portion 411 where such retained air is generated. Stated otherwise, the discharge conduit 500 is connected at an uppermost position in the heater core 410, the heater core 410 being disposed at a predetermined angle of inclination inside the casing 402.

Further, the baffle plate 502, which is disposed inside the heater core 410, is not limited to having an L-shape in cross section, as described above. For example, as shown in FIG. 30, a baffle plate 508 having a cross-like shape in cross section in a heater core 410a may also be used.

Figure 30:
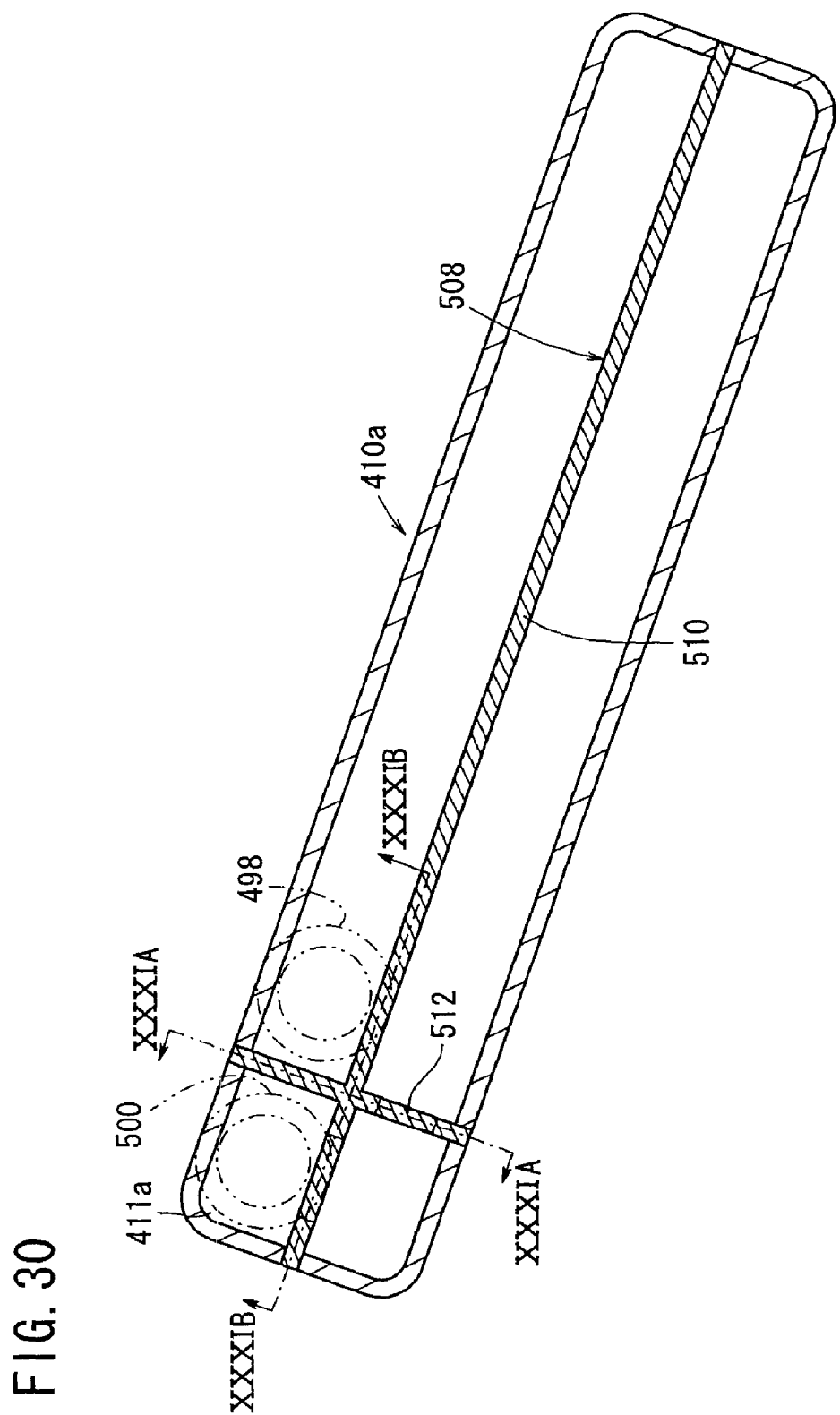
FIG. 30 is a schematic cross sectional view of a heater core according to a modified example in which a cross sectional cross-shaped baffle plate is utilized.

As shown in FIG. 30, the baffle plate 508 includes a planar portion 510 and a vertical portion 512 that intersects at a right angle with respect to the planar portion 510. The planar portion 510 is arranged centrally in the thickness direction of the heater core 410a, and the vertical portion 512 is arranged between the discharge conduit 500 and the supply conduit 498.

Figure 31A:
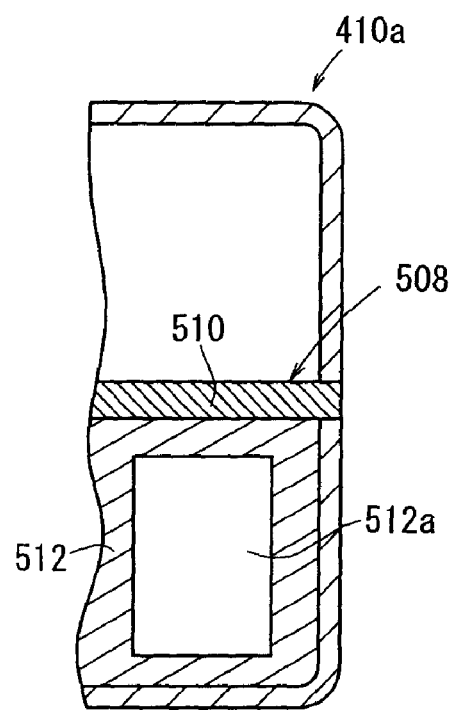
FIG. 31A is a cross sectional view taken along line XXXIA-XXXIA of FIG. 30.
Figure 31B:
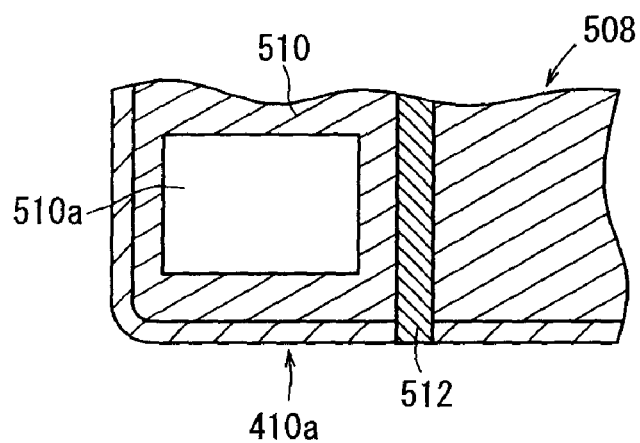
FIG. 31B is a cross sectional view taken along line XXXIB-XXXIB of FIG. 30.

Further, as shown in FIG. 31A, on the vertical portion 512, on the lower surface side of the heater core 410a, a through hole 512a opens through which the circulated heated water can flow. Furthermore, as shown in FIG. 31B, on the planar portion 510 facing the discharge conduit 500, another through hole 510a opens through which the heated water can flow. Additionally, in the heater core 410a employing the baffle plate 508, heated water supplied from the supply conduit 498 is supplied to the interior of one of the tank portions 503a, and flows along an upper surface side of the baffle plate 508 and is supplied to one of the tubes (not shown). Additionally, after reversing in direction at the tank portion 503b disposed on the other end side of the heater core 410a, the heated water flows along the lower surface side of the baffle plate 508, and after flowing to the through hole 510a of the planar portion 510 from the through hole 512a of the vertical portion 512, the heated water is discharged from the discharge conduit 500 via the tank portion 503a.

At this time as well, since the discharge conduit 500 is connected at an upper corner portion 411a (in the rearward direction) of the heater core 410a, which is inclined at a predetermined angle, even in the case that entrapped or retained air is generated inside the heater core 410a, the air can be reliably discharged to the exterior through the discharge conduit 500, which is connected at the upper corner portion 411a where such retained air is generated.

As shown in FIG. 8, on the downstream side of the heater core 410, a fifth front passage (warm air passage) 514 is formed. The fifth front passage 514 extends in the forward direction (in the direction of arrow A), and at a location that merges with the third front passage 484, a temperature control damper 516 is provided, and together therewith, sub-defroster dampers (communication switching dampers) 518a, 518b are disposed in an upward direction facing the heater core 410. Under a rotating action of the temperature control damper 516, a communication state between the fifth front passage 514 and the third front passage 484 is switched, for deflecting the blowing direction of warm air supplied from the fifth front passage 514 into the third front passage 484.

On the other hand, the sub-defroster dampers 518a, 518b are disposed so as to be capable of switching a communication state between the fifth front passage (warm air passage) 514 and the sixth front passage 520 formed thereabove. By rotating the sub-defroster dampers 518a, 518b and thereby establishing communication between the fifth front passage 514 and the sixth front passage 520, i.e., by shortening the fluid passage from the fifth front passage 514 to the sixth front passage 520, warm air heated by the heater core 410 can be supplied directly to the sixth front passage 520 without flowing through the third front passage 484, in a state in which ventilation resistance of the fluid passage is reduced.

Owing thereto, in the case that a heat mode for blowing air in the vicinity of the feet of passengers, or a defroster mode for blowing air in the vicinity of the front window of the vehicle, is selected, the blowing rate can be increased to quickly heat such areas.

Stated otherwise, even without increasing the rotation of the first blower unit 406, the blowing rate of air during the heat mode and the defroster mode can be increased.

The sixth front passage 520 communicates with the downstream side of the third front passage 484 through the forwardly disposed opening, and communicates with a later-described seventh front passage 522 through the rearwardly disposed opening. A defroster blow-out port 524 (defroster opening) opens upwardly of the sixth front passage 520, with a pair of defroster dampers 526a, 526b being disposed rotatably therein facing the defroster blow-out port 524.

The defroster dampers 526a, 526b are provided to switch the blowing state when the air supplied to the sixth front passage 520 is blown out from the defroster blow-out port 524, and further are capable of adjusting the blowing rate thereof.

Further, at a downstream side of the sixth front passage 520, a pair of heat dampers 528 made up from a butterfly valve are rotatably disposed (see FIG. 7). By rotating the heat dampers 528, the blowing state of air is switched, when air supplied from the sixth front passage 520 is blown out through later-described seventh and eighth front passages 522, 540 or through the defroster blow-out port 524, and further, the blowing rate of such air can be adjusted.

Further, as shown in FIG. 32, the sixth front passage 520 is divided into two sections by the center plate 420, which is disposed centrally in the casing 402 in the widthwise direction thereof. Also, the sixth front passage 520 is further divided respectively by a pair of dividing panels 530a, 530b, which are disposed roughly centrally in the widthwise direction, respectively, of the first and second divided casings 416, 418. In addition, in the sixth front passage 520, between the center plate 420 and the dividing panels 530a, 530b, a pair of heat dampers 528 are disposed, such that air that flows between the center plate 420 and the dividing panels 530a, 530b is directed outwardly to a first heat passage 538 (discussed later) under rotating actions of the heat dampers 528.

On the other hand, the defroster dampers 526a, 526b are disposed respectively between the dividing panels 530a, 530b and inner wall surfaces of the first and second divided casings 416, 418, so that air that flows between the dividing panels 530a, 530b and inner wall surfaces of the first and second divided casings 416, 418 is directed outwardly, respectively, from side portions 534 of the defroster blow-out port 524 under rotating actions of the defroster dampers 526a, 526b.

More specifically, the sixth front passage 520 is divided into four sections inside the casing 402 by the pair of dividing panels 530a, 530b and the center plate 420, such that the blowing state and blowing rate of air that is blown from the defroster blow-out port 524 is switched by the defroster dampers 526a, 526b.

Figure 33:
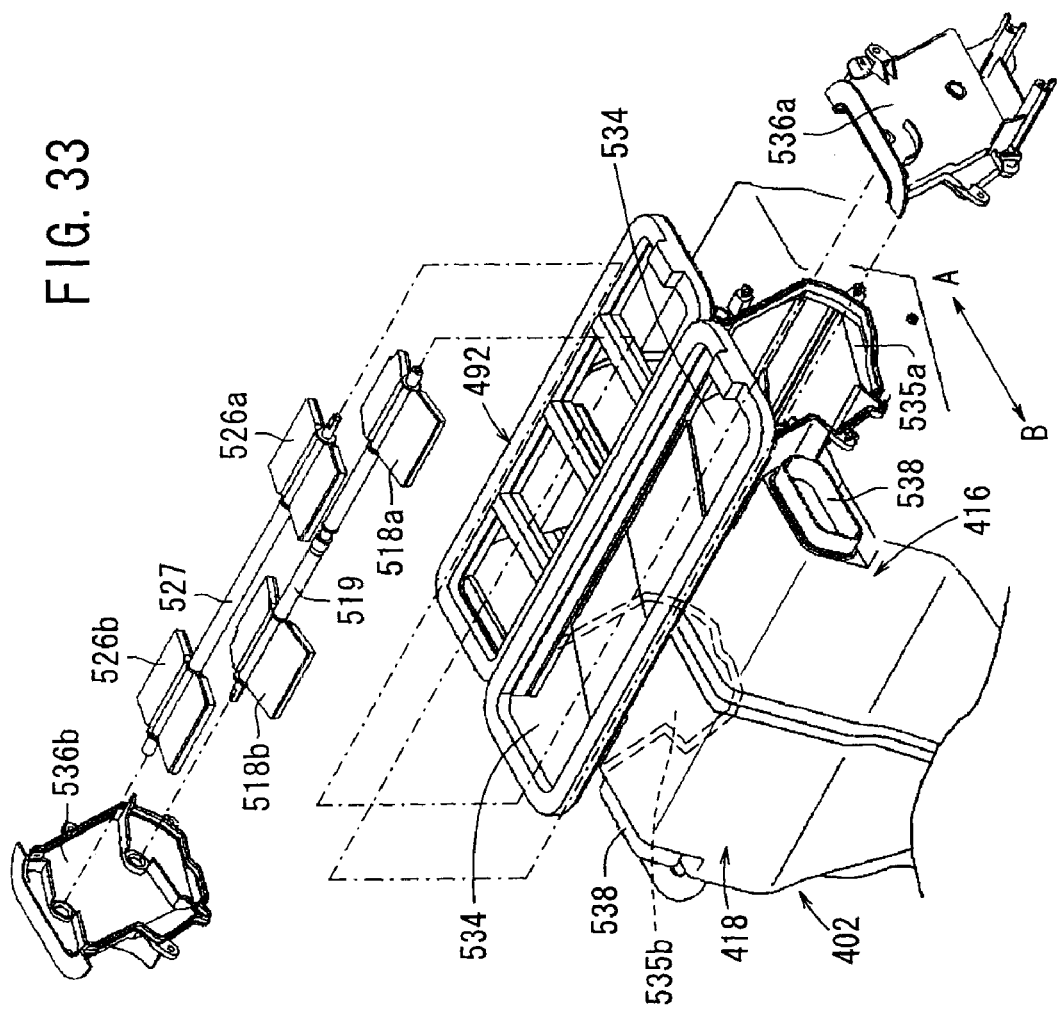
FIG. 33 is an exploded perspective view showing a condition in which a cover is removed from the first and second divided casings, and a defroster damper and a sub-defroster damper are taken out therefrom.

As shown in FIG. 33, by respectively removing covers 536a, 536b, which are disposed alongside the defroster dampers 526a, 526b and the sub-defroster dampers 518a, 518b in the first and second divided casings 416, 418, maintenance thereon, such as exchanging and adjustment of rotation angles, etc., can easily be carried out on the defroster dampers 526a, 526b and the sub-defroster dampers 518a, 518b.

The seventh front passage 522 communicates with a first heat blow-out port (not shown) through a first heat passage 538 for the purpose of blowing air in the vicinity of the feet of passengers in the front seats in the vehicle compartment. The eighth front passage 540 extends downwardly in a curving manner and communicates with a second heat blow-out port (not shown) upwardly of the second blower unit 412 through a second heat passage (not shown) for the purpose of blowing air in the vicinity of the feet of passengers in the middle seats in the vehicle compartment.

In the casing 402, the first vent blow-out port 492 and the defroster blow-out port 524 open upwardly of the casing 402, and further, the first vent blow-out port 492 is arranged on a forward side (in the direction of arrow A), whereas the defroster blow-out port 524 is arranged rearwardly, substantially centrally in the casing 402 with respect to the first vent blow-out port 492 (see FIG. 8).

Figure 34:
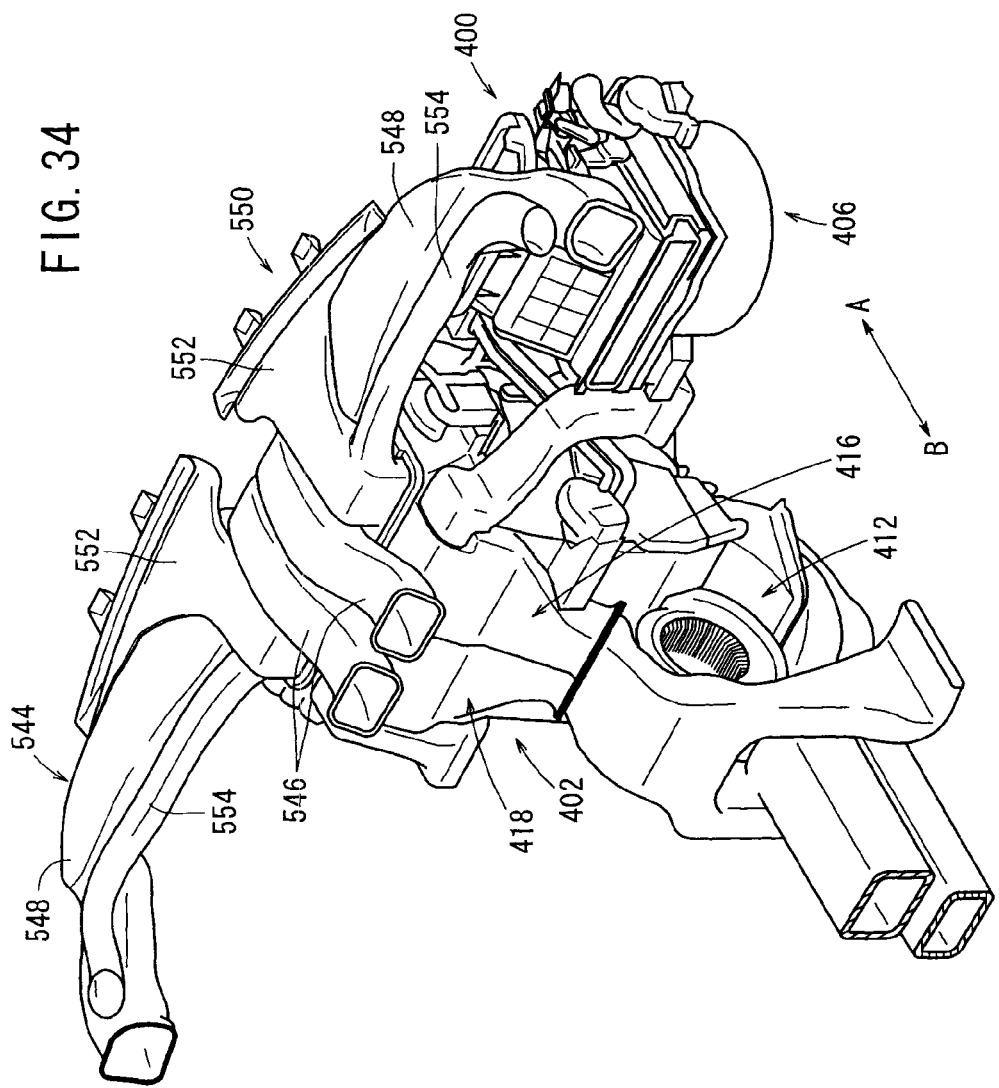
FIG. 34 is a schematic perspective view of the vehicular air conditioning apparatus showing a condition thereof in which a vent duct and a defroster duct are connected respectively to a first vent blow-out port and a defroster blow-out port.
Figure 35:
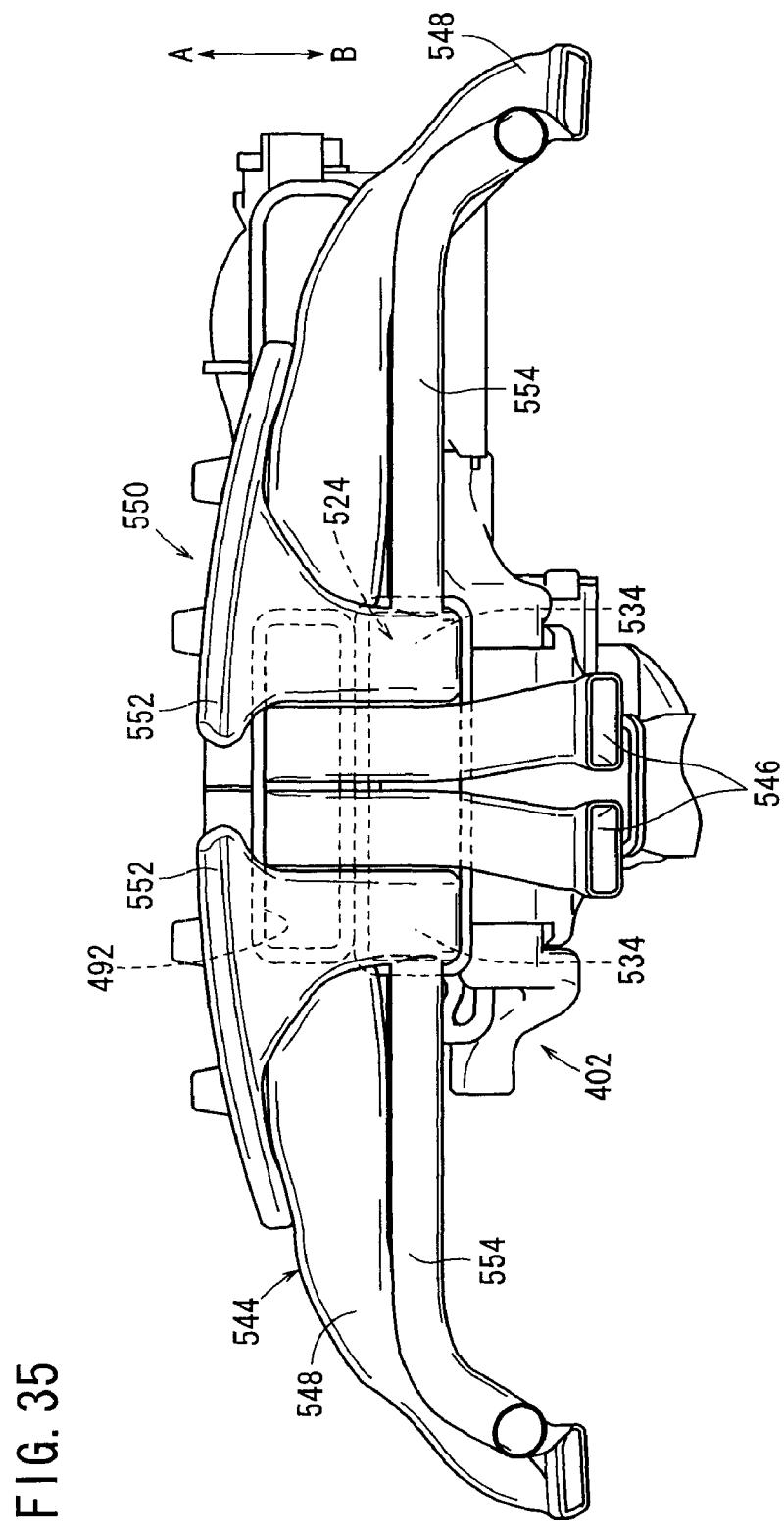
FIG. 35 is a plan view showing the vehicular air conditioning apparatus of FIG. 34.

As shown in FIGS. 34 and 35, a vent duct 544, which extends while curving toward the rearward side of the vehicle (in the direction of arrow B), is connected to the first vent blow-out port 492 for supplying mixed air to the vicinity of faces of passengers in the front seats of the vehicle compartment from the first vent blow-out port 492. A pair of center vent ducts 546 that make up the vent duct 544 are connected to a center portion of the first vent blow-out port 492 and blow air toward the center of the front seats, whereas another pair of side vent ducts 548, which are connected to both ends of the first vent blow-out port 492, extend in lateral directions of the front seats, and blow air toward the driver's seat and passenger seat sides thereof.

On the other hand, a defroster duct 550, which extends while curving toward the forward side of the vehicle (in the direction of arrow A), is connected to the defroster blow-out port 524 for supplying mixed air to the vicinity of the front window in the vehicle compartment from the defroster blow-out port 524. The defroster duct 550 is constituted by center defroster ducts 552, which are branched in a forked manner so as to avoid the center vent ducts 546 that extend upwardly of the defroster blow-out port 524, and extend toward an unillustrated front window, and side defroster ducts 554, which extend perpendicularly to the center defroster ducts 552 in lateral directions together with the side vent ducts 548. As a result, since locations where the respective ducts are accommodated are not increased in volume, the vehicular air conditioning apparatus 400 can be made small in size. Further, the center defroster ducts 552 extend toward the forward side (in the direction of arrow A) straddling upwardly over the side vent ducts 548.

More specifically, the vent duct 544 connects to the first vent blow-out port 492 disposed on the forward side and extends rearwardly (in the direction of arrow B) toward the vehicle compartment, whereas the defroster duct 550 connects to the defroster blow-out port 524 disposed on the rearward side and extends in a forward direction (in the direction of arrow A) on the front window side while crossing over the vent duct 544.

In this manner, by arranging the first vent blow-out port 492 on the forward side of the casing 402, the third front passage 484 that communicates between the downstream side of the evaporator 408 and the first vent blow-out port 492 can be oriented upwardly and arranged in a straight line fashion, while the defroster blow-out port 524 can be disposed upwardly of the heater core 410.

In this case, the center defroster ducts 552 and the side defroster ducts 554 that constitute the defroster duct 550 extend respectively from side portions 534 of the defroster blow-out port 524, such that the center vent ducts 546 are oriented and can extend rearwardly (in the direction of arrow B) from the first vent blow-out port 492, which is disposed forwardly (in the direction of arrow A) of the defroster blow-out port 524.

The first blower unit 406 includes an intake damper (not shown) in which an external air intake port 556 connected to a duct (not shown) for the purpose of introducing external air and an internal air intake port 558 for introducing internal air are arranged in an opening thereof, and which carries out switching between the external and internal air, and a first blower fan 560 that supplies air that is taken into the interior of the casing 402. A blower case 562 in which the first blower fan 560 is accommodated communicates with the interior of the casing 402 through the connection duct 404 connected to the first intake port 422. Rotation of the first blower fan 560 is controlled by a fan motor (not shown), which is driven under the control of a non-illustrated rotation control device.

On the other hand, in a lower portion of the casing 402, as shown in FIGS. 7 and 8, a second intake port 568 through which air is supplied from the second blower unit 412 is formed at a rearward side perpendicular to the first intake port 422. The second intake port 568 opens at a position on an upstream side of the evaporator 408, and communicates with the first rear passage 570, and further, is formed alongside the first intake port 422 via the first rear passage 570 and a first dividing wall 572.

The second blower unit 412 includes the second blower fan 574, which supplies air that has been taken in to the interior of the casing 402. A blower case 576 in which the second blower fan 574 is accommodated is connected to the second intake port 568 of the casing 402 and communicates with the first rear passage 570. In the same manner as the first blower fan 560, rotation of the second blower fan 574 is controlled by a fan motor (not shown) driven under the control of a rotation control device 564*b*.

On a downstream side of the first rear passage 570, the evaporator 408 is disposed such that the second cooling section 438 thereof faces the first rear passage 570. The first dividing wall 572, which is formed between the first rear passage 570 and the first front passage 424, extends to the first and second partitioning members 464, 466 that are installed on the evaporator 408. The first partitioning member 464 is retained in the base holder 578, which is disposed at the end of the first dividing wall 572.

More specifically, since the first dividing wall 572 extends to the first and second partitioning members 464, 466 that are installed on the evaporator 408, air that flows to the evaporator 408 through the first rear passage 570 is prevented from mixing with air that flows to the evaporator 408 through the first front passage 424.

Further, a second guide panel 580 for guiding moisture ejected from the evaporator 408 to the bottom of the casing 402 is formed in the first rear passage 570 while being separated a predetermined distance from the first dividing wall 572. An upper end of the second guide panel 580 extends to the vicinity of the base holder 578 disposed on the first dividing wall 572, and is bent rearwardly so as to be separated a predetermined distance from the base holder 578 (see FIG. 12).

In addition, in the event that moisture generated by the second cooling section 438 of the evaporator 408 flows to the forward side (in the direction of arrow A) along the lower surface of the evaporator 408 and is retained in the first partitioning member 464 and the base holder 578, or when such moisture comes into contact with the upper end of the second guide panel 580, the moisture is guided and flows downwardly along the second guide panel 580. The moisture is then discharged from the casing 402 through a second drain port 582 disposed between the first dividing wall 572 and the second guide panel 580. In this case, the upper end of the second guide panel 580 is flexed or bent rearwardly (in the direction of arrow B), so as to be separated a predetermined distance from the base holder 578 (see FIG. 7), whereby the amount of air that reaches the first partitioning member 464 and the base holder 578 is reduced. Consequently, moisture that has accumulated in the first partitioning member 464 and the base holder 578 is prevented from adhering again to the second cooling section 438, while in addition, moisture can be reliably discharged from the second drain port 582.

Owing thereto, condensed water that is generated in the evaporator 408 is prevented from accumulating and freezing in the evaporator 408.

On a downstream side of the evaporator 408, the second rear passage 584 is formed, to which air having passed through the second cooling section 438 of the evaporator 408 is supplied. The second rear passage 584 is separated from the second front passage 482 by a second dividing wall 586, wherein the second partitioning member 466 is retained in a base holder 588 disposed at the end of the second dividing wall 586. Specifically, because the second dividing wall 586 extends to the second partitioning member 466 installed on the evaporator 408, on the downstream side of the evaporator 408 as well, air that flows to the second cooling section 438 of the evaporator 408 through the first rear passage 570 does not intermix with air that passes through the first front passage 424 and flows to the first cooling section 436 of the evaporator 408.

In the second rear passage 584, a second air mixing damper 590 is disposed rotatably therein facing the heater core 410 for mixing cooled air and heated air at a predetermined mixing ratio to thereby produce mixed air. The second air mixing damper 590 switches the communication state between the second rear passage 584 and an upstream or downstream side of a third rear passage 592, which is connected to a downstream side of the heater core 410. Consequently, by rotating the second air mixing damper 590, cool air that is cooled by the evaporator 408 and supplied to the second rear passage 584 and warm air that is heated by the heater core 410 and which flows through the third rear passage 592 are mixed at a predetermined mixing ratio within the third rear passage 592 and blown out therefrom.

Stated otherwise, the third rear passage 592 functions as a mixing section for mixing warm air and cool air, which is then blown out to the middle seats and rear seats in the vehicle.

Figure 36:
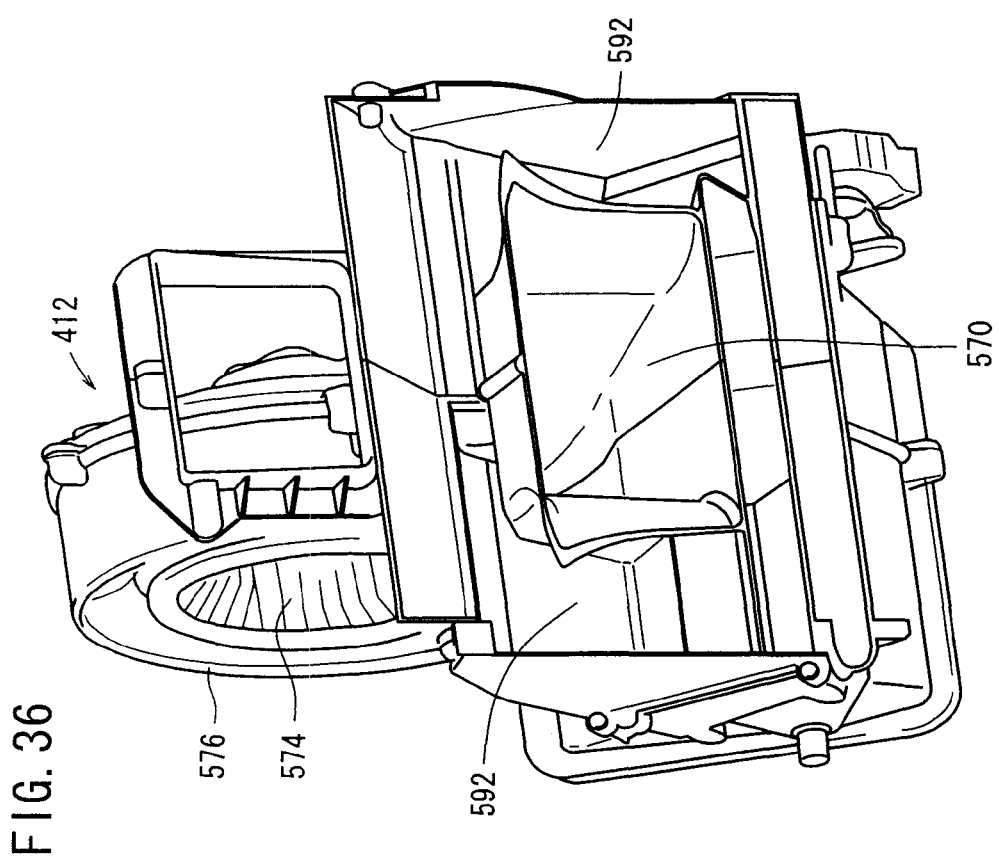
FIG. 36 is an enlarged perspective view showing the vicinity of a first rear passage and a third rear passage formed in a lower portion of the casing.

Further, as shown in FIG. 7, the third rear passage 592, after bending to circumvent the other end of the heater core 410, extends downwardly, and midway therein, an opening is formed that communicates with the second rear passage 584. On a downstream side extending further downward from the opening, as shown in FIG. 36, the third rear passage 592 branches in a forked manner, branching in widthwise directions of the casing 402 about the first rear passage 570, and after extending so as to avoid the first rear passage 570 on both sides thereof, the third rear passage 592 merges again downward of the first rear passage 570. Stated otherwise, the third rear passage 592 is formed so as to cross over the first rear passage 570.

As shown in FIGS. 7 and 8, on a downstream side of the third rear passage 592, fourth and fifth rear passages 594, 596 communicate therewith. A rotatable mode switching damper 598 is disposed at a branching location thereof, which serves to switch the blowing state of air to the fourth and fifth rear passages 594, 596, which branch respectively from the third rear passage 592, and also to adjust the blowing rate of air thereto.

The fourth and fifth rear passages 594, 596 extend toward a rearward direction of the vehicle. The fourth rear passage 594 communicates with a second vent blow-out port (not shown) for blowing air in the vicinity of faces of passengers in the middle seats of the vehicle. The fifth rear passage 596 communicates with second and third heat blow-out ports (not shown) for blowing air in the vicinity of the feet of passengers in the middle and rear seats.

Specifically, air supplied from the second blower unit 412 is directed into the casing 402 through the second intake port 568, and is selectively supplied to the second vent blow-out port, and the second and third heat blow out ports, which are arranged to face the middle seats and rear seats in the vehicle, through the first through fifth rear passages 570, 584, 592, 594, 596.

Moreover, because the aforementioned second to seventh front passages 482, 484, 486, 514, 520, 522 are divided in half at a substantially central portion of the casing 402 by the center plate 420, the second to seventh front passages 482, 484, 486, 514, 520, 522 are disposed respectively inside of the first and second divided casings 416, 418.

The vehicular air conditioning apparatus 400 according to the second embodiment of the present invention is basically constructed as described above. Next, operations and effects of the invention shall be explained.

First, when operation of the vehicular air conditioning apparatus 400 is started, the first blower fan 560 of the first blower unit 406 is rotated under the control of a rotation control device (not shown), and air (interior or exterior air) that is taken in through a duct or the like is supplied to the first front passage 424 of the casing 402 through the connection duct 404. Simultaneously, air (interior air) that is taken in by rotation of the second blower fan 574 of the second blower unit 412 under the control of a non-illustrated rotation control device is supplied to the first rear passage 570 from the blower case 576 while passing through the second intake port 568. In the following descriptions, air supplied to the interior of the casing 402 by the first blower fan 560 shall be referred to as "first air," and air supplied to the interior of the casing 402 by the second blower fan 574 shall be referred to as "second air."

The first air and the second air supplied to the interior of the casing 402 are each cooled by passing respectively through the first and second cooling sections 436, 438 of the evaporator 408, and flow respectively as chilled air to the second front passage 482 and the second rear passage 584, in which the first and second air mixing dampers 488, 590 are disposed. In this case, because the interior of the evaporator 408 is divided into the first cooling section 436 and the second cooling section 438 by a non-illustrated partitioning means, the first air and the second air do not mix with one another.

Herein, in the case that a vent mode is selected by a passenger using a controller (not shown) inside the vehicle compartment for blowing air in the vicinity of the face of the passenger, by blocking communication between the second front passage 482 and the fourth front passage 486 by means of the first air mixing damper 488, the first air (cooled air) flows from the second front passage 482 to the third front passage 484. In this case, the temperature control damper 516 blocks communication between the fifth front passage 514 and the third front passage 484. Additionally, concerning the first air (cooled air) that flows to the third front passage 484, since the vent damper 494 is rotated into a position that blocks communication between the third front passage 484 and the sixth front passage 520, the first air is blown from the open first vent blow-out port 492, through the vent duct 544, and in the vicinity of the face of a passenger who rides in the front seat in the vehicle compartment.

On the other hand, concerning the second air (cooled air), since flow to the second heating section 452 of the heater core 410 is interrupted by the second air mixing damper 590, the second air flows downstream from the second rear passage 584 through the third rear passage 592. Additionally, the second air (cooled air) is blown in the vicinity of the face of a passenger who rides in the middle seat in the vehicle compartment from the second vent blow-out port (not shown) through the fourth rear passage 594 under a switching operation of the mode switching damper 598.

Further, for example, in the vent mode, in the case that the interior of the vehicle compartment is quickly cooled, the cooling vent damper 490 enables communication between the second front passage 482 and the third front passage 484. As a result, since the blowing rate of the first air (cooled air) that flows to the third front passage 484 from the second front passage 482 increases, the vehicle compartment can be cooled quickly by the first air, which is blown from the first vent blow-out port 492 through the vent duct 544.

In this case, since it is unnecessary to mix warm air supplied to the fifth front passage 514 with the cool air of the third front passage 484, the temperature control damper 516 is rotated to become substantially parallel with the third front passage 484 and to block communication between the fifth front passage 514 and the third front passage 484. As a result, cooled air in the third front passage 484 can be supplied to the first vent blow-out port 492 without being raised in temperature. In addition, because the temperature control damper 516 suppresses flow passage resistance when cool air flows through the third front passage 484, low electrical power consumption of the first blower fan 560 is realized, along with reducing noise.

Next, for example, in the case that the bi-level mode is selected by the controller (not shown) inside the vehicle compartment for blowing air in the vicinity of faces and feet of the passengers, the first air mixing damper 488 is rotated to an intermediate position between the third front passage 484 and the fourth front passage 486, so that the first air is caused to flow respectively to both the third front passage 484 and the fourth front passage 486. Furthermore, the temperature control damper 516 is rotated, whereupon air heated by the first heating section 450 of the heater core 410 is supplied into the third front passage 484 from the fifth front passage 514. At this time, the vent damper 494 is positioned at an intermediate position between the first vent blow-out port 492 and the opening of the sixth front passage 520, and together therewith, the defroster blow-out port 524 is blocked by the defroster damper 526a, 526b, whereupon the communication opening from the fifth front passage 514 to the sixth front passage 520 is blocked by the sub-defroster dampers 518a, 518b and communication therebetween is interrupted.

Herein, the first air (cooled air) flows from the second front passage 482 to the third front passage 484. In this case, the temperature control damper 516 is oriented in a direction so as to be separated from the communication opening between the fifth front passage 514 and the third front passage 484, while the end portion thereof is rotated to face the upstream side of the third front passage 484. Specifically, the first air (cooled air) is heated by the first heating section 450 of the heater core 410, and by mixing only at a small amount with the first air (heated air) that flows to the third front passage 484 through the fifth front passage 514, air is blown directly from the first vent blow-out port 492, through the vent duct 544, and in the vicinity of the face of a passenger who rides in the front seat in the vehicle compartment.

In this case, since the temperature control damper 516 is rotated so that the end portion thereof confronts the upstream side of the third front passage 484 and projects into the third front passage 484, warm air is guided to the upstream side of the third front passage 484 along the temperature control damper 516, and further mixing thereof with cooled air can be promoted. Further, concerning the heat dampers 528 in the form of a butterfly valve, one end side thereof is rotated about the support axis to project toward the side of the sixth front passage 520 (in the direction of arrow A), while the other end side thereof is rotated to project toward the side of the seventh front passage (in the direction of arrow B).

Consequently, warm air that is mixed with cool air in the third front passage 484 flows from the sixth front passage 520, through the seventh front passage 522, and to the first heat passage 538, and is blown in the vicinity of the feet of passengers who ride in the front seat in the vehicle compartment, and together therewith, is blown in the vicinity of the feet of passengers who ride in the middle seats in the vehicle compartment, from the eighth front passage 540 and through the second heat passage (not shown).

Further, the sub-defroster damper 518a, 518b may be rotated so as to establish communication between the fifth front passage 514 and the sixth front passage 520. As a result, air that passes through the first heating section 450 of the heater core 410 is added to the first air, which has been supplied to the sixth front passage 520 via the third front passage 484, whereupon warm first air can be supplied directly with respect to the sixth front passage 520. Owing thereto, it is possible to decrease ventilation resistance of the fluid passage and to increase the blowing rate of warm air that is blown in the vicinity of the feet of passengers in the front seat in the vehicle compartment from the first heat blow-out port (not shown). Stated otherwise, warm air blown in the vicinity of the feet of passengers can be supplied at a more stable temperature.

On the other hand, concerning the second air (cooled air), the second air mixing damper 590 is rotated to an intermediate position whereby the second air flows to the second heating section 452 of the heater core 410, and together therewith, flows to the third rear passage 592 connected to the second rear passage 584. Specifically, the second air, after having been cooled by the second cooling section 438 of the evaporator 408, is divided in flow by the second air mixing damper 590, such that one portion is guided to the third rear passage 592 as cooled air, whereas the other portion thereof, after being heated by the second heating section 452 of the heater core 410, is blown into the third rear passage 592. As a result, the second air is adjusted to a suitable temperature in the third rear passage 592.

The angle of rotation of the second air mixing damper 590 can be freely changed in accordance with the temperature desired by passengers in the vehicle compartment, or stated otherwise, the second air mixing damper 590 can be rotated in coordination with an input from the controller in the vehicle compartment. Concerning the second air, which flows downstream through the third rear passage 592, the flow rate ratio thereof to the fourth rear passage 594 and the fifth rear passage 596 is adjusted by rotating the mode switching damper 598 to a predetermined position so that the second air flows therethrough. As a result, the second air is blown from the second vent blow-out port (not shown) in the vicinity of the faces of passengers in the middle seats inside the vehicle compartment, or alternatively, is blown from the second heat blow-out port and the third heat blow-out port (not shown) toward the feet of passengers in the middle seats and rear seats inside the vehicle compartment. Herein, the predetermined position of the mode switching damper 598 is defined in accordance with the set temperature and mode, which are input by a passenger from the controller inside the vehicle compartment. The set temperature and/or mode, apart from being input from the front seats, may also be input from the middle seats or the rear seats.

Next, in the case that the heat mode for performing blowing of air in the vicinity of the feet of passengers in the vehicle compartment is selected by the controller (not shown) in the vehicle compartment, compared to the case of the bi-level mode, the first air mixing damper 488 is rotated more to the side of the third front passage 484. Further, the temperature control damper 516 is rotated somewhat to establish communication between the third front passage 484 and the fifth front passage 514. Furthermore, the cooling vent damper 490 blocks communication between the second front passage 482 and the third front passage 484, and the vent damper 494 and the defroster dampers 526a, 526b are rotated respectively so that the first vent blow-out port 492 and the defroster blow-out port 524 are closed.

At this time, similar to the aforementioned bi-level mode, concerning the heat dampers 528 which are formed from a butterfly valve, one end side is rotated about the support axis to project into the sixth front passage 520 (in the direction of arrow A), whereas the other end side is rotated to project into the seventh front passage 522 (in the direction of arrow B).

As a result thereof, the heated first air that has passed through the first heating section 450 of the heater core 410 is supplied to the third front passage 484 from the fifth front passage 514. In the third front passage 484, the first air (cooled air), which has flowed in from the second front passage 482, is mixed with the first air (heated air), whereupon the mixed air passes through the sixth front passage 520 and the seventh front passage 522 and flows rearwardly. In addition, after being supplied to the first heat passage 538, air is blown from a non-illustrated first heat blow-out port in the vicinity of the feet of passengers riding in the front seat in the vehicle compartment, and from the eighth front passage 540 air is blown out via a non-illustrated second heat passage in the vicinity of the feet of passengers in the middle seats in the vehicle compartment.

In this case, since the end of the temperature control damper 516 is rotated toward the upstream side of the third front passage 484 projecting into the third front passage 484, the warm air is guided downstream of the third front passage 484 along the temperature control damper 516, and mixing thereof with the cooled air can be promoted.

Further, the sub-defroster damper 518a, 518b may be rotated to establish communication between the fifth front passage 514 and the sixth front passage 520. In accordance therewith, air passes through the first heating section 450 of the heater core 410 and is added to the first air supplied to the sixth front passage 520 via the third front passage 484, and such heated first air can be supplied directly with respect to the sixth front passage 520. Owing thereto, the air blowing rate of warm air, which is blown in the vicinity of the feet of passengers in the front seat in the vehicle compartment from the first heat blow-out port, can be increased. Stated otherwise, warm air blown in the vicinity of the feet of passengers can be supplied at a more stable temperature.

On the other hand, compared to the case of the bi-level mode, the second air mixing damper 590 is rotated somewhat to separate away from the heater core 410, whereupon second air, which has passed through the second heating section 452 of the heater core 410, flows downstream through the third rear passage 592. By rotating the mode switching damper 598 to a position blocking the fourth rear passage 594, the second air passes through the fifth rear passage 596 and is blown in the vicinity of the feet of passengers in the middle and rear seats in the vehicle compartment from the second heat blowout port and the third heat flow-out port (not shown).

Next, an explanation shall be made concerning a heat-defroster mode, in which by means of a controller (not shown) in the vehicle compartment, air is blown both in the vicinity of the feet of passengers in the vehicle compartment, and in the vicinity of the front window for eliminating fog (condensation) on the front window.

In the case of the heat-defroster mode, the defroster dampers 526a, 526b in the form of a butterfly valve are rotated about the support axis so as to separate from the defroster blow-out port 524, together with blocking the first vent blow-out port 492 by the vent damper 494 (refer to the broken line in FIG. 8). As a result thereof, a portion of the first air (mixed air) that is mixed in the third front passage 484 passes through the defroster blow-out port 524 and is blown in the vicinity of the front window in the vehicle compartment. Further, another portion of the first air (mixed air) passes through the sixth and seventh front passages 520, 522, and is blown in the vicinity of the feet of passengers in the front seats in the vehicle compartment through the first heat passage 538, as well as being blown in the vicinity of the feet of passengers in the middle seats in the vehicle compartment from the eighth front passage 540 through a non-illustrated second heat passage.

Further, in the heat-defroster mode, in the case that second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the first air-mixing damper 488 and the cooling vent damper 490 block communication respectively between the second front passage 482 and the third front passage 484. At the same time, the vent damper 494 blocks the first vent blow-out port 492 and communication between the vent duct 544 and the third front passage 484, while the temperature control damper 516 establishes communication between the fifth front passage 514 and the third front passage 484. Further, the heat dampers 528 in the form of a butterfly valve are rotated about the support axis, so that one end thereof blocks the eighth front passage 540 and the other end thereof blocks the seventh front passage 522, respectively.

On the other hand, the sub-defroster dampers 518a, 518b and the defroster dampers 526a, 526b in the form of butterfly valves are rotated to establish communication between the fifth front passage 514, the sixth front passage 520, and the defroster blow-out port 524. As a result, warm first air that has passed through the heater core 410 is supplied from the fifth front passage 514, through the sixth front passage 520, and to the opened defroster blow-out port 524, whereby warm air is blown in the vicinity of the front window in the vehicle. In this case, the second blower unit 412 is not driven, and only the first air supplied from the first blower unit 406 is blown out.

In the foregoing manner, according to the second embodiment, in a vehicular air conditioning apparatus and a temperature control method performed by the vehicular air conditioning apparatus having a temperature control damper 516 for adjusting the temperature of air that is blown into the vehicle compartment, the temperature control damper 516 deflects the flow of air delivered from the heater core 410 toward a direction in which the evaporator 408 is installed. The vehicular air conditioning apparatus thus has a function whereby the flow of air delivered from the evaporator 408 and the flow of air delivered from the heater core 410 are oriented mutually in opposite directions, and as a result, mixing of cool air and warm air can be carried out favorably.

Herein, the first vent blow out port 492 is disposed on the engine room side of the casing 402, and the defroster blow out port 524 is disposed on the vehicle compartment side of the casing 402. At a time when the evaporator 408 is operated maximally, the temperature control damper 516 is closed completely. As a result, the degree of curving of the third front passage 484 from the evaporator 408 to the first vent blow out port 492 is decreased, and further, ventilation resistance due to bulging of the temperature control damper 516 is decreased significantly. Owing thereto, flow passage resistance in the vicinity of the first vent blow out port 492 at a time of maximum cooling is decreased, thereby enabling energy conservation and reduction in noise.

Furthermore, because the third front passage 484 establishes communication between the evaporator 408 and the first vent blow out port 492, according to the second embodiment, the temperature of air blown out from the first vent blow out port 492 upwardly of the casing 402, and the temperature of air blown out from the first heat blow out port downwardly of the casing 402 can be controlled separately.

The vehicular air conditioning apparatus and the temperature control method performed by the vehicular air conditioning apparatus according to the present invention are not limited to the above-described embodiments, and it is a matter of course that various modified or additional structures could be adopted without deviating from the essence and gist of the invention as set forth in the appended claims.

What is claimed is:

1. A vehicular air conditioning apparatus including a casing in which passages and blow-out ports are formed for conveying air into a vehicle compartment, cooling means disposed inside the casing for cooling the air, and heating means disposed inside the casing on a downstream side from the cooling means for heating the air, and further comprising:
   a cool air passage disposed on a downstream side of the cooling means, the cool air passage extending so as to circumvent the heating means, and through which air that has been cooled by the cooling means flows;
   a warm air passage disposed on a downstream side of the heating means through which air that has been heated by the heating means flows, and which communicates with the cooling passage on a downstream side thereof;
   a holder that holds the heating means; and
   a temperature control damper disposed rotatably at a region where the warm air passage and the cool air passage communicate,
   wherein the heating means is disposed immediately above the cooling means,
   a lower end of the temperature control damper is moved away from the holder when the temperature control damper is operated to establish communication between the warm air passage and the cool air passage, and the lower end of the temperature control damper is contacted with the holder when the temperature control damper is operated to block communication between the warm air passage and the cool air passage, and
   when the lower end of the temperature control damper is moved away from the holder, the temperature control damper deflects a flow of air delivered from the heating means downwardly toward an upstream direction of the cool air passage such that the flow of air delivered from the cooling means and the flow of air delivered from the heating means are oriented mutually in opposite directions.

2. The vehicular air conditioning apparatus according to claim 1, wherein, when communication between the warm air passage and the cool air passage is blocked, the temperature control damper is arranged substantially parallel to a direction of flow of the air that flows through the cool air passage.

3. The vehicular air conditioning apparatus according to claim 2, wherein the temperature control damper comprises a butterfly valve having an axis of rotation in a center portion thereof.

4. The vehicular air conditioning apparatus according to claim 2, wherein the temperature control damper is formed in a plate-like shape having an axis of rotation at one end thereof.

5. The vehicular air conditioning apparatus according to claim 1, wherein the apparatus further comprises a second temperature control damper, and the temperature control damper and the second temperature control damper are capable of independently controlling blowing of air toward a driver's seat side and a passenger seat side respectively in the vehicle compartment.

6. The vehicular air conditioning apparatus according to claim 2, wherein the apparatus further comprises a second temperature control damper, and the temperature control damper and the second temperature control damper are capable of independently controlling blowing of air toward a driver's seat side and a passenger seat side respectively in the vehicle compartment.

7. The vehicular air conditioning apparatus according to claim 3, wherein the apparatus further comprises a second temperature control damper, and the temperature control damper and the second temperature control damper are capable of independently controlling blowing of air toward a driver's seat side and a passenger seat side respectively in the vehicle compartment.

8. The vehicular air conditioning apparatus according to claim 4, wherein the apparatus further comprises a second temperature control damper, and the temperature control damper and the second temperature control damper are capable of independently controlling blowing of air toward a driver's seat side and a passenger seat side respectively in the vehicle compartment.

9. A temperature control method performed by a vehicular air conditioning apparatus, comprising:
- deflecting a flow of warm air downwardly toward an upstream direction of a flow of cool air;
- mixing the cool air and warm air by causing the flow of warm air and the flow of cool air to be oriented in mutually opposite directions; and
- in a case where mixing of the warm air and the cool air is unnecessary, carrying out control of temperature by blowing air directly into a vehicle compartment, without mixing the warm air and the cool air.

10. The vehicular air conditioning apparatus according to claim 1, wherein the holder has a rectangular shape in cross section.

11. The vehicular air conditioning apparatus according to claim 1, wherein the temperature control damper comprises a butterfly valve having an axis of rotation in a center portion thereof, an upper end of the temperature control damper projects about the axis toward a side of the cool air passage, and the lower end of the temperature control damper projects toward a side of the warm air passage.

12. The vehicular air conditioning apparatus according to claim 1, wherein when the lower end of the temperature control damper is moved away from the holder, and the lower end of the temperature control damper confronts the upstream side of the cool air passage and projects into the cool air passage.

13. The vehicular air conditioning apparatus according to claim 1, wherein the temperature control damper is disposed immediately above the heating means.

* * * * *